US008870655B2

(12) United States Patent
Ikeda

(10) Patent No.: US 8,870,655 B2
(45) Date of Patent: Oct. 28, 2014

(54) WIRELESS GAME CONTROLLERS

(75) Inventor: Akio Ikeda, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1368 days.

(21) Appl. No.: 11/404,871

(22) Filed: Apr. 17, 2006

(65) Prior Publication Data

US 2007/0050597 A1    Mar. 1, 2007

Related U.S. Application Data

(60) Provisional application No. 60/714,862, filed on Sep. 8, 2005.

(30) Foreign Application Priority Data

Aug. 24, 2005  (JP) ................................ 2005-242926

(51) Int. Cl.
*A63F 13/06* (2006.01)
*A63F 13/40* (2014.01)
*A63F 13/20* (2014.01)

(52) U.S. Cl.
CPC ................ *A63F 13/06* (2013.01); *A63F 13/10* (2013.01); *A61F 2300/1087* (2013.01); *A63F 2300/1006* (2013.01)
USPC .................... 463/39; 463/36; 463/37; 463/38

(58) Field of Classification Search
None
See application file for complete search history.

(56) References Cited

U.S. PATENT DOCUMENTS

| | | | |
|---|---|---|---|
| 3,454,920 A | 7/1969 | Mehr | |
| 3,474,241 A | 10/1969 | Kuipers | |
| D220,268 S | 3/1971 | Kliewer | |
| 3,660,648 A | 5/1972 | Kuipers | |
| 3,973,257 A | 8/1976 | Rowe | |
| 4,009,619 A | 3/1977 | Snyman | |
| 4,038,876 A | 8/1977 | Morris | |
| 4,166,406 A | 9/1979 | Maughmer | |
| 4,287,765 A | 9/1981 | Kreft | |
| 4,303,978 A | 12/1981 | Shaw et al. | |
| 4,318,245 A | 3/1982 | Stowell et al. | |
| 4,321,678 A | 3/1982 | Krogmann | |
| 4,337,948 A | 7/1982 | Breslow | |

(Continued)

FOREIGN PATENT DOCUMENTS

| | | |
|---|---|---|
| DE | 03930581 | 3/1991 |
| DE | 19701344 | 7/1997 |

(Continued)

OTHER PUBLICATIONS

"ASCII Grip One Handed Controller" *One Switch-ASCII Grip One Handed Playstation Controller* http://www.oneswitch.org.uk/1/ascii/grip.htm Jul. 11, 2008 pp. 1-2.

(Continued)

*Primary Examiner* — Jay T. Liddle
(74) *Attorney, Agent, or Firm* — Nixon & Vanderhye P.C.

(57) ABSTRACT

A game controller arrangement includes a first control unit generating first operation data including linear acceleration sensed within a first control unit body. A second control unit generates second operation data in accordance with a direction input operation performed by a player. One of the first control unit and the second control unit includes a transmission section for wirelessly transmitting the first operation data and the second operation data to a computer.

30 Claims, 20 Drawing Sheets

(56) References Cited

U.S. PATENT DOCUMENTS

| | | |
|---|---|---|
| 4,342,985 A | 8/1982 | Desjardins |
| 4,402,250 A | 9/1983 | Baasch |
| 4,425,488 A | 1/1984 | Moskin |
| 4,443,866 A | 4/1984 | Burgiss, Sr. |
| 4,450,325 A | 5/1984 | Luque |
| 4,503,299 A | 3/1985 | Henrard |
| 4,514,600 A | 4/1985 | Lentz |
| 4,514,798 A | 4/1985 | Lesche |
| 4,540,176 A | 9/1985 | Baer |
| 4,546,551 A | 10/1985 | Franks |
| 4,558,604 A | 12/1985 | Auer |
| 4,561,299 A | 12/1985 | Orlando et al. |
| 4,578,674 A | 3/1986 | Baker et al. |
| 4,623,930 A | 11/1986 | Oshima et al. |
| 4,672,374 A | 6/1987 | Desjardins |
| 4,739,128 A | 4/1988 | Grisham |
| 4,761,540 A | 8/1988 | McGeorge |
| 4,787,051 A | 11/1988 | Olson |
| 4,816,810 A | 3/1989 | Moore |
| 4,839,838 A | 6/1989 | LaBiche et al. |
| 4,849,655 A | 7/1989 | Bennett |
| 4,851,685 A | 7/1989 | Dubgen |
| 4,914,598 A | 4/1990 | Krogmann et al. |
| 4,918,293 A | 4/1990 | McGeorge |
| 4,957,291 A | 9/1990 | Miffitt et al. |
| 4,961,369 A | 10/1990 | McGill |
| 4,969,647 A | 11/1990 | Mical et al. |
| 4,988,981 A | 1/1991 | Zimmerman |
| 4,994,795 A | 2/1991 | MacKenzie |
| 5,045,843 A | 9/1991 | Hansen |
| 5,059,958 A | 10/1991 | Jacobs et al. |
| 5,062,696 A | 11/1991 | Oshima et al. |
| 5,068,645 A | 11/1991 | Drumm |
| D325,225 S | 4/1992 | Adhida |
| 5,124,938 A | 6/1992 | Algrain |
| 5,128,671 A | 7/1992 | Thomas, Jr. |
| D328,463 S | 8/1992 | King et al. |
| 5,136,222 A | 8/1992 | Yamamoto |
| 5,138,154 A | 8/1992 | Hotelling |
| D331,058 S | 11/1992 | Morales |
| 5,175,481 A | 12/1992 | Kanno |
| 5,178,477 A | 1/1993 | Gambaro |
| 5,181,181 A | 1/1993 | Glynn |
| 5,202,844 A | 4/1993 | Kamio et al. |
| D340,042 S | 10/1993 | Copper et al. |
| 5,262,777 A | 11/1993 | Low et al. |
| D342,256 S | 12/1993 | Payne |
| 5,280,744 A | 1/1994 | DeCarlo et al. |
| 5,296,871 A | 3/1994 | Paley |
| 5,307,325 A | 4/1994 | Scheiber |
| 5,317,394 A | 5/1994 | Hale et al. |
| 5,329,276 A | 7/1994 | Hirabayashi |
| 5,332,322 A | 7/1994 | Gambaro |
| 5,339,095 A | 8/1994 | Redford |
| D350,736 S | 9/1994 | Takahashi et al. |
| D350,782 S | 9/1994 | Barr |
| D351,430 S | 10/1994 | Barr |
| 5,357,267 A | 10/1994 | Inoue |
| 5,359,321 A | 10/1994 | Ribic |
| 5,359,348 A | 10/1994 | Pilcher et al. |
| 5,363,120 A | 11/1994 | Drumm |
| 5,369,580 A | 11/1994 | Monji et al. |
| 5,369,889 A | 12/1994 | Callaghan |
| 5,373,857 A | 12/1994 | Hirabayashi et al. |
| 5,396,265 A | 3/1995 | Ulrich et al. |
| 5,421,590 A | 6/1995 | Robbins |
| 5,430,435 A | 7/1995 | Hoch et al. |
| D360,903 S | 8/1995 | Barr et al. |
| 5,440,326 A | 8/1995 | Quinn |
| 5,453,758 A | 9/1995 | Sato |
| 5,459,489 A | 10/1995 | Redford |
| 5,469,194 A | 11/1995 | Clark et al. |
| 5,481,957 A | 1/1996 | Paley et al. |
| 5,484,355 A | 1/1996 | King, II et al. |
| 5,485,171 A | 1/1996 | Copper et al. |
| 5,490,058 A | 2/1996 | Yamasaki et al. |
| 5,502,486 A | 3/1996 | Ueda et al. |
| 5,506,605 A * | 4/1996 | Paley ............................ 345/163 |
| 5,512,892 A | 4/1996 | Corballis et al. |
| 5,517,183 A | 5/1996 | Bozeman, Jr. |
| 5,526,022 A | 6/1996 | Donahue et al. |
| 5,528,265 A | 6/1996 | Harrison |
| 5,531,443 A | 7/1996 | Cruz |
| 5,541,860 A | 7/1996 | Takei et al. |
| 5,551,701 A | 9/1996 | Bouton et al. |
| 5,554,033 A | 9/1996 | Bizzi |
| 5,554,980 A | 9/1996 | Hashimoto et al. |
| 5,563,628 A | 10/1996 | Stroop |
| D375,326 S | 11/1996 | Yokoi et al. |
| 5,573,011 A | 11/1996 | Felsing |
| 5,574,479 A | 11/1996 | Odell |
| 5,579,025 A | 11/1996 | Itoh |
| D376,826 S | 12/1996 | Ashida |
| 5,587,558 A | 12/1996 | Matsushima |
| 5,594,465 A | 1/1997 | Poulachon |
| 5,598,187 A | 1/1997 | Ide et al. |
| 5,602,569 A | 2/1997 | Kato |
| 5,603,658 A | 2/1997 | Cohen |
| 5,605,505 A | 2/1997 | Han |
| 5,606,343 A | 2/1997 | Tsuboyama et al. |
| 5,611,731 A | 3/1997 | Bouton et al. |
| 5,615,132 A | 3/1997 | Horton et al. |
| 5,621,459 A | 4/1997 | Ueda et al. |
| 5,624,117 A | 4/1997 | Ohkubo et al. |
| 5,627,565 A | 5/1997 | Morishita et al. |
| 5,640,152 A | 6/1997 | Copper |
| 5,645,077 A | 7/1997 | Foxlin et al. |
| 5,645,277 A | 7/1997 | Cheng |
| 5,666,138 A | 9/1997 | Culver |
| 5,667,220 A | 9/1997 | Cheng |
| 5,670,845 A | 9/1997 | Grant et al. |
| 5,670,988 A | 9/1997 | Tickle |
| 5,676,673 A | 10/1997 | Ferre et al. |
| 5,679,004 A | 10/1997 | McGowan et al. |
| 5,682,181 A | 10/1997 | Nguyen et al. |
| 5,698,784 A | 12/1997 | Hotelling et al. |
| 5,701,131 A | 12/1997 | Kuga |
| 5,702,305 A | 12/1997 | Norman et al. |
| 5,703,623 A | 12/1997 | Hall et al. |
| 5,724,106 A | 3/1998 | Autry et al. |
| 5,726,675 A | 3/1998 | Inoue |
| 5,734,371 A | 3/1998 | Kaplan |
| 5,734,373 A | 3/1998 | Rosenberg et al. |
| 5,734,807 A | 3/1998 | Sumi |
| 5,736,970 A | 4/1998 | Bozeman, Jr. |
| 5,739,811 A | 4/1998 | Rosenberg et al. |
| 5,741,182 A | 4/1998 | Lipps et al. |
| 5,742,331 A | 4/1998 | Uomori et al. |
| 5,745,226 A | 4/1998 | Gigioli, Jr. |
| 5,746,602 A | 5/1998 | Kikinis |
| 5,751,273 A | 5/1998 | Cohen |
| 5,752,880 A | 5/1998 | Gabai et al. |
| 5,757,354 A | 5/1998 | Kawamura |
| 5,757,360 A | 5/1998 | Nitta et al. |
| 5,764,224 A | 6/1998 | Lilja et al. |
| 5,771,038 A | 6/1998 | Wang |
| D397,162 S | 8/1998 | Yokoi et al. |
| 5,794,081 A | 8/1998 | Itoh et al. |
| 5,796,354 A | 8/1998 | Cartabiano et al. |
| 5,805,256 A | 9/1998 | Miller |
| 5,807,284 A | 9/1998 | Foxlin |
| 5,819,206 A | 10/1998 | Horton |
| 5,820,462 A | 10/1998 | Yokoi et al. |
| 5,822,713 A | 10/1998 | Profeta |
| 5,825,350 A | 10/1998 | Case, Jr. et al. |
| D400,885 S | 11/1998 | Goto |
| 5,831,553 A | 11/1998 | Lenssen et al. |
| 5,835,077 A | 11/1998 | Dao |
| 5,835,156 A | 11/1998 | Blonstein et al. |
| 5,841,409 A | 11/1998 | Ishibashi et al. |
| 5,847,854 A | 12/1998 | Benson, Jr. |
| 5,850,624 A | 12/1998 | Gard et al. |
| 5,854,622 A | 12/1998 | Brannon |
| D405,071 S | 2/1999 | Gambaro |

(56) References Cited

U.S. PATENT DOCUMENTS

| | | |
|---|---|---|
| 5,867,146 A | 2/1999 | Kim et al. |
| 5,874,941 A | 2/1999 | Yamada |
| 5,875,257 A | 2/1999 | Marrin et al. |
| 5,897,437 A | 4/1999 | Nishiumi et al. |
| 5,898,421 A | 4/1999 | Quinn |
| 5,902,968 A | 5/1999 | Sato et al. |
| 5,912,612 A | 6/1999 | DeVolpi |
| 5,919,149 A | 7/1999 | Allum |
| 5,923,317 A | 7/1999 | Sayler et al. |
| 5,929,782 A | 7/1999 | Stark et al. |
| 5,947,868 A | 9/1999 | Dugan |
| 5,955,713 A | 9/1999 | Titus et al. |
| 5,955,988 A | 9/1999 | Blonstein et al. |
| 5,956,035 A | 9/1999 | Scianmanella et al. |
| 5,973,757 A | 10/1999 | Aubuchon et al. |
| 5,982,352 A | 11/1999 | Pryor |
| 5,982,356 A | 11/1999 | Akiyama |
| 5,984,785 A | 11/1999 | Takeda |
| 5,986,644 A | 11/1999 | Herder |
| 5,991,085 A | 11/1999 | Rallison et al. |
| 5,999,168 A | 12/1999 | Rosenberg et al. |
| 6,002,394 A | 12/1999 | Schein et al. |
| 6,010,406 A | 1/2000 | Kajikawa et al. |
| 6,011,526 A | 1/2000 | Toyoshima et al. |
| 6,013,007 A | 1/2000 | Root et al. |
| 6,016,144 A | 1/2000 | Blonstein et al. |
| 6,019,680 A | 2/2000 | Cheng |
| 6,020,876 A | 2/2000 | Rosenberg et al. |
| 6,037,882 A | 3/2000 | Levy |
| 6,044,297 A | 3/2000 | Sheldon et al. |
| 6,049,823 A | 4/2000 | Hwang |
| 6,052,083 A | 4/2000 | Wilson |
| 6,057,788 A | 5/2000 | Cummings |
| 6,058,342 A | 5/2000 | Orbach et al. |
| 6,059,576 A | 5/2000 | Brann |
| 6,069,594 A | 5/2000 | Barnes et al. |
| 6,072,467 A | 6/2000 | Walker |
| 6,072,470 A | 6/2000 | Ishigaki |
| 6,081,819 A | 6/2000 | Ogino |
| 6,084,315 A | 7/2000 | Schmitt |
| 6,084,577 A | 7/2000 | Sato et al. |
| 6,087,950 A | 7/2000 | Capan |
| 6,110,039 A | 8/2000 | Oh |
| 6,115,028 A | 9/2000 | Balakrishnan |
| 6,137,457 A | 10/2000 | Tokuhashi et al. |
| 6,148,100 A | 11/2000 | Anderson et al. |
| 6,155,926 A | 12/2000 | Miyamoto et al. |
| 6,160,405 A | 12/2000 | Needle et al. |
| 6,160,540 A | 12/2000 | Fishkin et al. |
| 6,162,191 A | 12/2000 | Foxlin |
| 6,164,808 A | 12/2000 | Shibata et al. |
| 6,176,837 B1 | 1/2001 | Foxlin |
| 6,181,329 B1 | 1/2001 | Stork et al. |
| 6,183,365 B1 | 2/2001 | Tonomura et al. |
| 6,184,862 B1 | 2/2001 | Leiper |
| 6,184,863 B1 | 2/2001 | Silbert et al. |
| 6,186,896 B1 | 2/2001 | Takeda et al. |
| 6,191,774 B1 | 2/2001 | Schena et al. |
| 6,198,295 B1 | 3/2001 | Hill |
| 6,198,470 B1 | 3/2001 | Agam et al. |
| 6,198,471 B1 | 3/2001 | Cook |
| 6,200,219 B1 | 3/2001 | Rudell et al. |
| 6,200,253 B1 | 3/2001 | Nishiumi et al. |
| 6,201,554 B1 | 3/2001 | Lands |
| 6,217,450 B1 | 4/2001 | Meredith |
| 6,217,478 B1 | 4/2001 | Vohmann et al. |
| 6,225,987 B1 | 5/2001 | Matsuda |
| 6,226,534 B1 | 5/2001 | Aizawa |
| 6,239,806 B1 | 5/2001 | Nishiumi et al. |
| 6,241,611 B1 | 6/2001 | Takeda et al. |
| 6,243,658 B1 | 6/2001 | Raby |
| 6,244,987 B1 | 6/2001 | Oshuga et al. |
| 6,245,014 B1 | 6/2001 | Brainard, II |
| 6,264,558 B1 | 7/2001 | Nishiumi et al. |
| 6,273,819 B1 | 8/2001 | Strauss et al. |
| 6,280,327 B1 * | 8/2001 | Leifer et al. ............ 463/39 |
| 6,297,751 B1 | 10/2001 | Fadavi-Ardekani |
| 6,301,534 B1 | 10/2001 | McDermott, Jr. et al. |
| 6,304,250 B1 | 10/2001 | Yang et al. |
| 6,323,614 B1 | 11/2001 | Palazzolo et al. |
| 6,323,654 B1 | 11/2001 | Needle et al. |
| 6,325,718 B1 | 12/2001 | Nishiumi et al. |
| 6,331,841 B1 | 12/2001 | Tokuhashi et al. |
| 6,331,856 B1 | 12/2001 | Van Hook et al. |
| 6,337,954 B1 | 1/2002 | Soshi et al. |
| 6,361,507 B1 | 3/2002 | Foxlin |
| D456,410 S | 4/2002 | Ashida |
| 6,369,794 B1 | 4/2002 | Sakurai et al. |
| 6,375,572 B1 | 4/2002 | Masuyama et al. |
| 6,377,793 B1 | 4/2002 | Jenkins |
| 6,377,906 B1 | 4/2002 | Rowe |
| D456,854 S | 5/2002 | Ashida |
| 6,394,904 B1 | 5/2002 | Stalker |
| 6,400,996 B1 | 6/2002 | Hoffberg et al. |
| 6,409,687 B1 | 6/2002 | Foxlin |
| D459,727 S | 7/2002 | Ashida |
| 6,415,223 B1 | 7/2002 | Lin et al. |
| 6,421,056 B1 | 7/2002 | Nishiumi et al. |
| 6,424,333 B1 | 7/2002 | Tremblay |
| 6,426,719 B1 | 7/2002 | Nagareda et al. |
| 6,426,741 B1 | 7/2002 | Goldsmith et al. |
| D462,683 S | 9/2002 | Ashida |
| 6,452,494 B1 | 9/2002 | Harrison |
| 6,456,276 B1 | 9/2002 | Park |
| D464,053 S | 10/2002 | Zicolello |
| 6,466,198 B1 | 10/2002 | Feinstein |
| 6,466,831 B1 | 10/2002 | Shibata et al. |
| 6,473,070 B2 | 10/2002 | Mishra et al. |
| 6,473,713 B1 | 10/2002 | McCall et al. |
| 6,474,159 B1 | 11/2002 | Foxlin et al. |
| 6,484,080 B2 | 11/2002 | Breed |
| 6,492,981 B1 | 12/2002 | Stork et al. |
| 6,518,952 B1 | 2/2003 | Leiper |
| 6,538,675 B2 | 3/2003 | Aratani et al. |
| D473,942 S | 4/2003 | Motoki et al. |
| 6,544,124 B2 | 4/2003 | Ireland et al. |
| 6,544,126 B2 | 4/2003 | Sawano et al. |
| 6,545,661 B1 | 4/2003 | Goschy et al. |
| 6,549,191 B2 | 4/2003 | Leman |
| 6,567,536 B2 | 5/2003 | McNitt et al. |
| 6,572,108 B1 | 6/2003 | Bristow |
| 6,577,350 B1 | 6/2003 | Proehl et al. |
| 6,582,299 B1 | 6/2003 | Matsuyama et al. |
| 6,582,380 B2 | 6/2003 | Kazlausky et al. |
| 6,585,596 B1 | 7/2003 | Leifer |
| 6,590,536 B1 | 7/2003 | Walton |
| 6,591,677 B2 | 7/2003 | Rothuff |
| 6,597,342 B1 | 7/2003 | Haruta |
| 6,597,443 B2 | 7/2003 | Boman |
| 6,599,194 B1 | 7/2003 | Smith et al. |
| 6,608,563 B2 | 8/2003 | Weston et al. |
| 6,609,977 B1 | 8/2003 | Shimizu et al. |
| 6,616,607 B2 | 9/2003 | Hashimoto et al. |
| 6,628,257 B1 | 9/2003 | Oka et al. |
| 6,634,949 B1 | 10/2003 | Briggs et al. |
| 6,636,826 B1 | 10/2003 | Abe et al. |
| 6,650,029 B1 | 11/2003 | Johnston |
| 6,650,313 B2 | 11/2003 | Levine et al. |
| 6,650,345 B1 | 11/2003 | Saito et al. |
| 6,654,001 B1 | 11/2003 | Su |
| 6,672,962 B1 | 1/2004 | Ozaki et al. |
| 6,676,520 B2 | 1/2004 | Nishiumi |
| 6,677,990 B1 | 1/2004 | Kawahara |
| 6,681,629 B2 | 1/2004 | Foxlin et al. |
| 6,682,351 B1 | 1/2004 | Abraham-Fuchs et al. |
| 6,686,954 B1 | 2/2004 | Kitaguchi et al. |
| 6,692,170 B2 | 2/2004 | Abir |
| 6,693,622 B1 | 2/2004 | Shahoian et al. |
| 6,712,692 B2 | 3/2004 | Basson et al. |
| 6,717,573 B1 | 4/2004 | Shahoian et al. |
| 6,718,280 B2 | 4/2004 | Hermann |
| 6,724,366 B2 | 4/2004 | Crawford |
| 6,725,173 B2 | 4/2004 | An et al. |
| 6,736,009 B1 | 5/2004 | Schwabe |

(56) References Cited

U.S. PATENT DOCUMENTS

| | | |
|---|---|---|
| 6,747,632 B2 | 6/2004 | Howard |
| 6,747,690 B2 | 6/2004 | Mølgaard |
| 6,749,432 B2 | 6/2004 | French et al. |
| 6,753,849 B1 | 6/2004 | Curran et al. |
| 6,753,888 B2 | 6/2004 | Kamiwada et al. |
| 6,757,068 B2 | 6/2004 | Foxlin |
| 6,757,446 B1 | 6/2004 | Li et al. |
| 6,761,637 B2 | 7/2004 | Weston et al. |
| 6,765,553 B1 | 7/2004 | Odamura |
| 6,786,877 B2 | 9/2004 | Foxlin |
| 6,796,177 B2 | 9/2004 | Mori |
| 6,811,489 B1 | 11/2004 | Shimizu et al. |
| 6,811,491 B1 | 11/2004 | Levenberg et al. |
| 6,813,525 B2 | 11/2004 | Reid et al. |
| 6,813,584 B2 | 11/2004 | Zhou et al. |
| 6,816,151 B2 | 11/2004 | Dellinger |
| 6,836,705 B2 | 12/2004 | Hellmann et al. |
| 6,836,751 B2 | 12/2004 | Paxton et al. |
| 6,836,971 B1 | 1/2005 | Wan |
| 6,842,991 B2 | 1/2005 | Levi et al. |
| 6,850,221 B1 | 2/2005 | Tickle |
| 6,850,844 B1 | 2/2005 | Walters et al. |
| 6,856,327 B2 | 2/2005 | Choi |
| 6,868,738 B2 | 3/2005 | Moscrip et al. |
| 6,872,139 B2 | 3/2005 | Sato et al. |
| 6,873,406 B1 | 3/2005 | Hines et al. |
| D505,424 S | 5/2005 | Ashida et al. |
| 6,897,845 B2 | 5/2005 | Ozawa |
| 6,897,854 B2 | 5/2005 | Cho et al. |
| 6,906,700 B1 | 6/2005 | Armstrong |
| 6,908,388 B2 | 6/2005 | Shimizu et al. |
| 6,922,632 B2 | 7/2005 | Foxlin |
| 6,925,410 B2 | 8/2005 | Narayanan |
| 6,929,543 B1 | 8/2005 | Ueshima et al. |
| 6,929,548 B2 | 8/2005 | Wang |
| 6,933,923 B2 | 8/2005 | Feinstein |
| 6,954,980 B2 | 10/2005 | Song |
| 6,956,564 B1 | 10/2005 | Williams |
| 6,967,566 B2 | 11/2005 | Weston et al. |
| 6,982,697 B2 | 1/2006 | Wilson et al. |
| 6,984,208 B2 | 1/2006 | Zheng |
| 6,990,639 B2 | 1/2006 | Wilson |
| 6,993,206 B2 | 1/2006 | Ishino |
| 6,993,451 B2 | 1/2006 | Chang et al. |
| 6,995,748 B2 | 2/2006 | Gordon et al. |
| 6,998,966 B2 | 2/2006 | Pederson et al. |
| 7,000,469 B2 | 2/2006 | Foxlin et al. |
| 7,002,591 B1 | 2/2006 | Leather et al. |
| 7,031,875 B2 | 4/2006 | Ellenby et al. |
| D522,011 S | 5/2006 | Hayes et al. |
| 7,066,781 B2 | 6/2006 | Weston |
| 7,098,891 B1 | 8/2006 | Pryor |
| 7,098,894 B2 | 8/2006 | Yang et al. |
| 7,102,616 B1 | 9/2006 | Sleator |
| 7,107,168 B2 | 9/2006 | Oystol et al. |
| 7,126,584 B1 | 10/2006 | Nishiumi et al. |
| 7,127,370 B2 | 10/2006 | Kelly et al. |
| D531,585 S | 11/2006 | Weitgasser et al. |
| 7,133,026 B2 | 11/2006 | Horie et al. |
| 7,139,983 B2 | 11/2006 | Kelts |
| 7,140,962 B2 | 11/2006 | Okuda et al. |
| 7,142,191 B2 | 11/2006 | Idesawa et al. |
| 7,145,551 B1 | 12/2006 | Bathiche et al. |
| 7,149,627 B2 | 12/2006 | Ockerse et al. |
| 7,154,475 B2 | 12/2006 | Crew |
| 7,158,118 B2 | 1/2007 | Liberty |
| 7,173,604 B2 | 2/2007 | Marvit et al. |
| 7,176,919 B2 | 2/2007 | Drebin et al. |
| 7,182,691 B1 | 2/2007 | Schena |
| 7,183,480 B2 | 2/2007 | Nishitani et al. |
| 7,184,059 B1 | 2/2007 | Fouladi et al. |
| 7,220,220 B2 | 5/2007 | Stubbs et al. |
| 7,225,101 B2 | 5/2007 | Usuda et al. |
| 7,231,063 B2 | 6/2007 | Naimark et al. |
| 7,233,316 B2 | 6/2007 | Smith et al. |
| 7,236,156 B2 | 6/2007 | Liberty et al. |
| 7,239,301 B2 | 7/2007 | Liberty et al. |
| 7,262,760 B2 | 8/2007 | Liberty |
| D556,201 S | 11/2007 | Ashida et al. |
| 7,292,151 B2 | 11/2007 | Ferguson et al. |
| 7,301,527 B2 | 11/2007 | Marvit |
| 7,301,648 B2 | 11/2007 | Foxlin |
| D556,760 S | 12/2007 | Ashida et al. |
| D559,847 S | 1/2008 | Ashida et al. |
| 7,335,134 B1 | 2/2008 | LaVelle |
| D567,243 S | 4/2008 | Ashida et al. |
| 7,351,148 B1 | 4/2008 | Rothschild et al. |
| RE40,324 E | 5/2008 | Crawford |
| 7,379,566 B2 | 5/2008 | Hildreth |
| 7,395,181 B2 | 7/2008 | Foxlin |
| 7,414,611 B2 | 8/2008 | Liberty |
| 7,445,550 B2 | 11/2008 | Barney et al. |
| 7,488,231 B2 | 2/2009 | Weston |
| 7,500,917 B2 | 3/2009 | Barney et al. |
| 7,568,289 B2 | 8/2009 | Burlingham et al. |
| 7,582,016 B2 | 9/2009 | Suzuki |
| 7,614,958 B2 | 11/2009 | Weston et al. |
| 2001/0008847 A1 | 7/2001 | Miyamoto et al. |
| 2001/0010514 A1* | 8/2001 | Ishino ............... 345/158 |
| 2001/0049302 A1 | 12/2001 | Hagiwara et al. |
| 2002/0024500 A1 | 2/2002 | Howard |
| 2002/0028071 A1 | 3/2002 | Mølgaard |
| 2002/0072418 A1 | 6/2002 | Masuyama et al. |
| 2002/0075335 A1 | 6/2002 | Rekimoto |
| 2002/0107069 A1 | 8/2002 | Ishino |
| 2002/0140745 A1 | 10/2002 | Ellenby et al. |
| 2002/0158843 A1 | 10/2002 | Levine et al. |
| 2003/0038778 A1 | 2/2003 | Noguera et al. |
| 2003/0052860 A1 | 3/2003 | Park et al. |
| 2003/0063068 A1 | 4/2003 | Anton et al. |
| 2003/0069077 A1 | 4/2003 | Korienek |
| 2003/0107551 A1 | 6/2003 | Dunker |
| 2003/0144056 A1 | 7/2003 | Leifer |
| 2003/0193572 A1 | 10/2003 | Wilson et al. |
| 2003/0195041 A1 | 10/2003 | McCauley |
| 2003/0204361 A1 | 10/2003 | Townsend et al. |
| 2003/0216176 A1 | 11/2003 | Shimizu et al. |
| 2003/0222851 A1 | 12/2003 | Lai et al. |
| 2004/0028258 A1 | 2/2004 | Naimark et al. |
| 2004/0048666 A1 | 3/2004 | Bagley |
| 2004/0070564 A1 | 4/2004 | Dawson |
| 2004/0075650 A1 | 4/2004 | Paul et al. |
| 2004/0095317 A1 | 5/2004 | Zhang et al. |
| 2004/0134341 A1 | 7/2004 | Sandoz et al. |
| 2004/0140954 A1 | 7/2004 | Faeth |
| 2004/0143413 A1 | 7/2004 | Oystol et al. |
| 2004/0152515 A1 | 8/2004 | Wegmuller et al. |
| 2004/0193413 A1 | 9/2004 | Wilson et al. |
| 2004/0203638 A1 | 10/2004 | Chan |
| 2004/0204240 A1 | 10/2004 | Barney |
| 2004/0218104 A1 | 11/2004 | Smith et al. |
| 2004/0222969 A1 | 11/2004 | Buchenrieder |
| 2004/0227725 A1 | 11/2004 | Calarco et al. |
| 2004/0229693 A1 | 11/2004 | Lind et al. |
| 2004/0239626 A1 | 12/2004 | Noguera |
| 2004/0259651 A1 | 12/2004 | Storek |
| 2004/0268393 A1 | 12/2004 | Hunleth et al. |
| 2005/0020369 A1 | 1/2005 | Davis et al. |
| 2005/0047621 A1 | 3/2005 | Cranfill |
| 2005/0054457 A1 | 3/2005 | Eyestone et al. |
| 2005/0076161 A1 | 4/2005 | Albanna et al. |
| 2005/0085298 A1 | 4/2005 | Woolston |
| 2005/0107160 A1 | 5/2005 | Cheng et al. |
| 2005/0125826 A1 | 6/2005 | Hunleth et al. |
| 2005/0130739 A1 | 6/2005 | Argentar |
| 2005/0143173 A1* | 6/2005 | Barney et al. ............... 463/37 |
| 2005/0172734 A1 | 8/2005 | Alsio |
| 2005/0174324 A1 | 8/2005 | Liberty et al. |
| 2005/0179644 A1 | 8/2005 | Alsio |
| 2005/0210419 A1 | 9/2005 | Kela |
| 2005/0212749 A1 | 9/2005 | Marvit |
| 2005/0212750 A1 | 9/2005 | Marvit |
| 2005/0212751 A1 | 9/2005 | Marvit |
| 2005/0212752 A1 | 9/2005 | Marvit |

(56) References Cited

U.S. PATENT DOCUMENTS

| | | |
|---|---|---|
| 2005/0212753 A1 | 9/2005 | Marvit |
| 2005/0212754 A1 | 9/2005 | Marvit |
| 2005/0212755 A1 | 9/2005 | Marvit |
| 2005/0212756 A1 | 9/2005 | Marvit |
| 2005/0212757 A1 | 9/2005 | Marvit |
| 2005/0212758 A1 | 9/2005 | Marvit |
| 2005/0212759 A1 | 9/2005 | Marvit |
| 2005/0212760 A1 | 9/2005 | Marvit |
| 2005/0212764 A1 | 9/2005 | Toba |
| 2005/0212767 A1 | 9/2005 | Marvit et al. |
| 2005/0215295 A1 | 9/2005 | Arneson |
| 2005/0217525 A1 | 10/2005 | McClure |
| 2005/0243061 A1 | 11/2005 | Liberty et al. |
| 2005/0243062 A1 | 11/2005 | Liberty |
| 2005/0253806 A1 | 11/2005 | Liberty et al. |
| 2005/0256675 A1 | 11/2005 | Kurata |
| 2006/0028446 A1 | 2/2006 | Liberty et al. |
| 2006/0030385 A1 | 2/2006 | Barnet et al. |
| 2006/0092133 A1 | 5/2006 | Touma et al. |
| 2006/0148563 A1 | 7/2006 | Yang |
| 2006/0152487 A1 | 7/2006 | Grunnet-Jepsen et al. |
| 2006/0152488 A1 | 7/2006 | Salsman et al. |
| 2006/0152489 A1 | 7/2006 | Sweetser et al. |
| 2006/0154726 A1 | 7/2006 | Weston et al. |
| 2006/0178212 A1 | 8/2006 | Penzias |
| 2006/0256081 A1 | 11/2006 | Zalewski et al. |
| 2006/0264260 A1 | 11/2006 | Zalewski et al. |
| 2006/0282873 A1 | 12/2006 | Zalewski et al. |
| 2006/0287086 A1 | 12/2006 | Zalewski et al. |
| 2006/0287087 A1 | 12/2006 | Zalewski et al. |
| 2007/0049374 A1 | 3/2007 | Ikeda et al. |
| 2007/0050597 A1 | 3/2007 | Ikeda |
| 2007/0052177 A1 | 3/2007 | Ikeda et al. |
| 2007/0060391 A1 | 3/2007 | Ikeda et al. |
| 2007/0066394 A1 | 3/2007 | Ikeda et al. |
| 2007/0066396 A1 | 3/2007 | Weston et al. |
| 2007/0072680 A1 | 3/2007 | Ikeda |
| 2007/0252815 A1 | 11/2007 | Kuo et al. |
| 2007/0265076 A1 | 11/2007 | Lin et al. |
| 2008/0014835 A1 | 1/2008 | Weston et al. |
| 2008/0015017 A1 | 1/2008 | Ashida et al. |
| 2008/0039202 A1 | 2/2008 | Sawano et al. |
| 2008/0273011 A1 | 11/2008 | Lin |
| 2008/0278445 A1 | 11/2008 | Sweetser et al. |
| 2009/0005166 A1 | 1/2009 | Sato |
| 2009/0051653 A1 | 2/2009 | Barney et al. |
| 2009/0124165 A1 | 5/2009 | Weston |
| 2009/0156309 A1 | 6/2009 | Weston et al. |

FOREIGN PATENT DOCUMENTS

| | | |
|---|---|---|
| DE | 19701374 | 7/1997 |
| DE | 19648487 | 6/1998 |
| DE | 19814254 | 10/1998 |
| DE | 19937307 | 2/2000 |
| DE | 10029173 | 1/2002 |
| DE | 10241392 | 5/2003 |
| DE | 10219198 | 11/2003 |
| EP | 0835676 A1 | 4/1998 |
| EP | 0848226 A2 | 6/1998 |
| EP | 0852961 | 7/1998 |
| EP | 1062994 A2 | 12/2000 |
| EP | 1279425 A2 | 1/2003 |
| EP | 1293237 | 3/2003 |
| GB | 1 524 334 | 9/1978 |
| GB | 1524334 | 9/1978 |
| GB | 2 244 546 A | 5/1990 |
| GB | 2284478 | 6/1995 |
| GB | 2307133 | 5/1997 |
| GB | 2316482 | 5/1998 |
| GB | 2319374 | 5/1998 |
| JP | 60-077231 | 5/1985 |
| JP | 62-14527 | 1/1987 |
| JP | H3-74434 | 7/1991 |
| JP | 3-059619 | 11/1991 |
| JP | U-H05-56191 | 7/1993 |
| JP | 2901476 | 12/1993 |
| JP | 06-050758 | 2/1994 |
| JP | 3262677 | 5/1994 |
| JP | 06-154422 | 6/1994 |
| JP | A-H06-198075 | 7/1994 |
| JP | 3194841 | 10/1994 |
| JP | 6-308879 | 11/1994 |
| JP | 3273531 | 11/1994 |
| JP | 7-028591 | 1/1995 |
| JP | 3228845 | 1/1995 |
| JP | 7044315 A | 2/1995 |
| JP | 7-22312 | 5/1995 |
| JP | 7-146123 | 6/1995 |
| JP | 3517482 | 6/1995 |
| JP | 7-200142 | 8/1995 |
| JP | 7-302148 | 11/1995 |
| JP | 7-318332 | 12/1995 |
| JP | A-H08-71252 | 3/1996 |
| JP | 8-095704 | 4/1996 |
| JP | 8-106352 | 4/1996 |
| JP | 08-111144 | 4/1996 |
| JP | A-H08-111144 | 4/1996 |
| JP | 8-114415 | 5/1996 |
| JP | 8-122070 | 5/1996 |
| JP | 8-152959 | 6/1996 |
| JP | 8-211993 | 8/1996 |
| JP | 8-335136 | 12/1996 |
| JP | 9-230997 | 9/1997 |
| JP | 9-274534 | 10/1997 |
| JP | 9-319510 | 12/1997 |
| JP | 1033831 | 2/1998 |
| JP | 10-099542 | 4/1998 |
| JP | 10-154038 | 6/1998 |
| JP | 10-254614 | 9/1998 |
| JP | 11-114223 | 4/1999 |
| JP | A-H11-114223 | 4/1999 |
| JP | 11-506857 | 6/1999 |
| JP | 2000-270237 | 9/2000 |
| JP | 2000-308756 | 11/2000 |
| JP | U3078268 | 11/2000 |
| JP | U-3078268 | 4/2001 |
| JP | 2001-175412 | 6/2001 |
| JP | A-2003-140823 | 11/2001 |
| JP | 2002-062981 | 2/2002 |
| JP | 2002233665 | 2/2002 |
| JP | 2002-091692 | 3/2002 |
| JP | 2002-153673 | 5/2002 |
| JP | 2002-298145 | 10/2002 |
| JP | 2003-53038 | 2/2003 |
| JP | 2003-140823 | 5/2003 |
| JP | 3422383 B2 | 6/2003 |
| JP | 2003208263 | 7/2003 |
| JP | 2003-236246 | 8/2003 |
| JP | 2003-325974 | 11/2003 |
| JP | 2004-062774 | 2/2004 |
| JP | 2004-313492 | 11/2004 |
| JP | 2005/021458 | 1/2005 |
| JP | 2005-040493 | 2/2005 |
| JP | 2005-063230 | 3/2005 |
| JP | 2006-113019 | 4/2006 |
| NL | 9300171 | 8/1994 |
| RU | 2125853 C1 | 2/1999 |
| RU | 2126161 C1 | 2/1999 |
| RU | 2141738 C1 | 11/1999 |
| WO | WO94 02931 | 2/1994 |
| WO | WO96/05766 | 2/1996 |
| WO | WO97/09101 | 3/1997 |
| WO | WO 9712337 | 4/1997 |
| WO | WO97/28864 | 8/1997 |
| WO | WO 9811528 | 3/1998 |
| WO | WO00/33168 | 6/2000 |
| WO | WO 00/35345 | 6/2000 |
| WO | WO 00/47108 | 8/2000 |
| WO | WO 00/63874 | 10/2000 |
| WO | WO 0187426 | 11/2001 |
| WO | WO 0191042 A2 | 11/2001 |
| WO | WO 02/17054 A1 | 2/2002 |

(56) References Cited

FOREIGN PATENT DOCUMENTS

| | | | |
|---|---|---|---|
| WO | WO02 34345 A2 | 5/2002 |
| WO | WO 03/015005 | 2/2003 |
| WO | WO 03107260 A2 | 6/2003 |
| WO | WO 03088147 A1 | 10/2003 |
| WO | WO 2004039055 | 5/2004 |
| WO | WO2004-051391 A2 | 6/2004 |

OTHER PUBLICATIONS

"Superfamicom Grip controller by ASCII" http://superfami.com/sfc_grip.html Jul. 10, 2008 pp. 1-2.
"ASCII/Sammy Grip V2" *One Switch-Accessible Gaming Shop-ASCII Grip V2* http://www.oneswitch.org.uk/1/AGS/AGS-onehand/ascii-grip-v2.html Jul. 10, 2008 pp. 1-2.
Photographs of prior art ASCII Grip V2 Controller (cited in previous IDS as: ASCII/Sammy Grip V2 One Switch-Accessible Gaming Shop-ASCII Grip V2 http://www.oneswitch.org.uk/1/AGS/AGS-onehand/ascii-grip-v2.html Jul. 10, 2008 pp. 1-2.).
Kennedy P.J. "Hand-Held Data Input Device" *IBM Technical Disclosure Bulletin* vol. 26 No. 11 Apr. 1984 pp. 5826-5827.
"Controllers Atari Space Age Joystick" *AtariAge: Have You Played Atari Today?* www.atariage.com/controller_page.html?SystemID=2600&ControllerID=12.
"Controllers-Booster Grip" *AtariAge: Have You Played Atari Today?* www.atariage.com/controller_page.html?SystemID=2600&ControllerID=18.
"Coleco Vision: Super Action™ Controller Set" www.vintagecomputing.com/wp-content/images/retroscan/coleco_sac_1_large.jpg.
Electro-Plankton Weblog http://www.tranism.com/weblog/2005/09/ "This is the Revolution Nintendo Style" Sep. 15, 2005 2 pgs.
"ASCII Grip" One-Handed Controller the Ultimate One-Handed Controller Designed for the Playstation Game Console (ASCII Entertainment 1997).
"Game Controller" Wikipedia, 7 pages, http://en.wikipedia.org/w/index.php?title=Game_controller&oldid=21390758. (Aug. 19, 2005).
Dichtburn, "Camera in Direct3D" Toymaker, 5 pages, http://web.archive.org/web/20050206032104/http://toymaker.info/games/html/camera.html. (Mar. 5, 2005).
Wilson, Andy, "XWand: UI for Intelligent Environments", http://research.microsoft.com/en-us/um/people/awilson/wand/default.htm (last edit Apr. 26, 2004).
Wilson, Andrew, XWand: UI for Intelligent Spaces, CHI 2003, Ft. Lauderdale, FL, US, ACM (Apr. 5-10, 2003).
Office Action issued in corresponding Japanese patent application 2007-203785 (Oct. 27, 2008).
Odell, "An Optical Pointer for Infrared Remote Controllers," Proceedings of International Conference on Consumer Electronics (1995).
Odell, Transcript of Testimony, Investigation No. 337-TA-658, Before the United States International Trade Commission, vol. IV, public session (May 14, 2009).
Selectech, Selectech AirMouse Devices (image) (1991).
Selectech, "Selectech AirMouse Remote Controls, Model # AM-R1," photographs (1991).
Selectech, "Airmouse Remote Control System Model AM-1 User's Guide," Colchester, VT (Sep. 24, 1991).
Selectech, Facsimile Transmission from Rossner to Monastiero, Airmouse Remote Controls, Colchester, VT (Mar. 25, 1992).
Selectech, "Changing Driver Versions on CDTV/AMIGA" (Oct. 17, 1991).
Selectech, "AirMouse Remote Controls, AirMouse Remote Control Warranty" (1991).
Selectech, Software, "AirMouse for DOS and Windows IBM & Compatibles," "AirMouse Remote Control B0100EN-C, Amiga Driver, CDTV Driver, Version: 1.00," "AirMouse Remote Control B0100EM-C.1, Apple Macintosh Serial Driver Version: 1.00 (1.01B)," "AirMouse Remote Control B0100EL-B/3.05 DOS Driver Version: 3.0, Windows Driver Version 1.00," "AirMouse Remote Control MS-DOS Driver Version: 3.00/3.05, Windows 3.0 Driver Version: 1.00" (1991).
Wilson, "Wireless User Interface Devices for Connected Intelligent Environments," Ubicomp 2003 Workshop (2003).
Wilson, "WorldCursor: Pointing in Intelligent Environments with a Tele-operated Laser Pointer," UIST '03 Companion (Nov. 2003).
Wilson, Research page, biography available at http://research.microsoft.com/en-us/um/people/awilson/?0sr=a, Microsoft Corp. (2009).
Wilson, XWand video, http://research.microsoft.com/~awilson/wand/wand%20video%20768k.WMV (Mar. 2002).
Wilson, Transcript of Testimony, Investigation No. 337-TA-658, Before the United States International Trade Commission, vol. V (May 15, 2009).
Office Action mailed in applicants' copending U.S. Appl. No. 11/764,409 (Feb. 20, 2009).
Titterton et al., "Strapdown Inertial Navigation Technology," 2nd ed., Institution of Electrical Engineers (2004).
Acar, "Robust Micromachined Vibratory Gyroscopes" Dissertation (Dec. 2004).
Acar, et al., "Experimental evaluation and comparative analysis of commercial-variable-capacitance MEMS accelerometers," *Journal of Micromechanics and Microengineering,* vol. 13 (1), pp. 634-645 (May 2003).
Agard, Agard, "Advances in Strapdown Inertial Systems," Lecture Series Advisory Group for Aerospace Research and Development Neuilly-Sur-Seine (France) (1984).
Albrecht, "An Adaptive Digital Filter to Predict Pilot Head Look Direction for Helmet-mounted Displays," MS Thesis University of Dayton (1989).
Algrain, "Estimation of 3-D Angular Motion Using Gyroscopes and Linear Accelerometers," IEEE Transactions on Aerospace and Electronic Systems, vol. 27, No. 6, pp. 910-920 (Nov. 1991).
Algrain, et al., "Accelerometer Based Line-of-Sight Stabilization Approach for Pointing and Tracking System," Second IEEE Conference on Control Applications, vol. 1, Issue 13-16 pp. 159-163 (Sep. 1993).
Algrain, et al., "Interlaced Kalman Filtering of 3-D Angular Motion Based on Euler's Nonlinear Equations," IEEE Transactions on Aerospace and Electronic Systems, vol. 30, No. 1 (Jan. 1994).
Allen, et al., "A General Method for Comparing the Expected Performance of Tracking and Motion Capture Systems," {VRST} '05: Proceedings of the ACM symposium on Virtual reality software and technology, pp. 201-210 (Nov. 2005).
Allen, et al., "Tracking: Beyond 15 Minutes of Thought," SIGGRAPH 2001 Course 11 (Course Pack) from Computer Graphics (2001).
Alves, "Extended Kalman filtering applied to a full accelerometer strapdown inertial measurement unit," M.S. Thesis Massachusetts Institute of Technology. Dept. of Aeronautics and Astronautics, Santiago (1992).
Analog Devices "ADXL50 Single Axis Accelerometer" (Data Sheet), http://www.analog.com/en/obsolete/adxl50/products/product.html (Mar. 1996).
Analog Devices "ADXL202E Low-Cost ±2 g Dual-Axis Accelerometer with Duty Cycle Output" (Data Sheet), Rev. A (2000).
Analog Devices "ADXL330 Small, Low Power, 3-Axis ±2 g iMEMS Accelerometer" (Data Sheet), Rev. PrA (2005).
Analog Devices "ADXRS150 ±150°/s Single Chip Yaw Rate Gyro with Signal Conditioning" (Data Sheet), Rev. B (2004).
Analog Devices "ADXRS401 ±75°/s Single Chip Yaw Rate Gyro with Signal Conditioning" (Data Sheet), Rev. O (2004).
Ang, et al., "Design and Implementation of Active Error Canceling in Hand-held Microsurgical Instrument," Proceedings of the 2001 IEEE/RSJ International Conference on Intelligent Robots and Systems, vol. 2, (Oct. 2001).
Ang, et al., "Design of All-Accelerometer Inertial Measurement Unit for Tremor Sensing in Hand-held Microsurgical Instrument," Proceedings of the 2003 IEEE International Conference on Robotics & Automation (Sep. 2003).

(56) References Cited

OTHER PUBLICATIONS

Apostolyuk, Vladislav, "Theory and design of micromechanical vibratory gyroscopes," MEMS/NEMS Handbook, Springer, 2006, vol. 1, pp. 173-195 (2006).
Arcanatech, IMP (Photos) (1994).
Arcanatech, "IMP User's Guide" (1994).
Ascension Technology, The Bird 6D Input Devices (specification) (1998).
Ator, "Image-Velocity with Parallel-Slit Reticles," Journal of the Optical Society of America (Dec. 1963).
Azarbayejani, et al, "Real-Time 3-D Tracking of the Human Body," Proceedings of IMAGE'COM 96 (1996).
Azarbayejani, et al., "Visually Controlled Graphics," IEEE Transactions on Pattern Analysis and Machine Intelligence, vol. 15, No. 6, pp. 602-605 (Jun. 1993).
Azuma et al., "Improving Static and Dynamic Registration in an Optical See-Through HMD," International Conference on Computer Graphics and Interactive Techniques Proceedings of the 21st annual conference on Computer graphics and interactive techniques, pp. 197-204 (1994).
Azuma et al., "Making Augmented Reality Work Outdoors Requires Hybrid Tracking," Proceedings of the International Workshop on Augmented Reality, San Francisco, CA, Nov. 1, 1998, Bellevue, Washington, pp. 219-224 (1999).
Azuma, "Predictive Tracking for Augmented Reality," Ph.D. Dissertation, University of North Carolina at Chapel Hill (1995).
Azuma, et al., "A Frequency-Domain Analysis of Head-Motion Prediction," Proceedings of SIGGRAPH '94, pp. 401-408 (1995).
Azuma, et al., "A motion-stabilized outdoor augmented reality system," Proceedings of IEEE Virtual Reality '99, Houston, TX (Mar. 1999).
Bachmann et al., "Inertial and Magnetic Posture Tracking for Inserting Humans into Networked Virtual Environments," Virtual Reality Software and Technology archive, Proceedings of the ACM Symposium on Virtual Reality Software and Technology, Baniff, Alberta, Canada, pp. 9-16 (2001)
Bachmann et al., "Orientation Tracking for Humans and Robots Using Inertial Sensors" (CIRA '99), Naval Postgraduate School, Monterey, CA (1999).
Bachmann, "Inertial and Magnetic Angle Tracking of Limb Segments for Inserting Humans into Synthetic Environments," Dissertation, Naval Postgraduate School, Monterey, CA (Dec. 2000).
Baker et al., "Active Multimodal Control of a Floppy Telescope Structure," Proc. SPIE, vol. 4825, 74 (Mar. 2003).
Balakrishnan, "The Rockin' Mouse: Integral 3D Manipulation on a Plane," (CHI '97), Univ. Toronto, (1997).
Ballagas, et al., Jan, "iStuff: A Physical User Interface Toolkit for Ubiquitous Computer Environments," Proceedings of the SIGCHI Conference on Human Factors in Computing Systems, vol. 5, No. 1, at 537-44 (ACM) (Apr. 5-10, 2003).
Baraff, "An Introduction to Physically Based Modeling," SIGGRAPH 97 Course Notes (1997).
Baudisch, et al., "Soap: a pointing device that works in mid-air" Proc. UIST (2006).
BBN Report, "Virtual Environment Technology for Training (VETT)," The Virtual Environment and Teleoperator Research Consortium (VETREC) (Mar. 1992).
Behringer, "Improving Registration Precision Through Visual Horizon Silhouette Matching," Proceedings of the international workshop on Augmented reality : placing artificial objects in real scenes: placing artificial objects in real scenes, Bellevue, Washington, United States pp. 225-232 (1999).
Behringer, "Registration for Outdoor Augmented Reality Applications Using Computer Vision Techniques and Hybrid Sensors," Virtual Reality, 1999 Proceedings., IEEE Computer Society, pp. 244-261 (1999).
BEI, "BEI GyrochipTM Model QRS11 Data Sheet," BEI Systron Donner Inertial Division, BEI Technologies, Inc., (Sep. 1998).
BEI Systron Donner Inertial Division, Gyrochip Theory of Operation (2001).

Benbasat, "An Inertial Measurement Unit for User Interfaces," Massachusetts Institute of Technology Dissertation, (Sep. 2000).
Benbasat, et al., "An Inertial Measurement Framework for Gesture Recognition and Applications," Gesture and Sign Language in Human-Computer Interaction, International Gesture Workshop, GW 2001, London, UK, 2001 Proceedings, LNAI 2298, at 9-20, I. Wachsmuth and T. Sowa (eds.), Springer-Verlag Berlin Heibelberg (2001, 2002).
Beuter, A., Publications, University of Quebec at Montreal, http://www.er.uqam.ca/nobel/r11040/publicat.htm (Aug. 2007).
BGM-109 Tomahawk, http://en.wikipedia.org/wiki/BGM-109_Tomahawk, Wikipedia, Jan. 2009.
Bhatnagar, "Position trackers for Head Mounted Display systems: A survey" (Technical Report), University of North Carolina at Chapel Hill (Mar. 1993).
Bianchi, "A Tailless Mouse, New cordless Computer Mouse Invented by ArcanaTech." Inc. Article (Jun. 1992).
Bishop, "The Self-Tracker: A Smart Optical Sensor on Silicon," Ph.D. Dissertation, Univ. of North Carolina at Chapel Hill (1984).
Bishop, et al., "Grids Progress Meeting" (Slides), University of North Carolina at Chapel Hill, NC (1998).
Bishop, et al., Self-Tracker: Tracking for Hybrid Environments without Infrastructure (1996).
Bona, et al., "Optimum Reset of Ship's Inertial Navigation System," IEEE Transactions on Aerospace and Electronic Systems (1965).
Borenstein, et al., "Where am I? Sensors and Methods for Mobile Robot Positioning" (1996).
Boser, "3-Axis Accelerometer with Differential Sense Electronics," http://www.eecs.berkeley.edu/~boser/pdf/3axis.pdf (1997).
Boser, "Accelerometer Design Example: Analog Devices XL-05/5," http://www.eecs.berkeley.edu/~boser/pdf/xl05.pdf (1996).
Bowman et al., *3D User Interfaces: Theory and Practice*, Addison-Wesley, Inc., (2005).
Bowman,. et al., "An Introduction to 3-D User Interface Design," MIT Presence, vol. 10, No. 1, pp. 96-108 (2001).
Britton et al., "Making Nested rotations Convenient for the User," ACM SIGGRAPH Computer Graphics, vol. 12, Issue 3, pp. 222-227 (Aug. 1978).
Britton, "A Methodology for the Ergonomic Design of Interactive Computer Graphic Systems, and its Application to Crystallography" (UNC Thesis) (1977).
Business Wire, "Feature/Virtual reality glasses that interface to Sega channel," Time Warner, TCI: project announced concourrent with COMDEX (Nov. 1994).
Business Wire, "Free-space 'Tilt' Game Controller for Sony Playstation Uses Scenix Chip; SX Series IC Processes Spatial Data in Real Time for On-Screen" (Dec. 1999).
Business Wire, "InterSense Inc. Launches InertiaCube2—The World's Smallest Precision Orientation Sensor With Serial Interface" (Aug. 14, 2001).
Business Wire, "Logitech MAGELLAN 3D Controller," Logitech (Apr. 1997).
Business Wire, "Mind Path Introduces GyroPoint RF Wireless Remote" (Jan. 2000).
Business Wire, "Pegasus' Wireless PenCell Writes on Thin Air with ART's Handwriting Recognition Solutions," Business Editors/High Tech Writers Telecom Israel 2000 Hall 29, Booth 19-20 (Nov. 2000).
Business Wire, "RPI ships low-cost pro HMD Plus 3D Mouse and VR PC graphics card system for CES" (Jan. 1995).
Buxton, Bill, "Human input/output devices," in M. Katz (ed.), Technology Forecast: 1995, Menlo Park, C.A.: Price Waterhouse World Firm Technology Center, 49-65 (1994).
Buxton, Bill, A Directory of Sources for Input Technologies, http://www.billbuxton.com/InputSources.html, Apr. 2001 (last update 2008).
Byte, "Imp Coexists With Your Mouse," What's New, ArcaneTec (Jan. 1994).
Canaday, R67-26 "The Lincoln Wand," IEEE Transactions on Electronic Computers, vol. EC-16, No. 2, p. 240 (Apr. 1967).
Caruso et al., "New Perspective on Magnetic Field Sensing," Sensors Magazine (Dec. 1998).
Caruso et al., "Vehicle Detection and Compass Applications using AMR Magnetic Sensors," Honeywell (May 1999).

(56) References Cited

OTHER PUBLICATIONS

Caruso, "Application of Magnetoresistive Sensors in Navigation Systems," Sensors and Actuators, SAE SP-1220, pp. 15-21 (Feb. 1997).
Caruso, "Applications of Magnetic Sensors for Low Cost Compass Systems," Honeywell, SSEC, http://www.ssec.honeywell.com/magnetic/datasheets/lowcost.pdf (May 1999).
Chatfield, "Fundamentals of High Accuracy Inertial Navigation," vol. 174 Progress in Astronautics and Aeronautics, American Institute of Aeronautics and Astronautics, Inc. (1997).
Cheng, "Direct interaction with large-scale display systems using infrared laser tracking devices," ACM International Conference Proceeding Series; vol. 142 (2003).
Cho, et al., "*Magic Wand*: A Hand-Drawn Gesture Input Device in 3-D Space with Inertial Sensors," Proceedings of the 9th Intl Workshop on Frontiers in Handwriting Recognition (IWFHR-9 2004), IEEE (2004).
Computergram, "RPI Entertainment Pods Improve Virtual Experience" (1995).
Cookbook, Numerical Recipes Electronic Edition, http://www.library.cornell.edu/nr/cbookcpdf.html.
Cooke, et al., "NPSNET: flight simulation dynamic modeling using quaternions," Presence, vol. 1, No. 4,pp. 404-420, MIT Press (1992/1994).
CSIDC Winners—Tablet-PC Classroom System Wins Design Competition, IEEE Computer Society Press, vol. 36, Issue 8, pp. 15-18, IEEE Computer Society (Aug. 2003).
Cutrone, "Hot products: Gyration GyroPoint Desk, GyroPoint Pro gyroscope-controlled wired and wireless mice" (Computer Reseller News) (Dec. 1995).
Cutts, "A Hybrid Image/Inertial System for Wide-Area Tracking" (Internal to UNC-CH Computer Science) (Jun. 1999).
Deruyck, et al., "An Electromagnetic Position Sensor," Polhemus Navigation Sciences, Inc., Burlington, VT (Nov. 1973).
Donelson, et al., "Spatial Management of Information" (1978).
Eiβele, "Orientation as an additional User Interface in Mixed-Reality Environments," 1. workshop Ervwiterte and Virtuelle Realität, pp. 79-90. GI-Fachgruppe AR/VR (2007).
Enura, et al., "Sensor Fusion Based Measurement of Human Head Motion," 3rd IEEE International Workshop on Robot and Human Communication (Jul. 1994).
Ferrin, "Survey of Helmet Tracking Technologies," Proc. SPIE vol. 1456, p. 86-94 (Apr. 1991).
Foxlin et al., "An Inertial Head-Orientation Tracker with Automatic Drift Compensation for Use with HMD's," Proceedings of the conference on Virtual reality software and technology, Singapore, Singapore, pp. 159-173 (1994).
Foxlin et al., "Miniature 6-DOF Inertial System for Tracking HMDs," SPIE vol. 3362 (Apr. 1998).
Foxlin et al., "Miniaturization, Calibration & Accuracy Evaluation of a Hybrid Self-Tracker," The Second IEEE and ACM International Symposium on Mixed and Augmented Reality, pp. 151-160 (2003).
Foxlin et al., "WearTrack: A Self-Referenced Head and Hand Tracker for Wearable Computers and Portable VR," International Symposium on Wearable Computers (ISWC 2000), Oct. 16-18, 2000, Atlanta, GA (2000).
Foxlin, "FlightTracker: A Novel Optical/Inertial Tracker for Cockpit Enhanced Vision, Symposium on Mixed and Augmented Reality," Proceedings of the 3rd IEEE/ACM International Symposium on Mixed and Augmented Reality, pp. 212-221 (Nov. 2004).
Foxlin, "Generalized architecture for simultaneous localization, auto-calibration, and map-building," IEEE/RSJ Conf. on Intelligent Robots and Systems, Lausanne, Switzerland (Oct. 2002).
Foxlin, "Head-tracking Relative to a Moving Vehicle or Simulator Platform Using Differential Inertial Sensors," InterSense, Inc., Presented: Helmet and Head-Mounted Displays V, SPIE vol. 4021, AeroSense Symposium, Orlando, FL, Apr. 24-25, 2000 (2000).
Foxlin, "Inertial Head Tracker Sensor Fusion by a Complementary Separate-bias Kalman Filter," Proceedings of the IEEE 1996 Virtual Reality Annual International Symposium, pp. 185-194, 267 (1996).
Foxlin, "Inertial Head-Tracking," MS Thesis, Massachusetts Institute of Technology, Dept. of Electrical Engineering and Computer Science (Sep. 1993).
Foxlin, "Motion Tracking Requirements and Technologies," Chapter 7, from Handbook of Virtual Environment Technology, Stanney Kay, Ed. (2002).
Foxlin, "Pedestrian Tracking with Shoe-Mounted Inertial Sensors," IEEE Computer Graphics and Applications, vol. 25, No. 6, pp. 38-46 (Nov. 2005).
Foxlin, et al., "Constellation: A Wide-Range Wireless Motion-Tracking System for Augmented Reality and Virtual Set Applications," ACM SIGGRAPH, pp. 372-378 (1998).
Foxlin, et al., "VIS-Tracker: A Wearable Vision-Inertial Self-Tracker," IEEE Computer Society (2003).
Freiburg Center for Data Analysis and Modeling—Publications, http://www.fdm.uni-freiburg.de/cms/puplications/publications/ (Aug. 2007).
Friedmann, et al., "Device Synchronization Using an Optimal Linear Filter," SI3D '92: Proceedings of the 1992 symposium on Interactive 3D graphics, pp. 57-62 (1992).
Friedmann, et al., "Synchronization in virtual realities," MIT Presence, vol. 1, No. 1, pp. 139-144 (1992).
Fröhlich, "The Yo Yo: An interaction device combining elastic and isotonic control," at http://www.uni-weimar.de/cms/medien/vr/research/hci/3d-handheld-interaction/the-yoyo-a-handheld-device-combining-elastic-and-isotonic-input.html (2003).
Green, et al., "ADI's iMEMS Angular Rate Sensing Gyroscope," Analog Dialogue (Jan. 2003).
Grimm et al., "Real-Time Hybrid Pose Estimation from Vision and Inertial Data," Proceedings, First Canadian Conference on Computer and Robot Vision, pp. 480-486 (2004).
Gyration Inc., "The Magic Inside GyroPoint".
Gyration, "Gyration GP110 Ultra Cordless Optical Mouse Data Sheet," http://www.gyration.com/descriptions/document/GP110-SPEC-EN.pdf (2002).
Gyration, "Gyration GP110 Ultra Cordless Optical Mouse User Manual," http://www.gyration.com/descriptions/document/GP110-MANUAL-EN.pdf (2002).
Gyration, "Gyration Ultra Cordless Optical Mouse," photos (2002).
Gyration, "Gyration MicroGyro 100 Developer Kit Data Sheet," http://web.archive.org/web/19980708122611/www.gyration.com/html/devkit.html (Jul. 1998).
Hamilton Institute, http://www.dcs.gla.ac.uk/.about.rod/, R. Murray-Smith (Aug. 2007).
Harada, et al., "Portable Absolute Orientation Estimation Device with Wireless Network under Accelerated Situation" Proceedings, 2004 IEEE International Conference on Robotics and Automation, vol. 2, Issue, Apr. 26-May 1, 2004 pp. 1412-1417 vol. 2 (Apr. 2004).
Harada, et al., "Portable orientation estimation device based on accelerometers, magnetometers and gyroscope sensors for sensor network," Proceedings of IEEE International Conference on Multisensor Fusion and Integration for Intelligent Systems, MFI2003, pp. 191-196 (Jul. 2003).
Haykin, et al., "Adaptive Tracking of Linear Time-Variant Systems by Extended RLS Algorithms, IEEE Transactions on Signal Processing," vol. 45, No. 5 (May 1997).
Heath, "Virtual Reality Resource Guide AI Expert," v9 n5 p. 32(14) (May 1994).
Hinckley et al., "The VideoMouse: A Camera-Based Multi-Degree-of-Freedom Input Device" A59, ACM UIST'99 Symposium on User Interface Software & Technology, CHI Letters 1 (1), pp. 103-112. (Jan. 1999).
Hinckley, "Synchronous Gestures for Multiple Persons and Computers", CHI Letters vol. 5 No. 2 (ACM 2003) & Proceedings of the 16th Annual ACM UIST 2003 Symposium on User Interface Software & Technology, at 149-58 (UIST'03 Vancouver BC Canada) (ACM) (Nov. 2003).
Hinckley, et al., "Sensing Techniques for Mobile Interaction," Proceedings of the 13th Annual ACM Symposium on User Interface Software and Technology (San Diego, Cal.), ACM UIST 2000 & Technology, CHI Letters 2 (2), at 91-100 (ACM) (2000).

(56) References Cited

OTHER PUBLICATIONS

Hinckley. et al. , "A Survey of Design Issues in Spatial Input," Proceedings of the ACM Symposium on User Interface Software and Technology (1994).

Hogue, "Marvin: A Mobile Automatic Realtime Visual and INertial tracking system," Master's Thesis, York University (2003).

Hogue, et al., "An optical-inertial tracking system for fully-enclosed VR displays," Proceedings of the 1st Canadian Conference on Computer and Robot Vision, pp. 22-29 (May 2004 ).

Hollands, Robin, "Sourceless Trackers," VR News (Apr. 1995).

Holloway, Richard Lee, "Registration Errors in Augmented Reality Systems," Ph.D. Dissertation, University of North Carolina at Chapel Hill (1995).

Hudson Soft, "Brochure of Toukon Road Brave Warrior, Brave Spirits" (1998).

Inman, "Cheap sensors could capture your every move," http://technology. newscientist.com/article/dn12963-cheap-sensors-could-capture-your-every-move.html (Nov. 2007 ).

InterSense, "InterSense InertiaCube2 Devices," (Specification) (image) (2001).

InterSense, "InterSense InertiaCube2 Manual for Serial Port Model" (2001).

InterSense, "InterSense IS-1200 FlightTracker Prototype Demonstration" (Video) (Nov. 2004).

InterSense, "InterSense IS-1200 InertiaHawk Datasheet" (2009).

InterSense, "InterSense IS-1200 VisTracker Datasheet" (2007).

InterSense, "InterSense IS-1200 VisTracker Devices," (image) (2007).

InterSense, "InterSense IS-900 MicroTraxTM Datasheet" (2007).

InterSense, "InterSense IS-900 Systems Datasheet" (2007).

InterSense, "InterSense MicroTrax Demo Reel," http://www.youtube.com/watch?v=O2F4fu__CISo (2007).

InterSense, "InterSense Mobile Mixed Reality Demonstration" (Video), http://www.youtube.com/watch?v=daVdzGK0nUE&feature=channel_page (Oct. 2006).

InterSense, "InterSense Motion Gaming Tech Demo," http://www.youtube.com/watch?v=7-3y5tdju4E, InterSense (Mar. 2008).

InterSense, "IS-1200 VisTracker Augmented Maintenance Demonstration" (Video), http://www.intersense.com/IS-1200 Systems.aspx, http://www.youtube.com/watch?v=IM178s91WQo&feature=channel_page (Jan. 2009).

InterSense, "IS-1200 VisTracker Industrial Cart Demonstration" (Video), InterSense http://www.intersense.com/IS-1200 Systems.aspx http://www.youtube.com/watch?v=7xKLCvDGMgY&feature=channel_page (Jan. 2008).

InterSense, "IS-900 Product Technology Brief," http://www.intersense.com/uploadedFiles/Products/White_Papers/IS900_Tech_Overview_Enhanced.pdf (1999).

InterSense, Inc., "Comparison of InterSense IS-900 System and Optical Systems," http://www.intersense.com/uploadedFiles/Products/White_Papers/Comparison%20of%20InterSense%20IS-900%20System%20and%20Optical%20Systems.pdf (Jul. 12, 2004).

Izumori et al, High School Algebra: Geometry (1986), 「高等学校の代数・幾何 改訂版」.

Jacob, "Human-Computer Interaction—Input Devices" http://www.cs.tufts.edu/~jacob/papers/surveys.html, "Human-Computer Interaction: Input Devices," ACM Computing Surveys, vol. 28, No. 1, pp. 177-179 (Mar. 1996).

Jakubowsk, et al., "Increasing Effectiveness of Human Hand Tremor Separation Process by Using Higher-Order Statistics," Measurement Science Review, vol. 1 (2001).

Jakubowski, et al., "Higher Order Statistics and Neural Network for Tremor Recognition," IEEE Transactions on Biomedical Engineering, vol. 49, No. 2 (Feb. 2002).

Jian, et al., "Adaptive Noise Cancellation," Rice University, http://www.ece.rice.edu/.about.klwang/elec434/elec434.htm, (Aug. 2007).

Jiang, "Capacitive position-sensing interface for micromachined inertial sensors," Dissertation at Univ. of Cal. Berkley (2003).

Ju, et al., "The Challenges of Designing a User Interface for Consumer Interactive Television Consumer Electronics Digest of Technical Papers.," IEEE 1994 International Conference on Volume , Issue , Jun. 21-23 1994 pp. 114-115 (Jun. 1994).

Keir, et al., "Gesture-recognition with Non-referenced Tracking," IEEE Symposium on 3D User Interfaces, pp. 151-158 (Mar. 25-26, 2006).

Kessler, et al., "The Simple Virtual Environment Library" (MIT Presence) (2000).

Kindratenko, "A Comparison of the Accuracy of an Electromagnetic and a Hybrid Ultrasound-Inertia Position Tracking System," MIT Presence, vol. 10, No. 6, Dec. 2001, 657-663 (2001).

Klein et al.,"Tightly Integrated Sensor Fusion for Robust Visual Tracking," British Machine Vision Computing, vol. 22, No. 10, pp. 769-776 (2004).

Kohlhase, "NASA Report, The Voyager Neptune travel guide," Jet Propulsion Laboratory Publication 89-24, excerpt (Jun. 1989).

Krumm, et al.,"How a Smart Environment Can Use Perception," Ubicomp 2001 (Sep. 2001).

Kuipers, Jack B., "SPASYN —An Electromagnetic Relative Position and Orientation Tracking System," IEEE Transactions on Instrumentation and Measurement, vol. 29, No. 4, pp. 462-466 (Dec. 1980).

La Scala, et al., "Design of an Extended Kalman Filter Frequency Tracker," IEEE Transactions on Signal Processing, vol. 44, No. 3 (Mar. 1996).

Larimer et al., "VEWL: A Framework for building a Windowing Interface in a Virtual Environment," in Proc. of IFIP TC13 Int. Conf. on Human-Computer Interaction Interact'2003 (Zürich, http://people.cs.vt.edu/~bowman/papers/VEWL_final.pdf (2003).

Laughlin, et al., "Inertial Angular Rate Sensors: Theory and Applications," SENSORS Magazine (Oct. 1992).

Lee et al., "Tilta-Pointer: The Free-Space Pointing Device," Princeton COS 436 Project, http://www.milyehuang.com/cos436/project/specs.html (2004).

Lee, et al., "Innovative Estimation Method with Measurement Likelihood for all-Accelerometer Type Inertial Navigation System," IEE Transactions on Aerospace and Electronic Systems, vol. 38, No. 1 (Jan. 2002).

Lee, et al., "Two-Dimensional Position Detection System with MEMS Accelerometer for Mouse Applications" Design Automation Conference, 2001. Proceedings, 2001 pp. 852-857 (Jun. 2001).

Leonard, "Computer Pointer Controls 3D Images in Free Space," Electronic Design, pp. 160, 162, 165 , (Nov. 1991).

Liang, et al., "On Temporal-Spatial Realism in the Virtual Reality Environment," ACM 1991 Symposium on User Interface Software and Technology (Nov. 1991).

Link, "Field-Qualified Silicon Accelerometers From 1 Milli g to 200,000 g," SENSORS (Mar. 1993).

Liu, et al., "Enhanced Fisher Linear Discriminant Models for Face Recognition," Proc. 14.sup.th International Conference on Pattern Recognition, Queensland, Australia (Aug. 1998).

Lobo et al., "Vision and Inertial Sensor Cooperation Using Gravity as a Vertical Reference," IEEE Trans. on Pattern Analysis and Machine Intelligence, vol. 25, No. 12, pp. 1597-1608 (Dec. 2003).

Logitech, Logitech 2D/6D Mouse Devices Specification (1991).

Logitech, "Logitech 2D/6D Mouse Technical Reference Manual" (1991).

Logitech, "Logitech Tracker—Virtual Reality Motion Tracker." http://www.vrealities.com/logitech.html.

Logitech, Inc., "3D Mouse & Head Tracker Technical Reference Manual" (1992).

Luinge, Inertial sensing of human movement, Thesis, University of Twente (2002).

Luinge, et al., "Estimation of orientation with gyroscopes and accelerometers," Proceedings of the First Joint BMES/EMBS Conference, 1999., vol. 2, p. 844 (Oct. 1999).

Luthi, P. et al., "Low Cost Inertial Navigation System," and translation (2000 ).

(56) References Cited

OTHER PUBLICATIONS

Mackenzie et al., "A two-ball mouse affords three degrees of freedom," Extended Abstracts of the CHI '97 Conference on Human Factors in Computing Systems, pp. 303-304. New York: ACM (1997).
Mackinlay, "Rapid Controlled Movement Through a Virtual 3D Workspace," ACM SIGGRAPH Computer Graphics archive, vol. 24, No. 4, pp. 171-176 (Aug. 1990).
MaClean, "Designing with Haptic Feedback", Proceedings of IEEE Robotics and Automation (ICRA '2000, at 783-88 (Apr. 22-28, 2000).
Masliah, "Measuring the Allocation of Control in 6 Degree of Freedom Human-Computer Interaction Tasks," Proceedings of the SIGCHI conference on Human factors in computing systems, pp. 25-32 (2001).
Maybeck, "Stochastic Models, Estimation and Control," vol. 1, Mathematics in Science and Engineering, vol. 141 (1979).
Merrill, "FlexiGesture: A sensor-rich real-time adaptive gesture and affordance learning platform for electronic music control," Thesis, Massachusetts Institute of Technology (Jun. 2004).
Meyer et al., "A Survey of Position Tracker," vol. 1, Issue 2, pp. 173-200, MIT Presence, (1992).
Microsoft Research Corp., "XWand Devices" (image).
Miles, "New pads lack control," The Times, Dec. 6, 1999 (Dec. 1999).
Mizell, "Using Gravity to Estimate Accelerometer Orientation," IEEE Computer Society (2003).
Morris, "Accelerometry—a technique for the measurement of human body movements," J Biomechanics 6: 729-736 (1973).
Mulder, "How to Build an Instrumental Glove Based on the Powerglove Flex Sensors," PCVR 16, pp. 10-14 (1994).
Mulder, "Human movement tracking technology," School of Kinesiology, Simon Fraser University (Jul. 1994).
Myers, et al., "Interacting at a Distance: Measuring the Performance of Laser Pointers and Other Devices," CHI 2002, (Apr. 2002).
N. I.C.E., "The N.I.C.E. Project" (video), http://www.niceproject.com/about/ (1997).
Naimark, et al., "Circular Data Matrix Fiducial System and Robust Image Processing for a Wearable Vision-Inertial Self-Tracker," Proceedings. International Symposium on Mixed and Augmented Reality, ISMAR (2002).
Naimark, et al., "Encoded LED System for Optical Trackers," Fourth IEEE and ACM International Symposium on Mixed and Augmented Reality, pp. 150-153 (2005).
Navarrete, et al., "Eigenspace-based Recognition of Faces: Comparisons and a new Approach," Image Analysis and Processing (2001).
Newswire PR, "Five New Retailers to Carry Gyration's Gyropoint Point and Gyropoint Pro" (1996).
Newswire PR, "Three-Axis MEMS-based Accelerometer From STMicroelectronics Targets Handheld Terminals," STMicro (Feb. 2003).
Nichols, "Geospatial Registration of Information for Dismounted Soldiers (GRIDS)," Contractor's Progress, Status, and Management Report (Milestone 3 Report to DARPA ETO) (Oct. 1998).
Nintendo, Nintendo Entertainment System (NES) (1984).
Nintendo, NES System and Controllers (1984).
Nintendo, NES Controller (1984).
Nintendo, NES Zapper Guns (1984).
Nintendo, NES Duck Hunt Game (1984).
Nintendo, Nintendo GameBoy System (1989).
Nintendo, Nintendo Super NES (SNES) (1991).
Nintendo, SNES System & Controllers (1991).
Nintendo, SNES Superscope (1991).
Nintendo, Nintendo 64 System (N64) (1996).
Nintendo, Nintendo 64 System and Controllers (1996).
Nintendo, Nintendo 64 Controller (1996).
Nintendo, Nintendo N64 Controller with Rumble Pack (1996-1997).
Nintendo, Nintendo N64 Rumble Packs (1996-1997).
Nintendo, Nintendo GameBoy Color System (1998).
Nintendo, GameBoy Color (1998).
Nintendo, Nintendo: Kirby Tilt & Tumble game, packaging and user manual (Aug. 2000-2001).
Nintendo, Pokemon Pinball (1998).
Nintendo, Nintendo Game Boy Advance System (2001).
Nintendo, Nintendo Game Boy Advance (2001).
Nintendo, Nintendo: WarioWare: Twisted game, packaging and user manual (2004-2005).
Nintendo, Nintendo Game Boy Advance Wireless Adapter (Sep. 26, 2003).
Nintendo, Nintendo GameCube System (2001).
Nintendo, GameCube System and Controller (2001).
Nintendo, GameCube Controller (2001).
Nintendo, Wavebird Wireless Controllers (May 2002).
Nintendo, G3 Wireless Controller (Pelican) (2001).
Nintendo, Game Boy Advance SP System (2003).
Nintendo, Nintendo Game Boy Color Game Cartridge with Built-In Rumble (Jun. 28, 2009).
Nishiyama, "A Nonlinear Filter for Estimating a Sinusoidal Signal and its Parameters in White Noise: On the Case of a Single Sinusoid," IEEE Transactions on Signal Processing, vol. 45, No. 4 (Apr. 1997).
Nishiyama, "Robust Estimation of a Single Complex Sinusoid in White Noise-H.infin. Filtering Approach," IEEE Transactions on Signal Processing, vol. 47, No. 10 (Oct. 1999).
Odell, Transcript of Testimony, Investigation No. 337-TA-658, Before the United States International Trade Commission, vol. IV, redacted (May 14, 2009).
Ojeda, et al., "No GPS? No Problem!" University of Michigan Develops Award-Winning Personal Dead-Reackoning (PDR) System for Walking Users, http://www.engin.umich.edu/research/mrl/urpr/In_Press/P135.pdf (post 2004).
Omelyan, "On the numerical integration of motion for rigid polyatomics: The modified quaternion approach" Computers in Physics, vol. 12 No. 1, pp. 97-103 (1998).
Ovaska, "Angular Acceleration Measurement: A Review," Instrumentation and Measurement Technology Conference, Conference Proceedings. IEEE, vol. 2 (Oct. 1998).
Pai, et al., "The Tango: A Tangible Tangoreceptive Whole-Hand Interface," Proceedings of World Haptics and IEEE Eurohaptics Conference, Symposium on Haptic Interfaces for Virtual Environment and Teleoperator Systems (2005).
Paradiso, et al., "Interactive Therapy with Instrumented Footwear," CHI 2004, Apr. 24-29, 2004, Vienna, Austria (2004).
Park, Adaptive control strategies for MEMS gyroscopes (Dissertation), Univ. Cal. Berkley (2000).
PCTRACKER, Product Technology Brief, at http://www.intersense.com/uploadedFiles/Products/White_Papers/PCTracker_Tech_Overview.pdf.
Pelican Accessories G3 Wireless Controller (Sep. 6, 2002).
Perforce, Perforce Controller (image).
Pham, Hubert, "Pointing in Intelligent Environments with the WorldCursor," Proceedings of Interact 2003, Andrew Wilson & (2003).
Phillips, "Forward/Up Directional Incompatibilities During Cursor Placement Within Graphical User Interfaces," Ergonomics, informaworld.com (May 2005).
Phillips, "On the Right Track: A unique optical tracking system gives users greater freedom to explore virtual worlds" (Apr 2000).
Pierce et al., "Image Plane Interaction Techniques in 3D Immersive Environments," Proceedings of the 1997 symposium on Interactive 3D graphics, portal.acm.org (1997).
Pilcher, "AirMouse Remote Controls," IEEE Conference on Consumer Electronics (1992).
Pique, "Semantics of Interactive Rotations," Interactive 3D Graphics, Proceedings of the 1986 workshop on Interactive 3D graphics, pp. 259-269 (Oct. 1986).
Piyabongkarn, "Development of a MEMS Gyroscope for Absolute Angle Measurement," IEEE Transactions on Control Systems Technology, vol. 13, Issue 2, pp. 185-195 (Mar. 2005).
Piyabongkarn, "Development of a MEMS Gyroscope for Absolute Angle Measurement," Dissertation, Univ. Minnesota (Nov. 2004).
Polhemus, "Polhemus 3SPACE FASTRAK devices" (image) (2000).

(56) References Cited

OTHER PUBLICATIONS

Pryor et al., "A Reusable Software Architecture for Manual Controller Integration," IEEE Conf. on Robotics and Automation, Univ of Texas (Apr. 1997).
Raab, et al., "Magnetic Position and Orientation Tracking System," IEEE Transactions on Aerospace and Electronic Systems, vol. AES-15, No. 5, pp. 709-718 (Sep. 1979).
Raethjen, et al., "Tremor Analysis in Two Normal Cohorts," Clinical Neurophysiology 115 (2004).
Rebo, "Helmet-mounted virtual environment display system," Thesis, Air Force Institute of Technology, Defense Technical Information Center (Dec. 1988).
Rebo, et al., "Helmet-Mounted Virtual Environment Display System," Proc. SPIE vol. 1116, pp. 80-84 (Sep. 1989).
Rekimoto, "Tilting Operations for Small Screen Interfaces," Proceedings of the 9th Annual ACM Symposium on User Interface Software and Technology, pp. 167-168 (1996).
Reunert, "Fiber-Optic Gyroscopes: Principles and Applications," SENSORS, (Aug. 1993).
Ribo, et al., "Hybrid Tracking for Outdoor Augmented Reality Applications," IEEE Computer Graphics and Applications, vol. 22, No. 6, pp. 54-63 (Nov./Dec. 2002).
Riviere, C., Robotics Institute, http://www.ri.cmu.edu/people/riviere.sub.--cameron.html http://www.ri.cmu.edu/person.html?type=publications&person_id=248 (Aug. 2007).
Riviere, et al., "Adaptive Canceling of Physiological Tremor for Improved Precision in Microsurgery," IEEE Transactions on Biomedical Engineering, vol. 45, No. 7 (Jul. 1998).
Riviere, et al., "Toward Active Tremor Canceling in Handheld Microsurgical Instruments," IEEE Transactions on Robotics and Automation, vol. 19, No. 5 (Oct. 2003).
Robbinett et al., "Implementation of Flying, Scaling, and Grabbing in Virtual Worlds," ACM Symposium (1992).
Roberts, "The Lincoln Wand," AFIPS Conference Proceedings, MIT Lincoln Laboratory (1966).
Robinett et al., "The Visual Display Transformation for Virtual Reality," University of North Carolina at Chapel Hill (1994).
Roetenberg, "Inertial and magnetic sensing of human motion," Thesis (2006).
Roetenberg, et al., "Inertial and Magnetic Sensing of Human Movement Near Ferromagnetic Materials," Proceedings. The Second IEEE and ACM International Symposium on Mixed and Augmented Reality (Mar. 2003).
Rolland, et al., "A Survey of Tracking Technology for Virtual Environments," University of Central Florida, Center for Research and Education in Optics Lasers (CREOL) (2001).
Sakai, et al., "Optical Spatial Filter Sensor for Ground Speed," Optical Review, vol. 2, No. 1 pp. 65-67 (1994).
Saxena et al., "In Use Parameter Estimation of Inertial Sensors by Detecting Multilevel Quasi-Static States," Lecture Notes in Computer Science, 2005—Berlin: Springer-Verlag, (Apr. 2004).
Sayed, "A Framework for State-Space Estimation with Uncertain Models," IEEE Transactions on Automatic Control, vol. 46, No. 7 (Jul. 2001).
Sayed, UCLA Adaptive Systems Laboratory-Home Page, UCLA, http://asl.ee.ucla.edu/index.php?option=com.sub.--frontpage&Itemid=1 (Aug. 2007).
Schofield, Jack et al., Coming up for airpad, The Guardian (Feb. 2000).
Screen Shot of Brave Spirits (1998).
Selectech, "AirMouse Remote Controls, AirMouse Remote Control Warrant" (1991).
Selectech, Software, "AirMouse for DOS and Windows IBM & Compatibles," "AirMouse Remote Control B0100EN-C, Amiga Driver, CDTV Driver, Version: 1.00," "AirMouse Remote Control B0100EM-C.1, Apple Macintosh Serial Driver Version: 1.00 (1.01B)," "AirMouse Remote Control B0100EL-B/3.05 DOS Driver Version: 3.0, Windows Driver Version 1.00," AirMouse Remote Control MS-DOS Driver Version: 3.00/3.05, Windows 3.0 Driver Version: 1.00 (1991).
Seoul National Univ., "EMMU System"—Seoul National Univ Power Point Presentation, www.computer.org/portal/cms_docs_ieeecs/ieeecs/education/csidc/CSIDC03Presentations/SNU.ppt (2003).
Shoemake, Ken, Quaternions, UPenn, Online.
Simon, et al. "The YoYo: A Handheld Combining Elastic and Isotonic Input," http://www.uni-weimar.de/cms/fileadmin/medien/vr/documents/publications/TheYoYo-Interact2003-Talk.pdf (2003).
Simon, et al., "The YoYo: A Handheld Device Combining Elastic and Isotonic Input," Human-Computer Interaction—Interact'03, pp. 303-310 (2003).
Smith, "Gyrevolution: Orienting the Digital Era," http://www.gyration.com/images/pdfs/Gyration_White_Paper.pdf (2007).
Sorenson, et al., "The Minnesota Scanner: A Prototype Sensor for Three-Dimensional Tracking of Moving Body Segments," IEEE Transactions on Robotics and Animation (Aug. 1989).
sourceforge.com, "ARToolkit API Documentation" (SourceForge web pages) (2004-2006).
Stovall, "Basic Inertial Navigation," NAWCWPNS TM 8128, Navigation and Data Link Section, Systems Integration Branch (Sep. 1997).
Sutherland, "A Head-Mounted Three Dimensional Display," AFIPS '68 (Fall, part I): Proceedings of the Dec. 9-11, 1968, fall joint computer conference, part I, pp. 757-764 (Dec. 1968).
Sutherland, Ivan E., "Sketchpad: A Man-Machine Graphical Communication System," AFIPS '63 (Spring): Proceedings of the May 21-23, 1963, Spring Joint Computer Conference, pp. 329-346 (May 1963).
Sweetster, "A Quaternion Algebra Tool Set," http://world.std.com/%7Esweetser/quaternions/intro/tools/tools.html (Jun. 2005).
Thinkoptics, Thinkoptics Wavit devices (image) (2007).
Timmer, "Data Analysis and Modeling Dynamic Processes in the Life Sciences," Freiburg Center for Data Analysis and Modeling, http://webber.physik.uni-freiburg.de/.about.jeti/ (Aug. 2007).
Timmer, "Modeling Noisy Time Series: Physiological Tremor," International Journal of Bifurcation and Chaos, vol. 8, No. 7 (1998).
Timmer, et al, "Pathological Tremors: Deterministic Chaos or Nonlinear Stochastic Oscillators?" Chaos, vol. 10, No. 1 (Mar. 2000).
Timmer, et al., "Characteristics of Hand Tremor Time Series," Biological Cybernetics, vol. 70 (1993).
TImmer, et al., Cross-Spectral Analysis of Physiological Tremor and Muscle Activity: II Application to Synchronized Electromyogram, Biological Cybernetics, vol. 78 (1998).
Timmer, et al., "Cross-Spectral Analysis of Tremor Time Series," International Journal of Bifurcation and Chaos, vol. 10, No. 11 (2000).
Titterton et al., "Strapdown Inertial Navigation Technology," pp. 1-56 and pp. 292-321 (May 1997).
Tokimec, et al., "A Wearable Attitude-Measurement System Using a Fiberoptic Gyroscope," MIT Presence (Apr. 2002).
UNC Computer Science Department, "News & Notes from Sitterson Hall," UNC Computer Science, Department Newsletter, Issue 24, Spring 1999 (Apr. 1999).
Univ. Illinois at Chicago, "CAVE—A Virtual Reality Theater," http://www.youtube.com/watch?v=-Sf6bJjwSCE 1993.
Univ. Wash., "ARToolkit" (U. Wash. web pages) (1999).
Urban, "BAA 96-37 Proposer Information," DARPA/ETO (1996).
US Dynamics Corp, "Spinning Mass Mechanical Gyroscopes" (Aug. 2006).
US Dynamics Corp, "The Concept of 'Rate' (more particularly, angular rate pertaining to rate gyroscopes) (rate gyro explaination)," (Aug. 2006).
US Dynamics Corp, "US Dynamics Model 475 Series Rate Gyroscope Technical Brief—brief discussion on rate gyroscope basics, operation, and uses, and a dissection of the model by major component" (Dec. 2005).
US Dynamics Corp, "US Dynamics Rate Gyroscope Interface Brief (rate gyro IO)" (Aug. 2006).
Van Den Bogaard, "Using linear filters for real-time smoothing of rotational data in virtual reality application," http://www.science.uva.nl/research/ias/alumni/m.sc.theses/theses/RobvandenBogaard.pdf (Aug. 2004).

(56) References Cited

OTHER PUBLICATIONS

Van Laerhoven, et al., "Using an Autonomous Cube for Basic Navigation and Input," Proceedings of the 5th International Conference on Multimodal Interfaces, Vancouver, British Columbia, Canada, pp. 203-210 (2003).
Van Rheeden, et al., "Noise Effects on Centroid Tracker Aim Point Estimation," IEEE Trans. on Aerospace and Electronic Systems, vol. 24, No. 2, pp. 177-185 (Mar. 1988).
Vaz, et al., "An Adaptive Estimation of Periodic Signals Using a Fourier Linear Combiner," IEEE Transactions on Signal Processing, vol. 42, Issue 1, pp. 1-10 (Jan. 1994).
Verplaetse, "Inertial Proprioceptive Devices: Self-Motion Sensing Toys and Tools," IBM Systems Journal (Sep. 1996).
Verplaetse, "Inertial-Optical Motion-Estimating Camera for Electronic Cinematography," Masters of Science Thesis, MIT, (1997).
Vorozcovs, et al.,"The Hedgehog: A Novel Optical Tracking Method for Spatially Immersive Displays," MIT Presence, vol. 15, No. 1, pp. 108-121 (2006).
Wang, et al., "Tracking a Head-Mounted Display in a Room-Sized Environment with Head-Mounted Cameras," SPIE 1990 Technical Symposium on Optical Engineering and Photonics in Aerospace Sensing, vol. 1290, pp. 47-57 (1990).
Ward, et al., "A Demonstrated Optical Tracker With Scalable Work Area for Head-Mounted Display Systems," Symposium on Interactive 3D Graphics, Proceedings of the 1992 Symposium on Interactive 3D Graphics, pp. 43-52, ACM Press, Cambridge, MA (1992).
Watt, *3D Computer Graphics*, "Three-Dimensional Geometry in Computer Graphics,", pp. 1-22 Addison-Wesley (1999).
Welch et al., "HiBall-3100™ Wide-Area, High-Precision Tracker and 3D Digitizer," http://www.3rdtech.com/HiBall.htm (2002-2006).
Welch et al., HiBall Devices (image) (2002-2006).
Welch et al., Motion Tracking: No Silver Bullet, but a Respectable Arsenal IEEE Computer Graphics and Applications, vol. 22, No. 6, pp. 24-38 (Nov. 2002).
Welch, "Hybrid Self-Tracker: An Inertial/Optical Hybrid Three-Dimensional Tracking System," Tech. Report TR95-048, Dissertation Proposal, Univ. of North Carolina at Chapel Hill, Dept. Computer Science, Chapel Hill, N.C. (1995).
Welch, "A Self-Contained Wide-Area Tracker Using Sensor Fusion" (2001).
Welch, "Hawkeye Zooms in on Mac Screens with Wireless Infrared Penlight Pointer," MacWeek (May 1993).
Welch, et al., "Complementary Tracking and Two-Handed Interaction for Remote 3D Medical Consultation with a PDA," Proceedings of Trends and Issues in Tracking for Virtual Environments, Workshop at the IEEE Virtual Reality 2007 Conference (Mar. 2007).
Welch, et al., "High-Performance Wide-Area Optical Tracking: The HiBall Tracking System," MIT Presence: Teleoperators & Virtual Environments (2001).
Welch, et al., "SCAAT: Incremental Tracking with Incomplete Information," Computer Graphics, SIGGRAPH 97 Conference Proceedings, pp. 333-344 (Aug. 1997).
Welch, et al., "Source Code for HiBall+Inerital device," UNC-CH Computer Science (Jun. 1998).
Welch, et al., "The HiBall Tracker: High-Performance Wide-Area Tracking for Virtual and Augmented Environments," ACM SIGGRAPH, Addison-Wesley (1999).
Welch, et al., "The High-Performance Wide-Area Optical Tracking : The HiBall Tracking System," MIT Presence, Presence, vol. 10 , No. 1 (Feb. 2001).
Welch, et al., "Tracking for Training in Virtual Environments: Estimating the Pose of People and Devices for Simulation and Assessment," [J. Cohn, D. Nicholson, and D. Schmorrow, editors, The PSI Handbook of Virtual Environments for Training and Education: Developments for the Military and Beyond, Chap.1, pp. 23-47] (2008).
Widrow, et al., "Fundamental Relations Between the LMS Algorithm and the DFT" IEEE Transactions on Circuits and Systems, vol. 34, No. CAS-7, (Jul. 1987).
Williams, et al., "Physical Presence: Palettes in Virtual Spaces," Society of Photo-Optical Instrumentation Engineers (SPIE) Conference Series, vol. 3639, No. 374-384 (May 1999).
Wilson, "XWand: UI for Intelligent Environments," http://research.microsoft.com/en-us/um/people/awilson/wand/default.htm (Apr. 2004).
Wilson, et al., "Demonstration of the XWand Interface for Intelligent Spaces," UIST '02 Companion, pp. 37-38 (Oct. 2002).
Wilson, et al., "Gesture Recognition Using the Xwand," ri.cmu.edu (2004).
Wilson, et al., "Xwand: UI for Intelligent Spaces," CHI 2003, Proceedings of the SIGCHI conference on Human factors in computing systems, pp. 545-552 (Apr. 2003).
Wlson, XWand video, http://research.microsoft.com/~awilson/wand/wand%20video%20768k.WMV, (Mar. 2002).
Wormell, "Unified Camera, Content and Talent Tracking in Digital Television and Movie Production," InterSense, Inc. & Mark Read, Hypercube Media Concepts, Inc. Presented: NAB 2000, Las Vegas, NV, Apr. 8-13, (2000).
Wormell, et al., "Advancements In 3D Interactive Devices for Virtual Environments," ACM International Conference Proceeding Series; vol. 39 (2003).
Worringham, et al., "Directional Stimulus-Response Compatibility: A Test of Three Alternative Principles," Ergonomics, vol. 41, Issue 6, pp. 864-880 (Jun. 1998).
Worringham, et al., "Tablet-PC Classroom System Wins Design Competition," Computer, vol. 36, No. 8, pp. 15-18 (Aug. 2003).
Yang, et al., "Implementation and Evaluation of 'Just Follow Me': An Immersive, VR-Based, Motion-Training System," MIT Presence: Teleoperators and Virtual Environments, vol. 11 No. 3, at 304-23 (MIT Press) (Jun. 2002).
You, et al., "Hybrid Inertial and Vision Tracking for Augmented Reality Registration," http://graphics.usc.edu/cgit/pdf/papers/Vr1999.PDF (1999).
You, et al., "Orientation Tracking for Outdoor Augmented Reality Registration," IEE Computer Graphics and Applications, IEEE, vol. 19, No. 6, pp. 36-42 (Nov. 1999).
Youngblut, et al., "Review of Virtual Environment Interface Technology," Institute for Defense Analyses (Jul. 1996).
Yun, et al., "Recent Developments in Silicon Microaccelerometers," SENSORS, University of California at Berkeley (Oct. 1992).
Zhai, "Human Performance in Six Degree of Freedom Input Control," Thesis, University of Toronto (1995).
Zhou, et al., "A survey—Human Movement Tracking and Stroke Rehabilitation," Technical Report: CSM-420, ISSN 1744-8050, Dept. of Computer Sciences, University of Essex, UK (Dec. 8, 2004).
Zhu, et al., "A Real-Time Articulated Human Motion Tracking Using Tri-Axis Inertial/Magnetic Sensors Package," IEEE Transactions on Neural Systems and Rehabilitation Engineering, vol. 12, No. 2 (Jun. 2004).
Office Action issued in related Chinese patent application No. 200610111559.7 (Sep. 18, 2009).
Cyberglove/Cyberforce, Immersion, Cyberforce CyberGlove Systems "Immersion Ships New Wireless CyberGlove(R) II Hand Motion-Capture Glove; Animators, Designers, and Researchers Gain Enhanced Efficiency and Realism for Animation, Digital Prototyping and Virtual Reality Projects," Business Wire, Dec. 7, 2005.
Ewalt, David M., "Nintendo's Wii Is a Revolution," Review, Forbes.com (Nov. 13, 2006).
Foxlin IS-900 Motion Tracking System, Technical Overview, 10 pages, intersense.com, 1999.
Frankie, "E3 2002: Roll O Rama", GN: Roll-o-Rama Preview, . 3 pages. E3 Demo of Kirby game ("Roll O Rama"), http://cube.ign.com/objects/482/482164.html, (May 23, 2002).
Goschy, "Midway Velocity Controller" (youtube video http://www.youtube.com/watch?v=wjLhSrSxFNw) (Sep. 8, 2007).
Hartley, Matt, "Why is the Nintendo Wii So Successful?", SmartHouse—The Lifestyle Technology Guide Website (Sep. 12, 2007).
Hinckley, Ken, "Haptic Issues for Virtual Manipulation," Thesis (Dec. 1996).
Interview with Pat Goschy (youtube video http://www.youtube.com/watch?v=oKtZysYGDLE) (Jan. 14, 2008).

(56) References Cited

OTHER PUBLICATIONS

Kohler, Chris, "Triumph of the Wii: How Fun Won out in the Cossole Wars," WIRED (Jun. 11, 2007).
Kunz, Andreas M. et al., "Design and Construction of a New Haptic Interface," Proceedings of DETC'00, ASME 2000 Design Engineering Technical Conferences and Computers and Information in Engineering Conference, Baltimore, Maryland (Sep. 10-13, 2000).
Louderback, Jim, "Nintendo Wii," Reviews by PC Magazine, (Nov. 13, 2006).
Marrin, Teresa, "Possibilities for the Digital Baton as a General-Purpose Gestural Interface," Late-Breaking/Short Talks, CHI 97 (122-27 Mar. 1997).
Marti, Gaetan et al., "Biopsy navigator: a smart haptic interface for interventional radiological gestures," Swiss Federal Institute of Technology (EPFL), Lausanne, Switzerland (2003).
Mattel Power Glove Instructions, Licensed by Nintendo for play on Nintendo Entertainment System (1989).
Office Action issued in related Japanese patent application 2006-216569 (Oct. 20, 2009).
Ogawa et al., "Wii are the Elite," GameSpot web site (Feb. 5, 2008).
Paley, W. Bradford, "Interaction in 3D Graphics," SIGGRAPH Computer Graphics Newsletter, Cricket input device (Nov. 1998).
PC World, "The 20 Most Innovative Products of the Year" (Dec. 27, 2006).
Press Release, "Logitech's Wingman Cordless RumblePad Sets PC Gamers Free," http://www.logitech.com/index.cfm/172/1373&cl=nz,en (Sep. 2, 2001).
Riviere, Cameron, Testimony, Trial Day 5, in the Matter of Certain Video Game Machines and Related Three-Dimensional Pointing Devices, ITC Investigation No. 337-TA-658 (May 15, 2009).
Sulic, Ivan, "Logitech Wingman Cordless Rumblepad Review", Review at IGN, 4 pages, Jan. 14, 2002.
TRAQ 3D (Trazer) Product, http://www.exergamefitness.com/traq_3d.htm, http://www.trazer.com/, http://www.traq3d.com/ (1997).
Ulanoff, Lance, "Nintendo's Wii is the Best Product Ever," PC Magazine (Jun. 21, 2007).
Williams, Robert L. et al., "Implementation and Evaluation of a Haptic Playback System," vol. 3 No. 3, Haptics-e (2004).
Williams, Robert L. et al., "The Virtual Haptic Back Project," Presented at the Image 2003 Conference, Scottsdale, Arizong (Jul. 14-18, 2003).
Briefs. (New & Improved) (Brief Article), PC Magazine, Oct. 26, 1993.
Foremski, T. "Remote Control Mouse Aims At Interactive TV", Electronics Weekly, Mar. 9, 1994.
Gelmis, J.; "Ready to Play, the Future Way", Jul. 23, 1996, Buffalo News.
Ji, H. "Study on the infrared remote-control lamp-gesture device", Yingyong Jiguang/Applied Laser Technology, v 17, n. 5, p. 225-227, Oct. 1997 Language: Chinese-Abstract only.
Maggioni, C., "A novel gestural input device for virtual reality", IEEE Virtual Reality Annual International Symposium (Cat. No. 93CH3336-5), 118-24, 1993.
Morgan, C.; "Still chained to the overhead projector instead of the podium? (TV Interactive Corp's LaserMouse Remote Pro infrared mouse) (Clipboard)(Brief Article) (Product Announcement)", Government Computer News, Jun. 13, 1994.

Templeman, James N., "Virtual Locomotion: Walking in Place through Virtual Environments," Presence, vol. 8 No. 6, pp. 598-617, Dec. 1999.
Office Action issued in commonly assigned copending U.S. Appl. No. 12/222,787, Feb. 5, 2010.
Sega/Sports Sciences Inc., "Batter Up, It's a Hit," Instruction Manual, Optional Equipment Manual (1994).
Sega/Sports Sciences Inc., "Batter Up, It's a Hit," photos of baseball bat (1994).
U.S. Appl. No. 11/745,842, filed May 2007, Ashida et al.
AirPad Controller Manual (AirPad Corp. 2000).
Physical Product: Airpad Motion Reflex Controller for Sony Playstation, (AirPad Corp. 2000).
Office Action in commonly assigned copending U.S. Appl. No. 11/404,844 (Oct. 6, 2010).
Third Party Opposition submitted in counterpart EP Application No. EP 1 854 518 (Sep. 2, 2010).
PAD—Controller and Memory I/F in PlayStation (Apr. 17, 1995).
Game Controller (Wikipedia) (May 1, 2005).
Computer Mouse (Wikipedia) (May 7, 2005).
Transmission Mode (Apr. 22, 1999).
Serial Communication (Wikipedia) Jul. 2, 2005).
Wireless (Wikipedia) (Aug. 1, 2005).
Office Action in corresponding Japanese Patent Application (Sep. 9, 2010).
Translation of JP2005-063230 (previously submitted with translation of abstract only) (Mar. 2005).
European Examination Report issued in EP Application No. 10176870.3 on Aug. 9, 2011.
You et al., Fusion of Vision and Gyro Tracking for Robust Augmented Reality Registration, Proceedings of the Virtual Reality 2001 Conference, 2001, 1-8.
Office Action issued in Taiwanese Patent Appl No. 10021121610 on Dec. 14, 2011.
Office Action/Search Report issued in Taiwanese Patent Appl No. 10021121610 on Dec. 14, 2011.
Cancellation Request of BigBen against German utility model 20 2006 020 818 (UM1) (Oct. 15, 2010) and translation.
Cancellation Request of BigBen against German utility model 20 2006 020 819 (UM2) (Oct. 15, 2010) and translation.
Cancellation Request of BigBen against German utility model 20 2006 020 820 (UM3) (Oct. 15, 2010) and translation.
Brief of System Conn 99 (Oct. 27, 2010) and translation.
Brief of BigBen Oct. 27, 2010 and translation.
Buxton, et al, "A Study in Two-Handed Input," ACM CHI'86 Proceedings (1986).
Leganchuk, et al, "Manual and Cognitive Benefits of Two-Handed Input: An Experimental Study," ACM Transactions on Computer-Human Interaction vol. 5, No. 4, pp. 326-359 (Dec. 1998).
Japanese Office Action, "Notice of Reasons for Rejections", issued Sep. 9, 2010 for corresponding Japanese Patent Application No. 2008-250858, 3 pages.
Extended European Search Report EP10 17 8309 ((Feb. 4, 2011).
Office Action, JP Application No. 2008-256858 (Apr. 22, 2011).
European Communication for Application No. 10178309.0, dated Oct. 25, 2012.
Notice of Allowance and Fee(s) Due dated Apr. 15, 2014, issued in related U.S. Appl. No. 12/285,812.

\* cited by examiner

F I G. 2
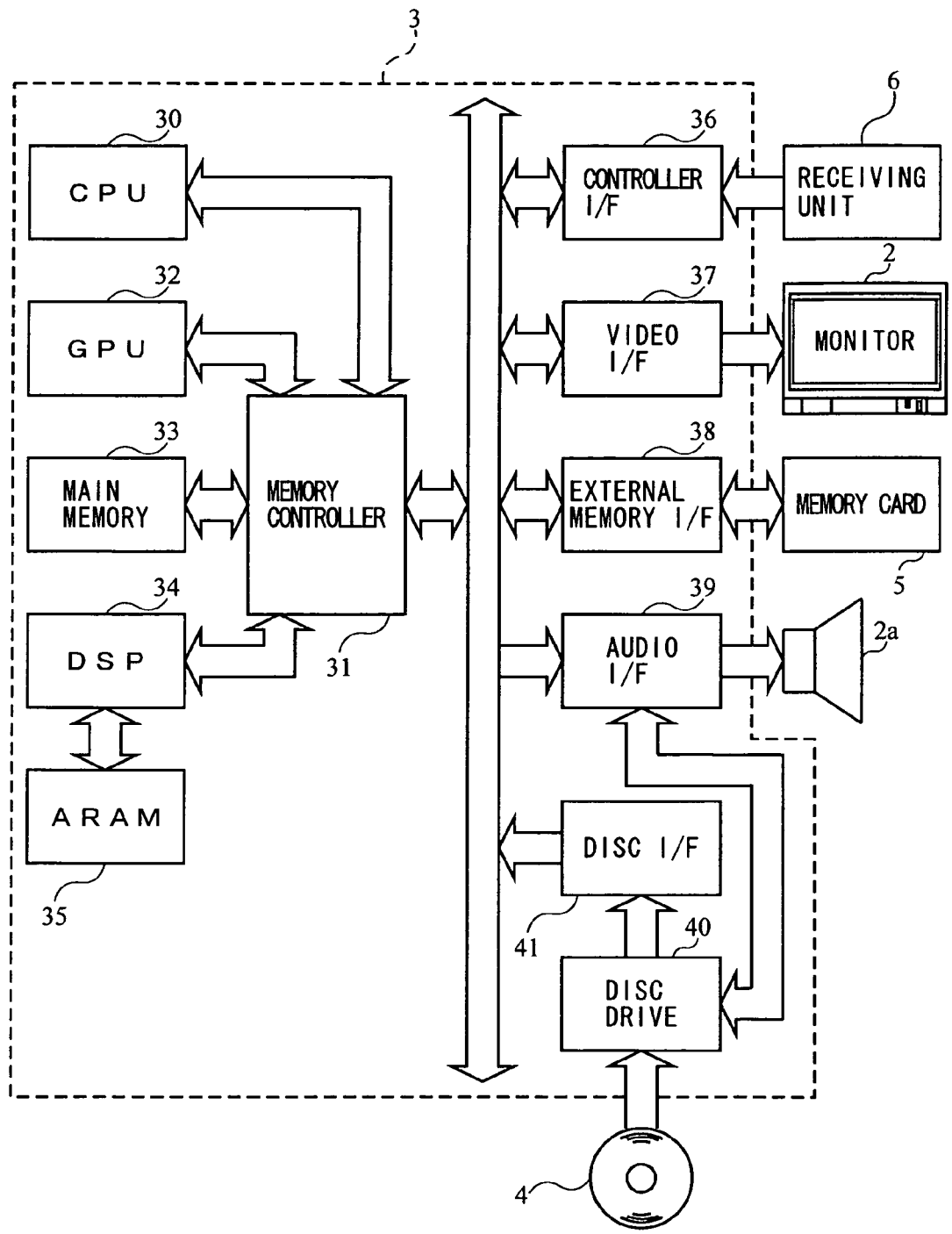

F I G. 5
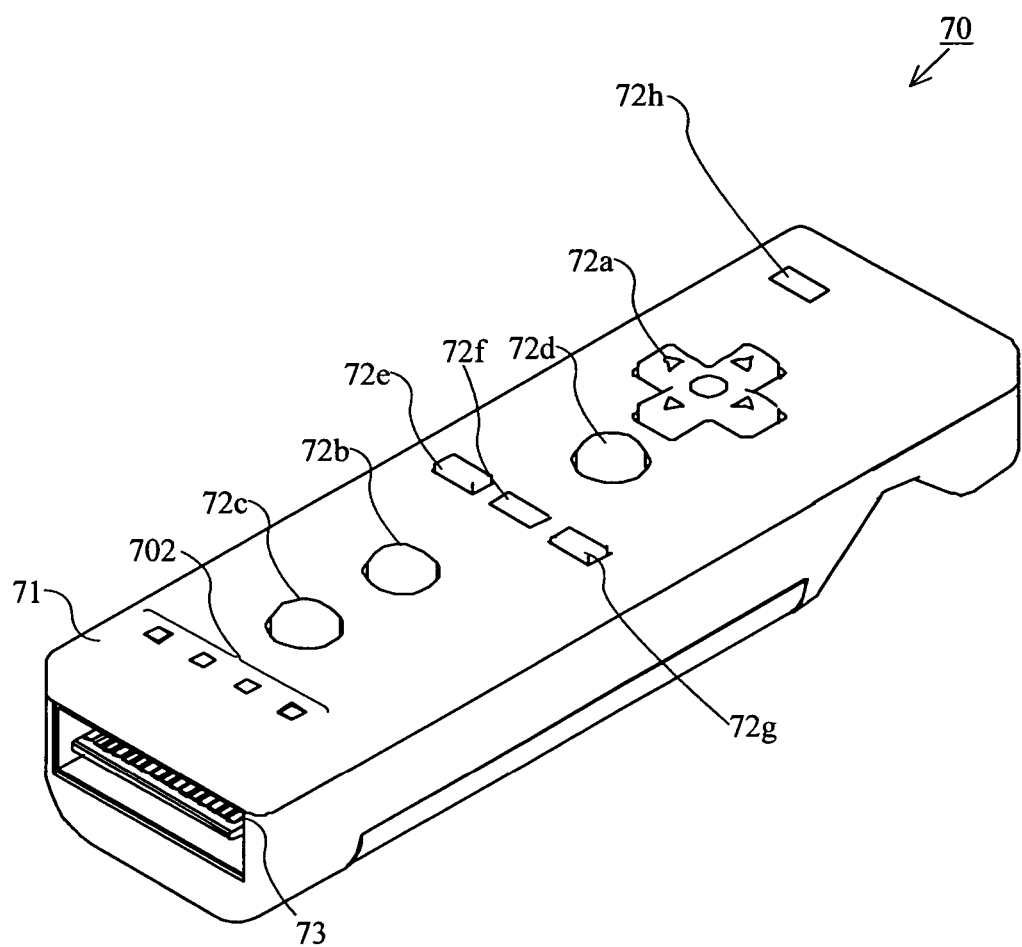

F I G. 1 3
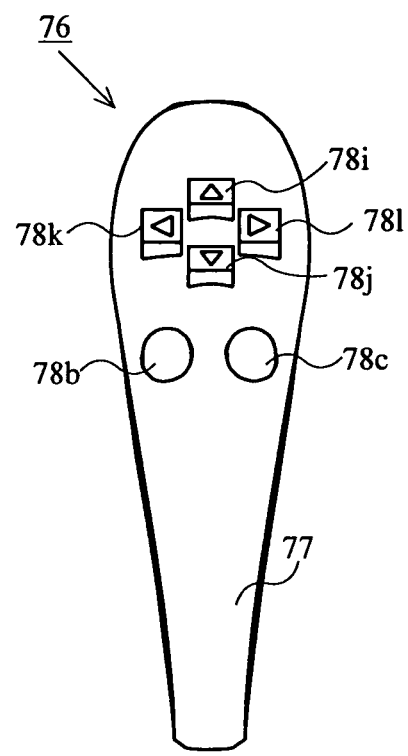

F I G. 1 6
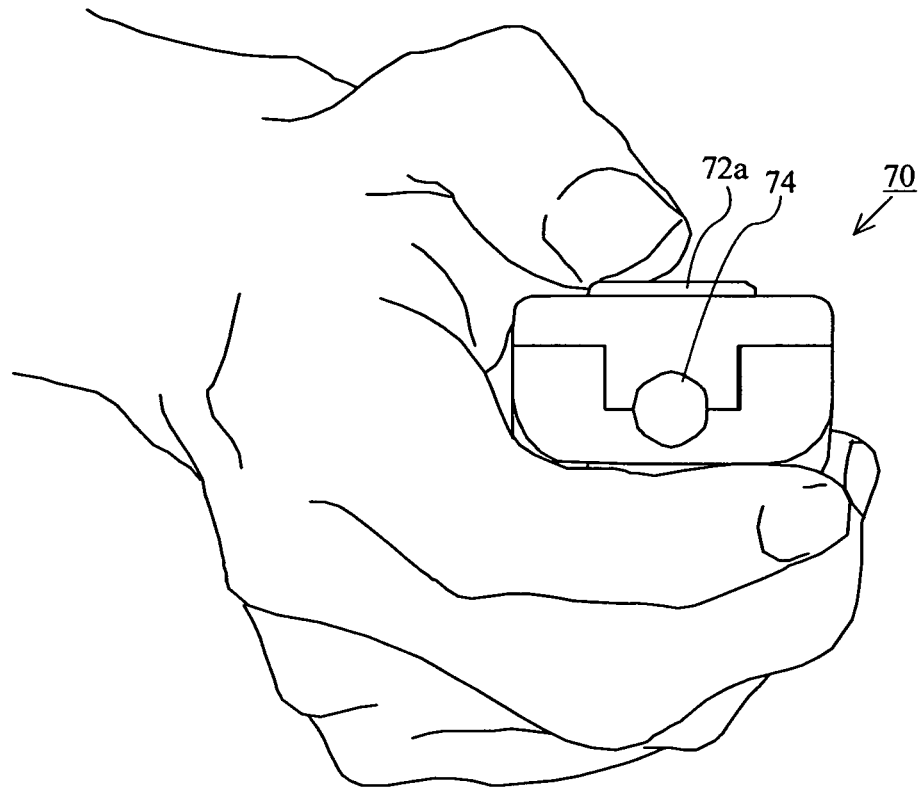

F I G. 1 7
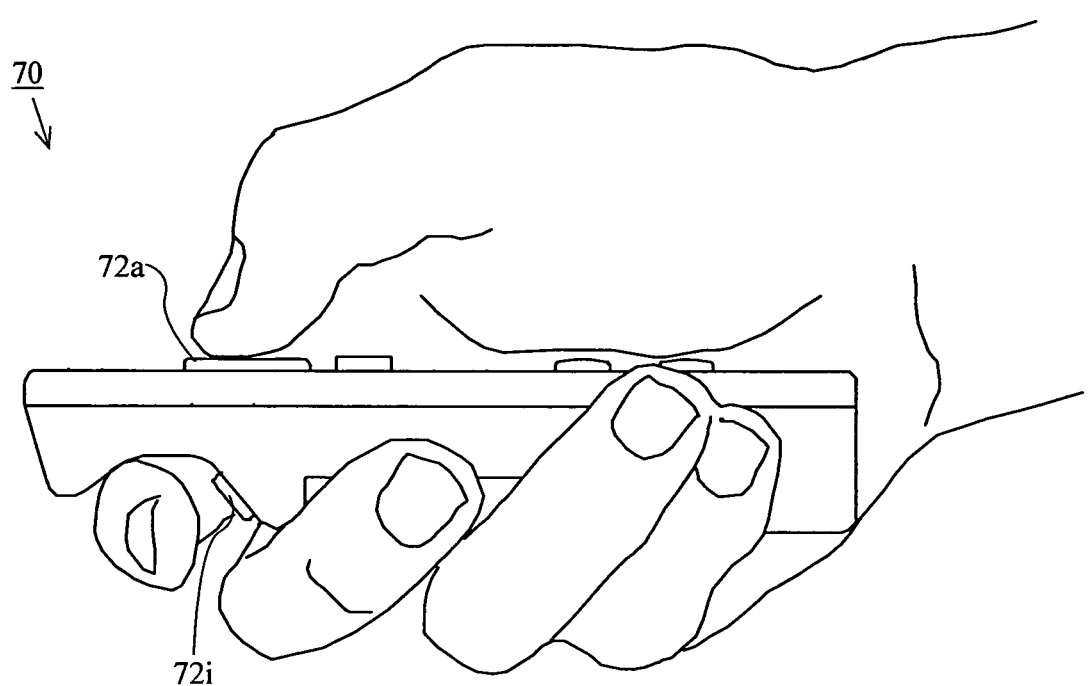

F I G. 1 9
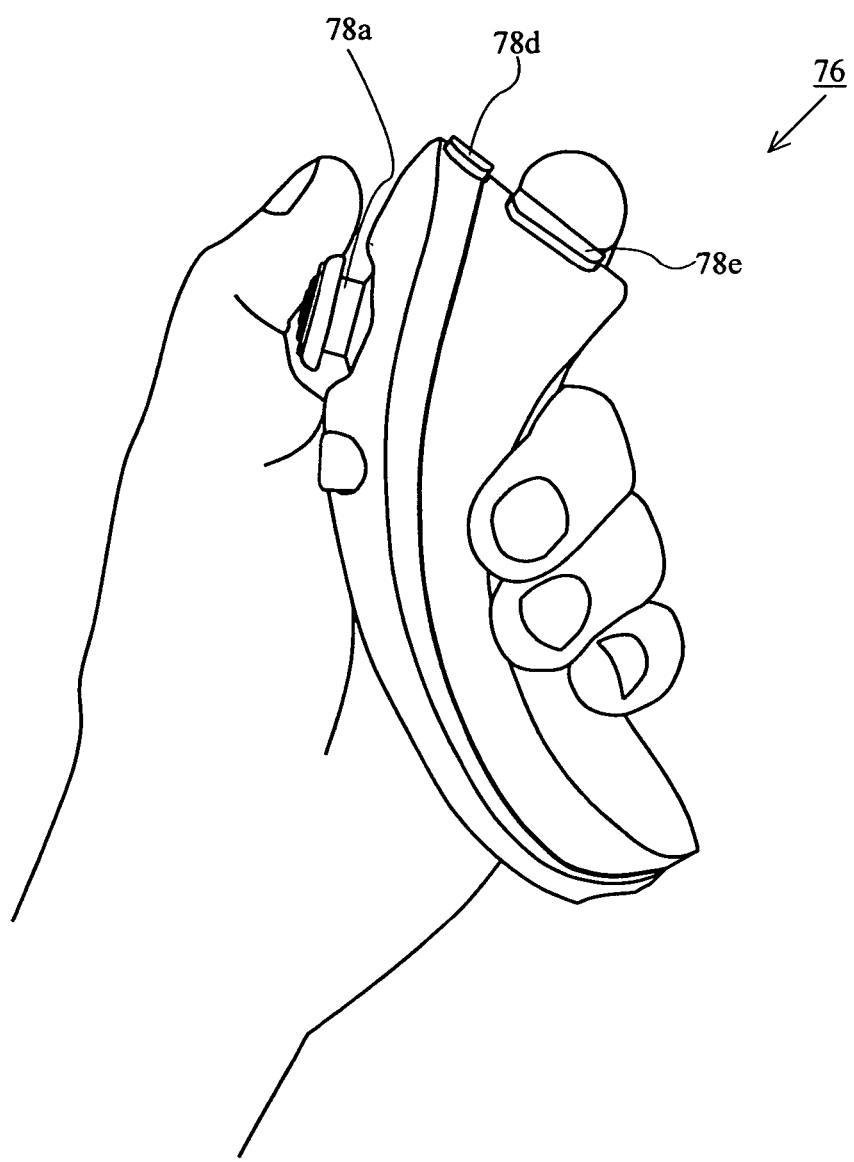

WIRELESS GAME CONTROLLERS

CROSS REFERENCE TO RELATED APPLICATION

The disclosure of Japanese Patent Application No. 2005-242926 is incorporated herein by reference. This application also claims the benefit of Provisional Application No. 60/714,862, filed Sep. 8, 2005, the entire content of which is hereby incorporated by reference in this application.

BACKGROUND

1. Field

The present invention relates to a game controller and a game system, and more particularly to a game controller which includes two control units connected to each other e.g. by a flexible cable or wirelessly and is operated using the two control units and a game system including the game controller.

2. Description of the Background Art

For example, Japanese Laid-Open Patent Publication No. 2004-313492 (hereinafter, referred to as Patent Document 1) discloses a controller having its control units held by both hands of a player, respectively, so as to play a game.

The controller disclosed in Patent Document 1 is composed of an R unit to be held by a right hand of a player and an L unit to be held by a left hand of the player. The R unit and the L unit each has an operation button and a stick on the top surface and the side of a housing thereof. The R unit and the L unit can be physically coupled to each other so as to be used as a combined controller.

However, the controller disclosed in Patent Document 1 is constructed by simply separating a conventional game apparatus controller into right and left units. That is, although a player can place his or her right and left hands anywhere when the player holds the R and L units by his or her right and left hands, respectively, the player cannot control the controller itself with improved flexibility. For example, not only the combined controller but also the game apparatus controller separated into the right and the left units cannot realize a new operation.

SUMMARY

Therefore, an object of the present invention is to provide a novel game controller and game system which realize a novel operation having enhanced flexibility by using a plurality of control units.

The following features attain the object mentioned above. The reference numerals and the like in the parentheses indicate the correspondence with the embodiment described below in order to aid in understanding the present invention and are not intended to limit, in any way, the scope of the present invention.

A first aspect is directed to a game controller (7) for transmitting operation data to a computer (30) executing a game program. The game controller comprises: a first control unit (70); a second control unit (76); and a cable (79). The cable is flexible and electrically connects between the first control unit and the second control unit. The first control unit includes a first operation data generation section (74, 701). The first operation data generation section generates first operation data in accordance with a motion of a first control unit body included in the first control unit. The second control unit includes a second operation data generation section (78). The second operation data generation section generates second operation data in accordance with a direction input operation performed by a player. One of the first control unit and the second control unit further includes a transmission section (75). The transmission section transmits the first operation data and the second operation data to the computer at a predetermined timing.

The first operation data generation section includes an image pickup section (74). The image pickup section is fixed to the first control unit body and takes an image of a periphery along a predetermined direction from the first control unit body. The first operation data generation section outputs, as the first operation data, one selected from the group consisting of an image taken by the image pickup section and a result of subjecting the image taken by the image pickup section to a predetermined calculation.

The first operation data generation section further includes a positional information calculation section (744). The positional information calculation section calculates positional information indicating a position, in the image taken by the image pickup section, of at least one marker image which is included in the taken image and is used as an imaging target, when performing the predetermined calculation, and outputs the positional information as the first operation data.

The transmission section wirelessly transmits the first operation data and the second operation data to the computer.

The first operation data generation section has one of an acceleration sensor (701) and a gyro sensor included in the first control unit body. The first operation data generation section outputs data generated by the one of the acceleration sensor and the gyro sensor as the first operation data.

The cable is detachably connected to at least the first control unit. The transmission section is included in the first control unit.

The transmission section collects and transmits to the computer the first operation data and the second operation data at intervals shorter than 1/60 second.

The second operation data generation section includes a stick (78a) which has a tip projecting from a second control unit body included in the second control unit and is inclinable on the second control unit body. The second operation data generation section outputs data obtained in accordance with an inclining direction of the stick as the second operation data.

The second operation data generation section includes an operation button (78f) which has operation portions representing at least four directions and which is able to be pushed into the second control unit body by the operation portions. The second operation data generation section outputs, as the second operation data, data corresponding to the operation portion at which the operation button is pushed.

The second operation data generation section includes a sliding member (78g) which has a top surface exposed from the second control unit body and which is horizontally movable on the second control unit body. The second operation data generation section outputs data obtained in accordance with a horizontal moving direction of the sliding member as the second operation data.

The second operation data generation section includes a touch pad (78h) on an outer surface of the second control unit body. The second operation data generation section outputs, as the second operation data, data obtained in accordance with a position on the touch pad at which the touch pad is touched.

The second operation data generation section includes at least four operation buttons (78i, 78j, 78k, 78l) which are able to be pushed into the second control unit body. The second operation data generation section outputs data obtained in accordance with the pushed operation button as the second operation data.

A further aspect is directed to a game controller for transmitting operation data to a computer executing a game program. The game controller comprises: a first control unit; a second control unit; and a wireless connecting means. The wireless connecting means wirelessly connects between the first control unit and the second control unit. The first control unit includes a first operation data generation section. The first operation data generation section generates first operation data in accordance with a motion of a first control unit body included in the first control unit. The second control unit includes a second operation data generation section. The second operation data generation section generates second operation data in accordance with a direction input operation performed by a player. Further, one of the first control unit and the second control unit includes a transmission section. The transmission section transmits the first operation data and the second operation data to the computer at a predetermined timing.

The first operation data generation section includes an image pickup section. The image pickup section is fixed to the first control unit body and takes an image of a periphery along a predetermined direction from the first control unit body. The first operation data generation section outputs, as the first operation data, one selected from the group consisting of an image taken by the image pickup section and a result of subjecting the image taken by the image pickup section to a predetermined calculation.

The first operation data generation section further includes a positional information calculation section. The positional information calculation section calculates positional information indicating a position, in the image taken by the image pickup section, of at least one marker image which is included in the taken image and is used as an imaging target, when performing the predetermined calculation, and outputs the positional information as the first operation data.

The transmission section wirelessly transmits the first operation data and the second operation data to the computer.

The first operation data generation section has one of an acceleration sensor and a gyro sensor included in the first control unit body. The first operation data generation section outputs data generated by the one of the acceleration sensor and the gyro sensor as the first operation data.

The transmission section collects and transmits to the computer the first operation data and the second operation data at intervals shorter than 1/60 second.

The second operation data generation section includes a stick which has a tip projecting from a second control unit body included in the second control unit and is inclinable on the second control unit body. The second operation data generation section outputs data obtained in accordance with an inclining direction of the stick as the second operation data.

The second operation data generation section includes an operation button (78f) which has operation portions representing at least four directions and which is able to be pushed into the second control unit body by the operation portions. The second operation data generation section outputs, as the second operation data, data corresponding to the operation portion at which the operation button is pushed.

The second operation data generation section includes a sliding member which has a top surface exposed from the second control unit body and which is horizontally movable on the second control unit body. The second operation data generation section outputs data obtained in accordance with a horizontal moving direction of the sliding member as the second operation data.

The second operation data generation section includes a touch pad on an outer surface of the second control unit body. The second operation data generation section outputs, as the second operation data, data obtained in accordance with a position on the touch pad at which the touch pad is touched.

The second operation data generation section includes at least four operation buttons which are able to be pushed into the second control unit body. The second operation data generation section outputs data obtained in accordance with the pushed operation button as the second operation data.

A further aspect is directed to a game system (1) comprising a game controller and a game apparatus (3). The game controller is described in the first aspect. The game apparatus is communicably connected to the game controller and includes a computer for executing a game program to represent a virtual game world on a display screen (2). The game apparatus performs a game process in accordance with at least one of the first operation data transmitted from the first control unit and the second operation data transmitted from the second control unit.

The game apparatus causes a player character appearing in the virtual game world to perform an action in accordance with at least one of the first operation data transmitted from the game controller and the second operation data transmitted from the game controller.

A further aspect is directed to a game system comprising a game controller and a game apparatus. The game controller is as described above. The game apparatus is communicably connected to the game controller and includes a computer for executing a game program to represent a virtual game world on a display screen. The game apparatus performs a game process in accordance with at least one of the first operation data transmitted from the first control units and the second operation data transmitted from the second control unit.

The game apparatus causes a player character appearing in the virtual game world to perform an action in accordance with at least one of the first operation data transmitted from the game controller and the second operation data transmitted from the game controller.

According to the first aspect, the first control unit generates operation data in accordance with a motion of a controller body included in the game controller, and the second control unit generates operation data in accordance with a direction input operation. Thereby, when the game controller is used in a game, a player can make an input with a finger of one hand as in the case of a conventional controller while moving the other hand. That is, the player can cause his or her right and left hands to perform separate operations, thereby providing a new operation, which cannot be conventionally performed. Further, by connecting two control units to each other by a cable, the game controller requires only one transmission section for a computer.

The first control unit may generate operation data in accordance with a motion of a controller body included in the game controller, and the second control unit generates operation data in accordance with a direction input operation. Thereby, when the game controller is used in a game, a player can make an input with a finger of one hand as in the case of a conventional controller while moving the other hand. That is, the player can cause his or her right and left hands to perform respective separate operations, thereby providing a new operation, which cannot be conventionally performed. Further, two control units are completely separated from each other, thereby providing improved controllability and enabling two players to operate the game controller.

An image taken by the image pickup section fixed to the first control unit or information obtained from the taken image can be used as the operation data. For example, a direction and a position of the first control unit with respect to the imaging target can be detected, whereby a game operation can be performed in accordance with the direction and the position of the unit.

The game controller and the computer are wirelessly connected to each other, thereby providing improved controllability of the game controller.

The acceleration sensor or the gyro sensor is used as the first operation data generation section, thereby reducing cost.

According to another aspect, the cable is eliminated from the first control unit, whereby the operation data can be transmitted to the computer using only the first control unit.

Data can be collected and transmitted at intervals shorter than a typical game process cycle (1/60 second).

The second operation data generation section for outputting a signal in accordance with a direction input operation performed by a player can be realized by the inclinable stick, the button such as a cross key having portions to be pressed depending on a direction, the horizontally movable pad, the touch pad, the button representing each direction and the like.

Further, the game system according to the present invention can obtain the same effect as that of the aforementioned game controller.

These and other objects, features, aspects and advantages will become more apparent from the following detailed description of the present invention when taken in conjunction with the accompanying drawings.

BRIEF DESCRIPTION OF THE DRAWINGS

FIG. 2 is a functional block diagram of a game apparatus 3 shown in FIG. 1;

FIG. 5 is a perspective view of the core unit 70 shown in FIG. 3 as seen from the top rear side thereof;

FIG. 13 is a top view illustrating an example of a fourth modification of the subunit 76 shown in FIG. 3;

FIG. 16 shows an exemplary state of a player holding the core unit 70 with a right hand as seen from the front surface side of the core unit 70;

FIG. 17 shows an exemplary state of a player holding the core unit 70 with a right hand as seen from the left side of the core unit 70;

FIG. 19 shows an exemplary state of a player holding the subunit 76 with a left hand as seen from the right side of the subunit 76.

DESCRIPTION OF THE PREFERRED EMBODIMENTS

Figure 1:
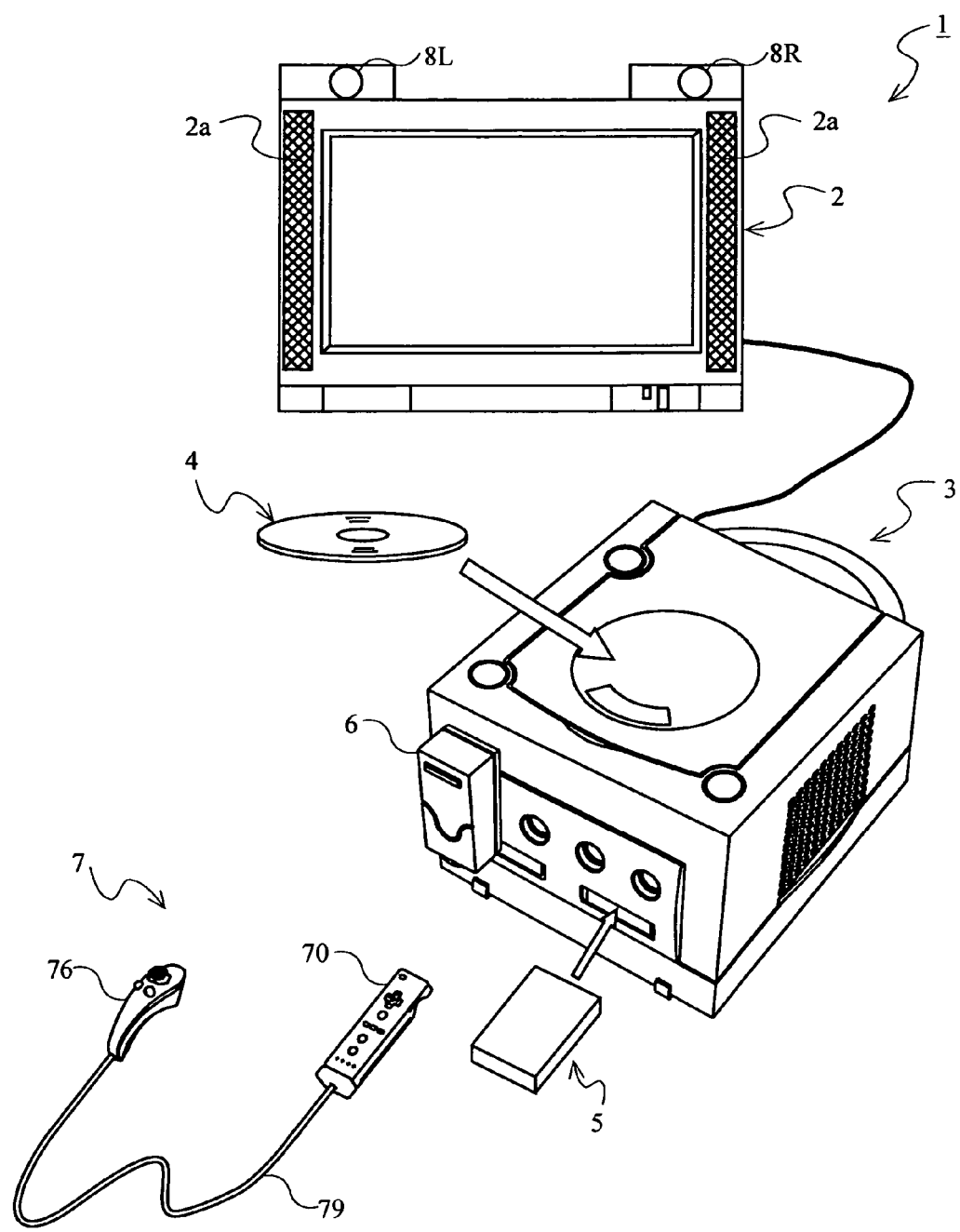
FIG. 1 is an external view illustrating a game system 1 according to an embodiment of the present invention.

With reference to FIG. 1, a game system 1 according to one embodiment of the present invention will be described. FIG. 1 is an external view illustrating the game system 1. In the following description, the game system 1 according to the present invention includes a stationary game apparatus.

As shown in FIG. 1, the game system 1 includes an installation type game apparatus (hereinafter, referred to simply as a "game apparatus") 3, which is connected to a display (hereinafter, referred to as a "monitor") 2 of a home-use television receiver or the like having a speaker 2a via a connection cord, and a controller 7 for giving operation information to the game apparatus 3. The game apparatus 3 is connected to a receiving unit 6 via a connection terminal. The receiving unit 6 receives transmission data which is wirelessly transmitted from the controller 7. The controller 7 and the game apparatus 3 are connected to each other by wireless communication. On the game apparatus 3, an optical disc 4 as an example of an exchangeable information storage medium is detachably mounted. The game apparatus 3 includes a power ON/OFF switch, a game process reset switch, and an OPEN switch for opening a top lid of the game apparatus 3 on a top main surface of the game apparatus 3. When a player presses the OPEN switch, the lid is opened, so that the optical disc 4 can be mounted or dismounted.

Further, on the game apparatus 3, an external memory card 5 is detachably mounted when necessary. The external memory card 5 has a backup memory or the like mounted thereon for fixedly storing saved data or the like. The game apparatus 3 executes a game program or the like stored on the optical disc 4 and displays the result on the monitor 2 as a game image. The game apparatus 3 can also reproduce a state of a game played in the past using saved data stored in the external memory card 5 and display the game image on the monitor 2. A player playing with the game apparatus 3 can enjoy the game by operating the controller 7 while watching the game image displayed on the monitor 2.

The controller 7 wirelessly transmits the transmission data from a communication section 75 included therein (described later) to the game apparatus 3 connected to the receiving unit 6, using the technology of, for example, Bluetooth (registered trademark). The controller 7 has two control units, a core unit 70 and a subunit 76, connected to each other by a flexible connecting cable 79. The controller 7 is an operation means for mainly operating a player object appearing in a game space displayed on the monitor 2. The core unit 70 and the subunit 76 each includes an operation section such as a plurality of operation buttons, a key, a stick and the like. As described later in detail, the core unit 70 includes an imaging information calculation section 74 for taking an image viewed from the core unit 70. As an example of an imaging target of the imaging information calculation section 74, two LED modules 8L and 8R are provided in the vicinity of a display screen of the monitor 2. The LED modules 8L and 8R each outputs infrared light forward from the monitor 2. Although in the present embodiment the core unit 70 and the subunit 76 are connected to each other by the flexible cable, the subunit 76 may have a wireless unit, thereby eliminating the connecting cable 79. For example, the subunit 76 has a Bluetooth (registered trademark) unit as the wireless unit, whereby the subunit 76 can transmit operation data to the core unit 70.

Next, with reference to FIG. 2, a structure of the game apparatus 3 will be described. FIG. 2 is a functional block diagram of the game apparatus 3.

As shown in FIG. 2, the game apparatus 3 includes, for example, a RISC CPU (central processing unit) 30 for executing various types of programs. The CPU 30 executes a boot program stored in a boot ROM (not shown) to, for example, initialize memories including a main memory 33, and then executes a game program stored on the optical disc 4 to perform game process or the like in accordance with the game program. The CPU 30 is connected to a GPU (Graphics Processing Unit) 32, the main memory 33, a DSP (Digital Signal Processor) 34, and an ARAM (audio RAM) 35 via a memory controller 31. The memory controller 31 is connected to a controller I/F (interface) 36, a video I/F 37, an external memory I/F 38, an audio I/F 39, and a disc I/F 41 via a predetermined bus. The controller I/F 36, the video I/F 37, the external memory I/F 38, the audio I/F 39 and the disc I/F 41 are respectively connected to the receiving unit 6, the monitor 2, the external memory card 5, the speaker 2a, and a disc drive 40.

The GPU 32 performs image processing based on an instruction from the CPU 30. The GPU 32 includes, for example, a semiconductor chip for performing calculation process necessary for displaying 3D graphics. The GPU 32 performs the image process using a memory dedicated for image process (not shown) and a part of the storage area of the main memory 33. The GPU 32 generates game image data and a movie to be displayed on the monitor 2 using such memories, and outputs the generated data or movie to the monitor 2 via the memory controller 31 and the video I/F 37 as necessary.

The main memory 33 is a storage area used by the CPU 30, and stores a game program or the like necessary for processing performed by the CPU 30 as necessary. For example, the main memory 33 stores a game program read from the optical disc 4 by the CPU 30, various types of data or the like. The game program, the various types of data or the like stored in the main memory 33 are executed by the CPU 30.

The DSP 34 processes sound data or the like generated by the CPU 30 during the execution of the game program. The DSP 34 is connected to the ARAM 35 for storing the sound data or the like. The ARAM 35 is used when the DSP 34 performs a predetermined process (for example, storage of the game program or sound data already read). The DSP 34 reads the sound data stored in the ARAM 35, and outputs the sound data to the speaker 2a included in the monitor 2 via the memory controller 31 and the audio I/F 39.

The memory controller 31 comprehensively controls data transmission, and is connected to the various I/Fs described above. The controller I/F 36 includes, for example, four controller I/Fs 36a, 36b, 36c and 36d, and communicably connects the game apparatus 3 to an external device which is engageable via connectors of the controller I/Fs 36a, 36b, 36c and 36d. For example, the receiving unit 6 is engaged with such a connector and is connected to the game apparatus 3 via the controller I/F 36. As described above, the receiving unit 6 receives the transmission data from the controller 7 and outputs the transmission data to the CPU 30 via the controller I/F 36. The video I/F 37 is connected to the monitor 2. The external memory I/F 38 is connected to the external memory card 5 and is accessible to a backup memory or the like provided in the external memory card 5. The audio I/F 39 is connected to the speaker 2a built in the monitor 2 such that the sound data read by the DSP 34 from the ARAM 35 or sound data directly outputted from the disc drive 40 can be outputted from the speaker 2a. The disc I/F 41 is connected to the disc drive 40. The disc drive 40 reads data stored at a predetermined reading position of the optical disc 4 and outputs the data to a bus of the game apparatus 3 or the audio I/F 39.

Figure 3:
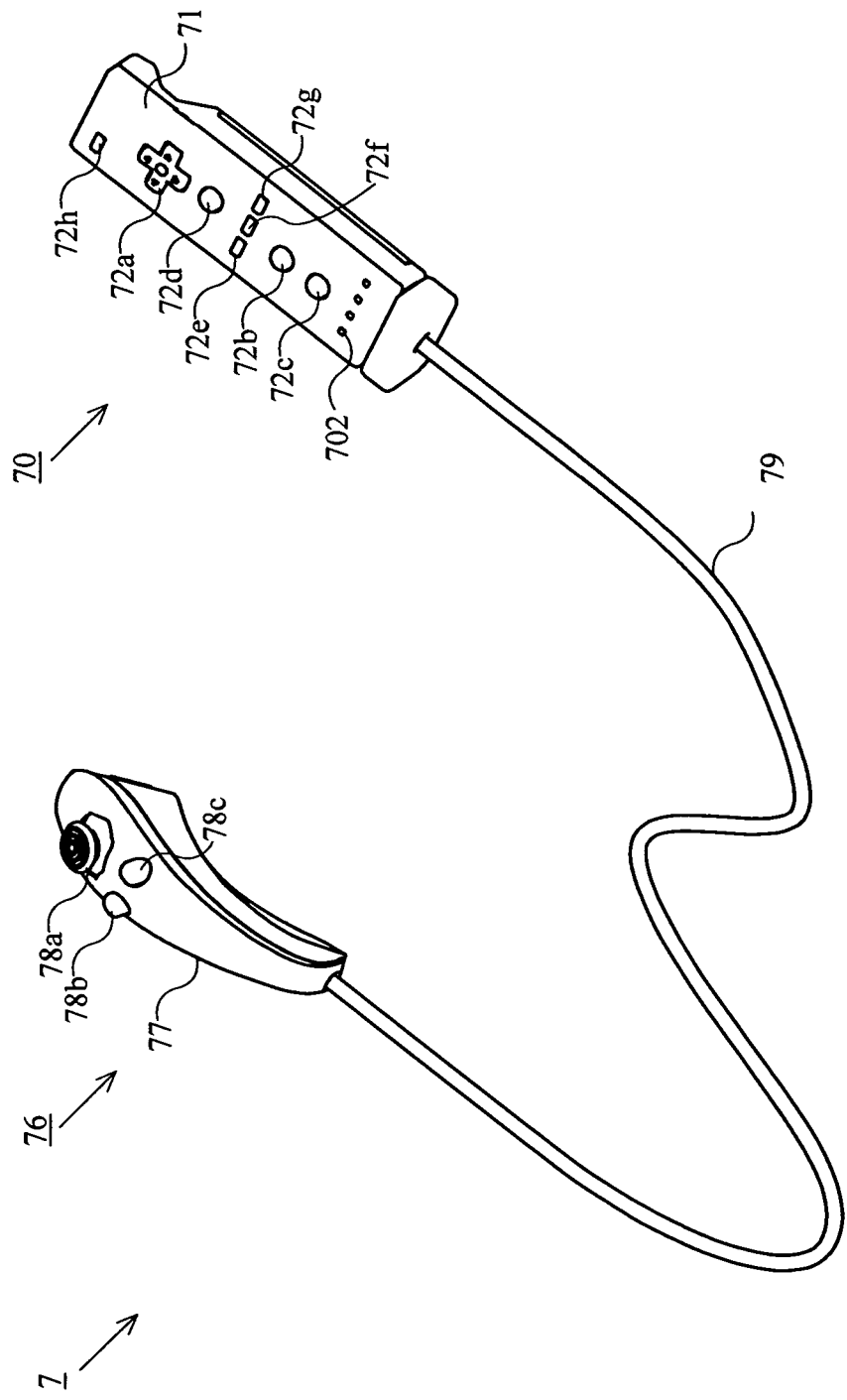
FIG. 3 is a perspective view illustrating an outer appearance of a controller 7 shown in FIG. 1.
Figure 4:
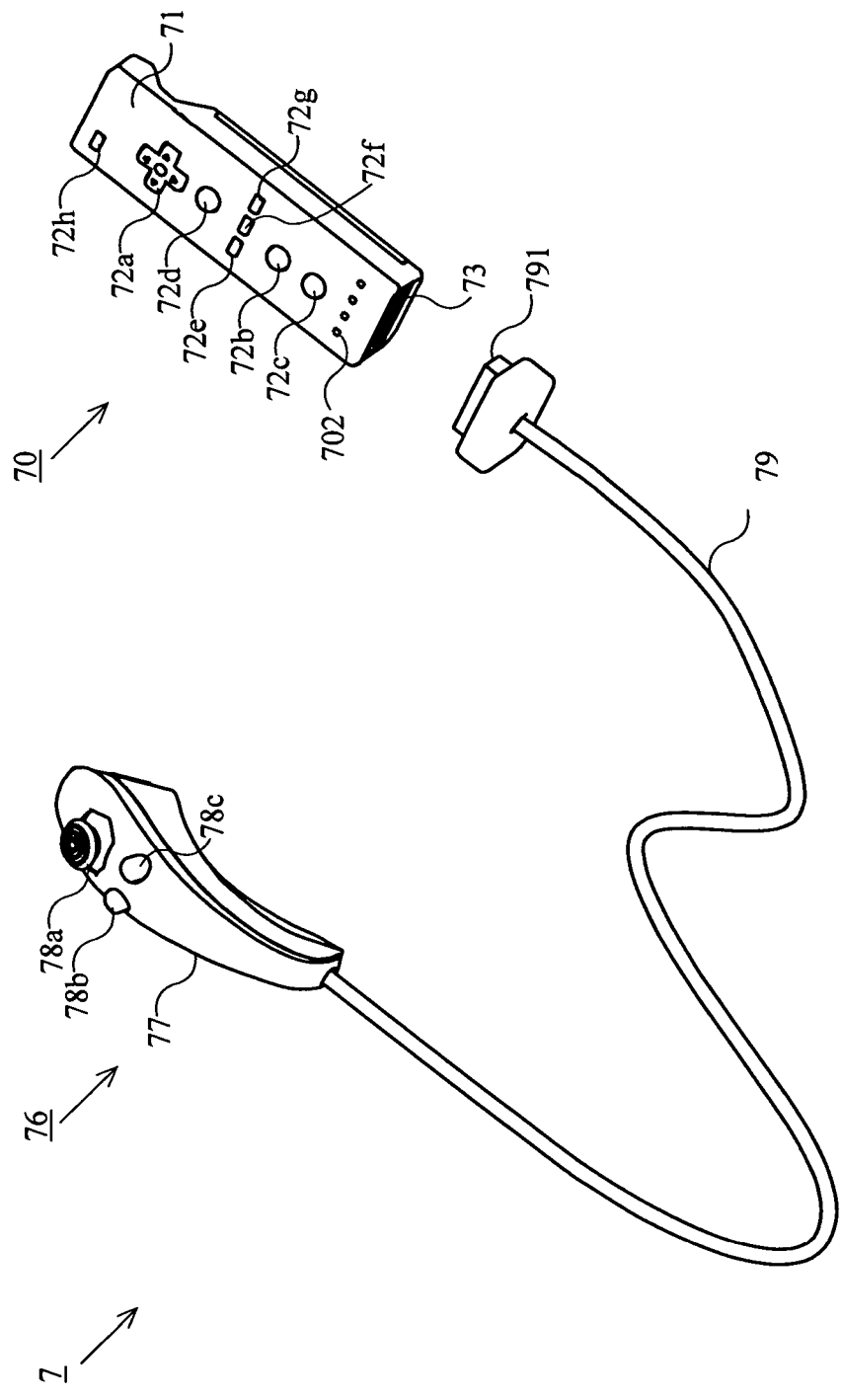
FIG. 4 is a perspective view illustrating a state of a connecting cable 79 of the controller 7 shown in FIG. 3 being connected to or disconnected from a core unit 70.

Next, with reference to FIGS. 3 and 4, the controller 7 will be described. FIG. 3 is a perspective view illustrating an outer appearance of the controller 7. FIG. 4 is a perspective view illustrating a state of the connecting cable 79 of the controller 7 shown in FIG. 3 being connected to or disconnected from the core unit 70.

As shown in FIG. 3, the controller 7 includes the core unit 70 and the subunit 76 connected to each other by the connecting cable 79. The core unit 70 has a housing 71 including a plurality of operation sections 72. The subunit 76 has a housing 77 including a plurality of operation sections 78. The core unit 70 and the subunit 76 are connected to each other by the connecting cable 79.

As shown in FIG. 4, the connecting cable 79 has a connector 791 detachably connected to the connector 73 of the core unit 70 at one end thereof, and the connecting cable 79 is fixedly connected to the subunit 76 at the other end thereof. The connector 791 of the connecting cable 79 is engaged with the connector 73 provided at the rear surface of the core unit 70 so as to connect the core unit 70 and the subunit 76 to each other by the connecting cable 79.

Figure 6:
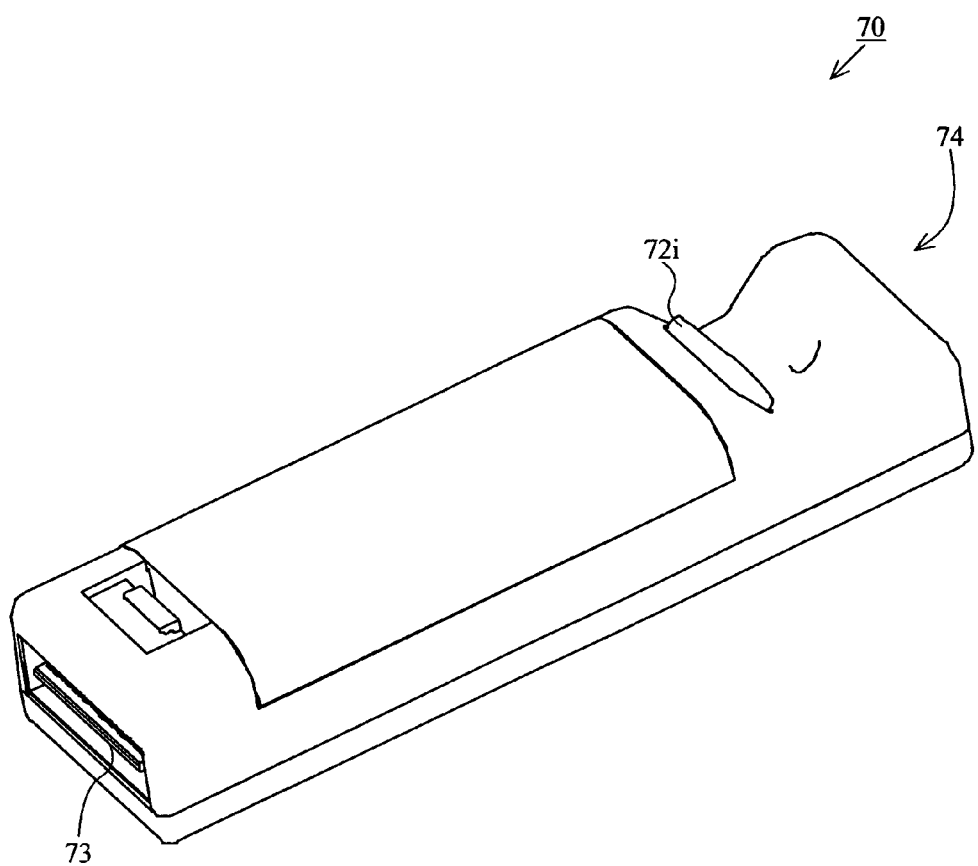
FIG. 6 is a perspective view of the core unit 70 shown in FIG. 3 as seen from the bottom rear side thereof.

With reference to FIGS. 5 and 6, the core unit 70 will be described. FIG. 5 is a perspective view of the core unit 70 as seen from the top rear side thereof. FIG. 6 is a perspective view of the core unit 70 as seen from the bottom rear side thereof.

As shown in FIGS. 5 and 6, the core unit 70 includes the housing 71 formed by plastic molding or the like. The housing 71 has a generally parallelepiped shape extending in a longitudinal direction from front to rear. The overall size of the housing 71 is small enough to be held by one hand of an adult or even a child.

At the center of a front part of a top surface of the housing 71, a cross key 72a is provided. The cross key 72a is a cross-shaped four-direction push switch. The cross key 72a includes operation portions corresponding to the four directions (front, rear, right and left) represented by arrows, which are respectively located on cross-shaped projecting portions arranged at intervals of 90 degrees. The player selects one of the front, rear, right and left directions by pressing one of the operation portions of the cross key 72a. Through an operation on the cross key 72a, the player can, for example, instruct a direction in which a player character or the like appearing in a virtual game world is to move or a direction in which the cursor is to move.

Although the cross key 72a is an operation section for outputting an operation signal in accordance with the aforementioned direction input operation performed by the player, such an operation section may be provided in another form. For example, the cross key 72a may be replaced with a composite switch including a push switch including a ring-shaped four-direction operation section and a center switch provided at the center thereof. Alternatively, the cross key 72a may be replaced with an operation section which includes an inclinable stick projecting from the top surface of the housing 71 and outputs an operation signal in accordance with the inclining direction of the stick. Still alternatively, the cross key 72a may be replaced with an operation section which includes a disc-shaped member horizontally slideable and outputs an operation signal in accordance with the sliding direction of the disc-shaped member. Still alternatively, the cross key 72a may be replaced with a touch pad. Still alternatively, the cross key 72a may be replaced with an operation section which includes switches representing at least four directions (front, rear, right and left) and outputs an operation signal in accordance with the switch pressed by the player.

Behind the cross key 72a on the top surface of the housing 71, a plurality of operation buttons 72b, 72c, 72d, 72e, 72f and 72g are provided. The operation buttons 72b, 72c, 72d, 72e, 72f and 72g are each an operation section for outputting a respective operation signal assigned to the operation buttons 72b, 72c, 72d, 72e, 72f or 72g when the player presses a head thereof. For example, the operation buttons 72b, 72c, and 72d, are assigned with functions of an X button, a Y button, and a B button. Further, the operation buttons 72e, 72f and 72g are assigned with functions of a select switch, a menu switch and a start switch, for example. The operation buttons 72b, 72c, 72d, 72e, 72f and 72g are assigned with various functions in accordance with the game program executed by the game apparatus 3, but this will not be described in detail because the functions are not directly relevant to the present invention. In an exemplary arrangement shown in FIG. 5, the operation buttons 72b, 72c and 72d are arranged in a line at the center in the front-rear direction on the top surface of the housing 71. The operation buttons 72e, 72f and 72g are arranged in a line in the left-right direction between the operation buttons 72b and 72d on the top surface of the housing 71. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for remote-controlling the power of the game apparatus 3 to be on or off. The operation button 72h also has a top surface thereof buried (recessed) in the top surface of the housing 71, so as not to be inadvertently pressed by the player.

Behind the operation button 72c on the top surface of the housing 71, a plurality of LEDs 702 are provided. The controller 7 is assigned a controller type (number) so as to be distinguishable from the other controllers 7. For example, the LEDs 702 are used for informing the player of the controller type which is currently set to controller 7 that he or she is using. Specifically, when the core unit 70 transmits the transmission data to the receiving unit 6, one of the plurality of LEDs 702 corresponding to the controller type is lit up.

On a bottom surface of the housing 71, a recessed portion is formed. As described later in detail, the recessed portion is formed at a position at which an index finger or middle finger of the player is located when the player holds the core unit 70. On a rear slope surface of the recessed portion, an operation button 72i is provided. The operation button 72i is an operation section acting as, for example, an A button. The operation button 72i is used, for example, as a trigger switch in a shooting game, or for attracting attention of a player object to a predetermined object.

On a front surface of the housing 71, an image pickup element 743 included in the imaging information calculation section 74 is provided. The imaging information calculation section 74 is a system for analyzing image data taken by the core unit 70 and detecting the position of the center of gravity, the size and the like of an area having a high brightness in the image data. The imaging information calculation section 74 has, for example, a maximum sampling period of about 200 frames/sec., and therefore can trace and analyze even with a relatively fast motion of the core unit 70. The imaging information calculation section 74 will be described later in detail. On a rear surface of the housing 71, the connector 73 is provided. The connector 73 is, for example, a 32-pin edge connector, and is used for engaging and connecting the core unit 70 with the connector 791 of the connecting cable 79.

Figure 7A:
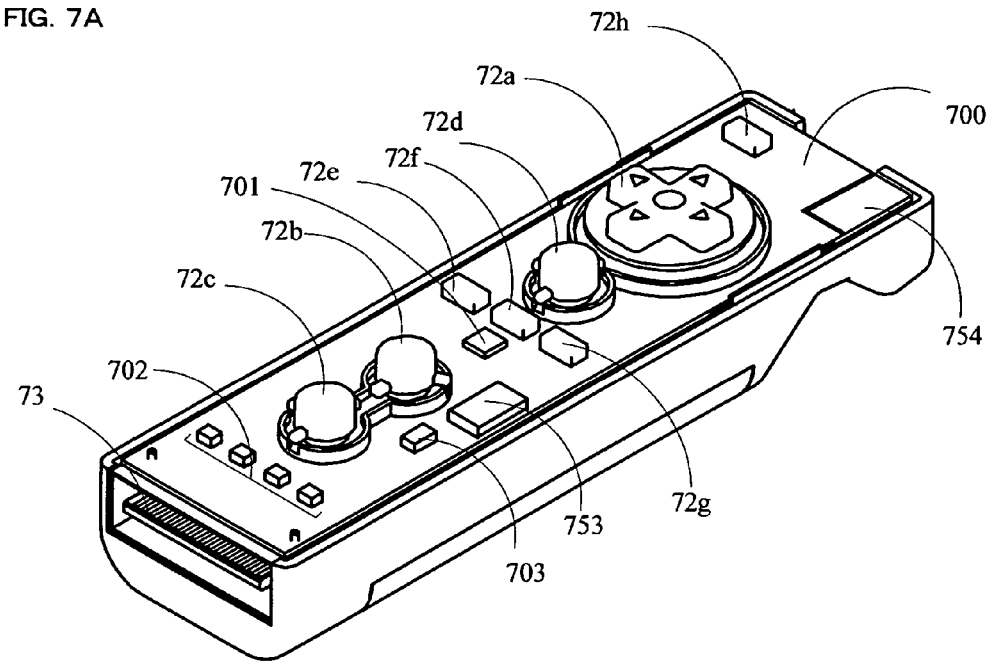
FIG. 7A is a perspective view illustrating a state where an upper casing of the core unit 70 shown in FIG. 3 is removed.
Figure 7B:
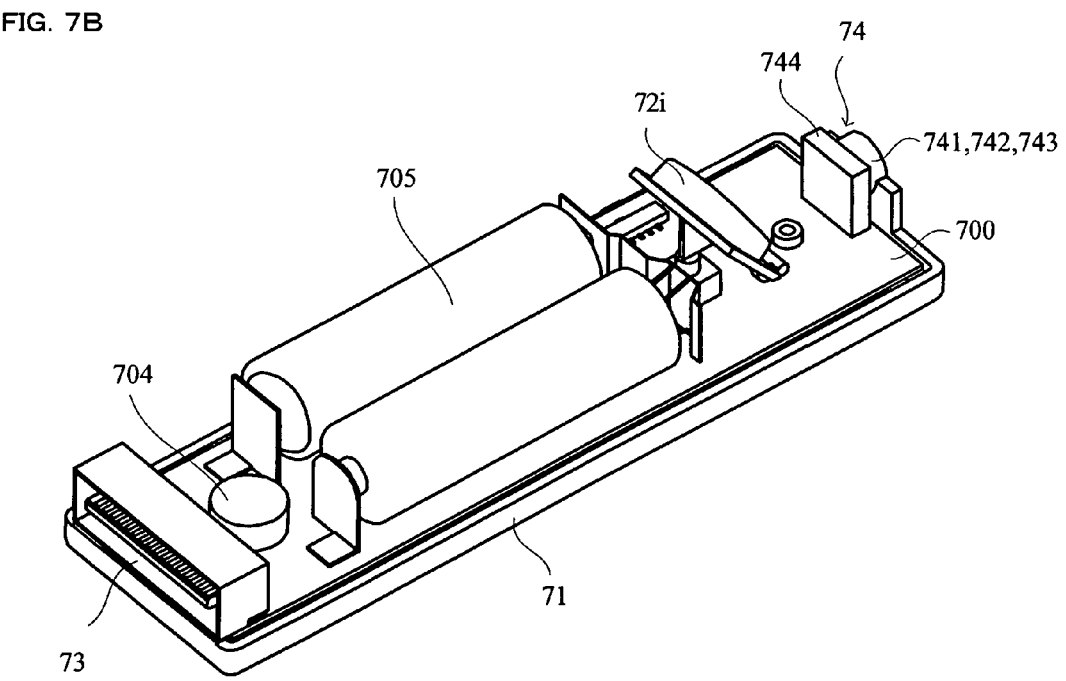
FIG. 7B is a perspective view illustrating a state where a lower casing of the core unit 70 shown in FIG. 3 is removed.

With reference to FIGS. 7A and 7B, an internal structure of the core unit 70 will be described. FIG. 7A is a perspective view illustrating a state where an upper casing (a part of the housing 71) of the core unit 70 is removed. FIG. 7B is a perspective view illustrating a state where a lower casing (a part of the housing 71) of the core unit 70 is removed. FIG. 7B is a perspective view illustrating a reverse side of a substrate 700 shown in FIG. 7A.

As shown in FIG. 7A, the substrate 700 is fixed inside the housing 71. On a top main surface of the substrate 700, the operation buttons 72a, 72b, 72c, 72d, 72e, 72f, 72g and 72h, an acceleration sensor 701, the LEDs 702, a quartz oscillator 703, a wireless module 753, an antenna 754 and the like are provided. These elements are connected to a microcomputer 751 (see FIG. 14) via lines (not shown) formed on the substrate 700 and the like. The wireless module 753 and the antenna 754 allow the core unit 70 to act as a wireless controller. The quartz oscillator 703 generates a reference clock of the microcomputer 751 described later.

As shown in FIG. 7B, at a front edge of a bottom main surface of the substrate 700, the imaging information calculation section 74 is provided. The imaging information calculation section 74 includes an infrared filter 741, a lens 742, the image pickup element 743 and an image processing circuit 744 located in this order from the front surface of the core unit 70 on the bottom main surface of the substrate 700. At a rear edge of the bottom main surface of the substrate 700, the connector 73 is attached. The operation button 72i is attached on the bottom main surface of the substrate 700 behind the imaging information calculation section 74, and cells 705 are accommodated behind the operation button 72i. On the bottom main surface of the substrate 700 between the cells 705 and the connector 73, a vibrator 704 is attached. The vibrator 704 may be, for example, a vibration motor or a solenoid. The core unit 70 is vibrated by an actuation of the vibrator 704, and the vibration is conveyed to the player's hand holding the core unit 70.

Figure 8C:
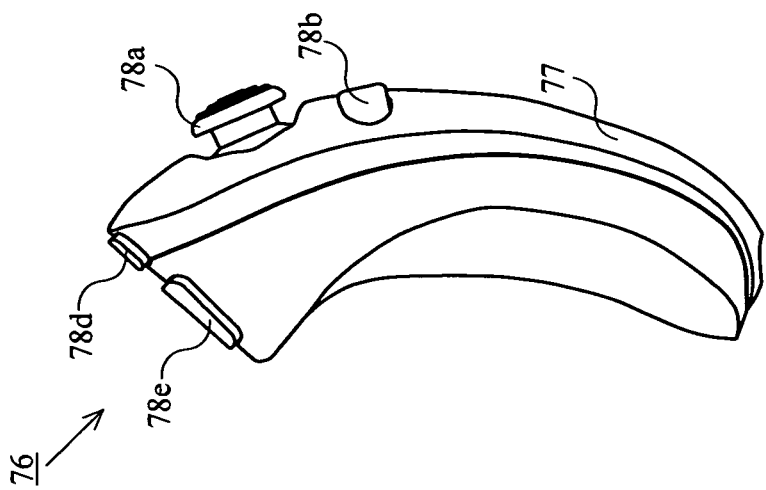
FIG. 8C is a left side view of the subunit 76 shown in FIG. 3.
Figure 8B:
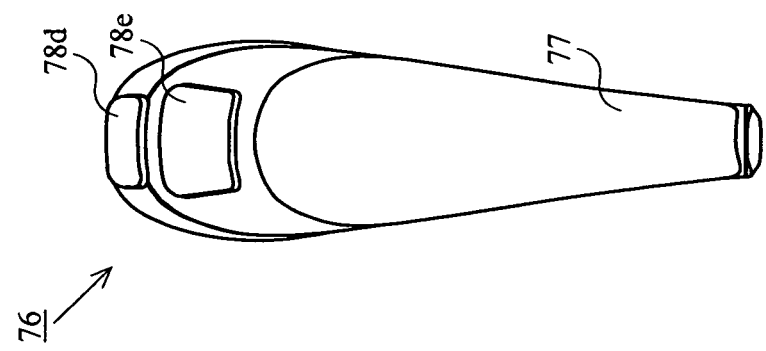
FIG. 8B is a bottom view of the subunit 76 shown in FIG. 3.
Figure 8A:
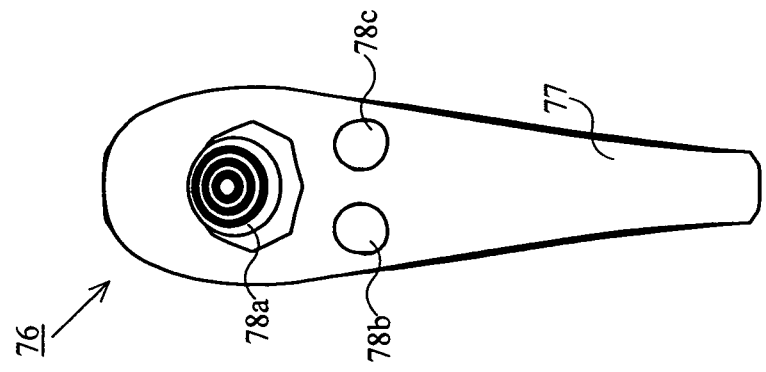
FIG. 8A is a top view of a subunit 76 shown in FIG. 3.
Figure 9:
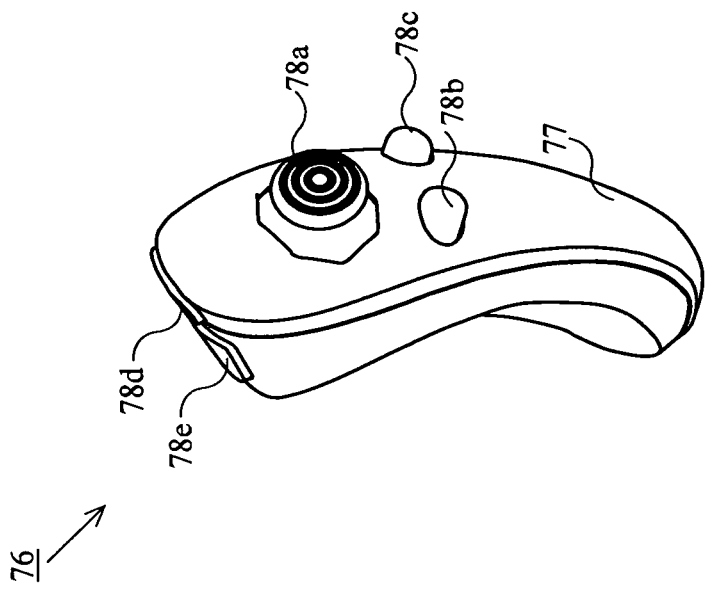
FIG. 9 is a perspective view of the subunit 76 shown in FIG. 3 as seen from the top front side thereof.

With reference to FIGS. 8A, 8B, 8C and 9, the subunit 76 will be described. FIG. 8A is a top view of the subunit 76. FIG. 8B is a bottom view of the subunit 76. FIG. 8C is a left side view of the subunit 76. FIG. 9 is a perspective view of the subunit 76 as seen from the top front side thereof.

As shown in FIGS. 8A, 8B, 8C and 9, the subunit 76 includes the housing 77 formed by, for example, plastic molding. The housing 77 extends in a longitudinal direction from front to rear, and has a streamlined solid shape including a head which is a widest portion in the subunit 76. The overall size of the subunit 76 is small enough to be held by one hand of an adult or even a child.

In the vicinity of the widest portion on the top surface of the housing 77, a stick 78a is provided. The stick 78a is an operation section which includes an inclinable stick projecting from the top surface of the housing 77 and outputs an operation signal in accordance with the inclining direction of the stick. For example, a player can arbitrarily designate a direction and a position by inclining a stick tip in any direction of 360 degrees, whereby the player can instruct a direction in which a player character or the like appearing in a virtual game world is to move, or can instruct a direction in which a cursor is to move.

Although the stick 78a is an operation section for outputting an operation signal in accordance with a direction input operation performed by the player as described above, such an operation section may be provided in another form. Hereinafter, with reference to FIGS. 10 to 13, a first through a fifth exemplary modifications, each of which includes the subunit 76 having an operation section for outputting an operation signal in accordance with the direction input operation, will be described.

Figure 10:
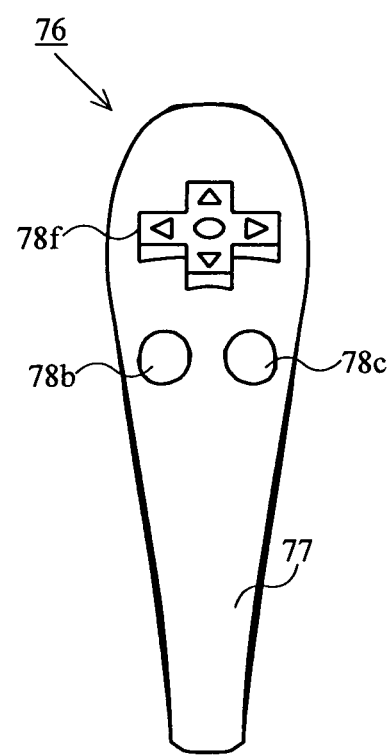
FIG. 10 is a top view illustrating an example of a first modification of the subunit 76 shown in FIG. 3.
Figure 11:
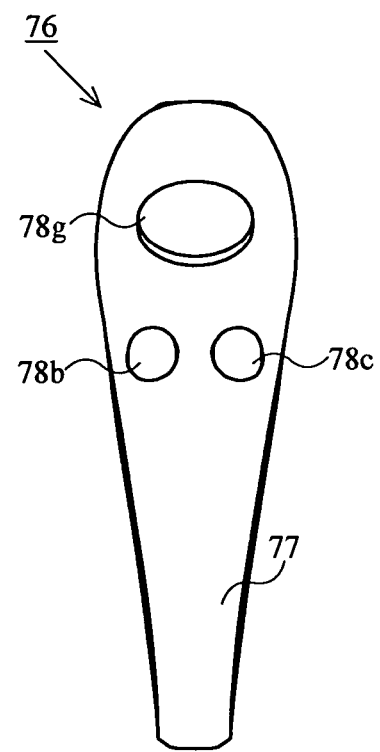
FIG. 11 is a top view illustrating an example of a second modification of the subunit 76 shown in FIG. 3.
Figure 12:
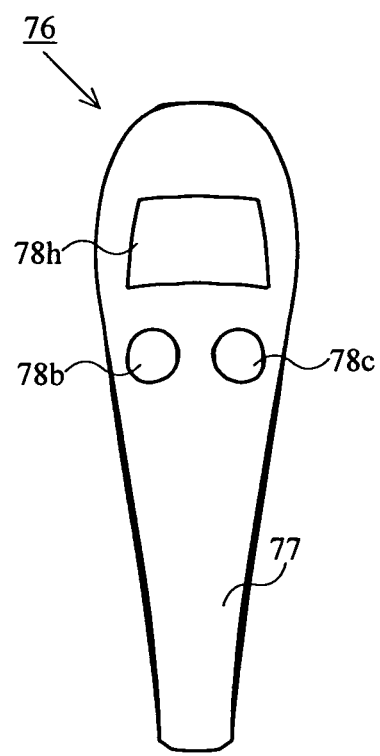
FIG. 12 is a top view illustrating an example of a third modification of the subunit 76 shown in FIG. 3.

As the first exemplary modification, as shown in FIG. 10, the subunit 76 may include a cross key 78f similar to the cross key 72a of the core unit 70 instead of the stick 78a. As the second exemplary modification, as shown in FIG. 11, the subunit 76 may include a slide pad 78g which includes a disc-shaped member horizontally slideable and outputs an operation signal in accordance with the sliding direction of the disc-shaped member, instead of the stick 78a. As the third exemplary modification, as shown in FIG. 12, the subunit 76 may include a touch pad 78h instead of the stick 78a. As the fourth exemplary modification, as shown in FIG. 13, the subunit 76 may include an operation section which has buttons 78i, 78j, 78k, and 78l representing at least four directions (front, rear, right and left), respectively, and outputs an operation signal in accordance with the button (78i, 78j, 78k, or 78l) pressed by a player, instead of the stick 78a. As the fifth exemplary modification, the subunit 76 may include a composite switch including a push switch having a ring-shaped four-direction operation section and a center switch provided at the center thereof, instead of the stick 78a.

Behind the stick 78a on the top surface of the housing 77 and on the front surface of the housing 77, a plurality of operation buttons 78b, 78c, 78d and 78e are provided. The operation buttons 78b, 78c, 78d and 78e are each an operation section for outputting a respective operation signal assigned to the operation buttons 72b, 72c, 72d, and 72e when the player presses a head thereof. For example, the operation buttons 78b, 78c, 78d and 78e are assigned with functions of an X button, a Y button and the like. The operation buttons 78b, 78c, 78d and 78e are assigned with various functions in accordance with the game program executed by the game apparatus 3, but this will not be described in detail because the functions are not directly relevant to the present invention. In the exemplary arrangement shown in FIGS. 8A, 8B, 8C and 9, the operation buttons 78b and 78c are arranged in a line at the center in the left-right direction on the top surface of the housing 77. The operation buttons 78d and 78e are arranged in a line in the front-rear direction on the front surface of the housing 77.

Figure 14:
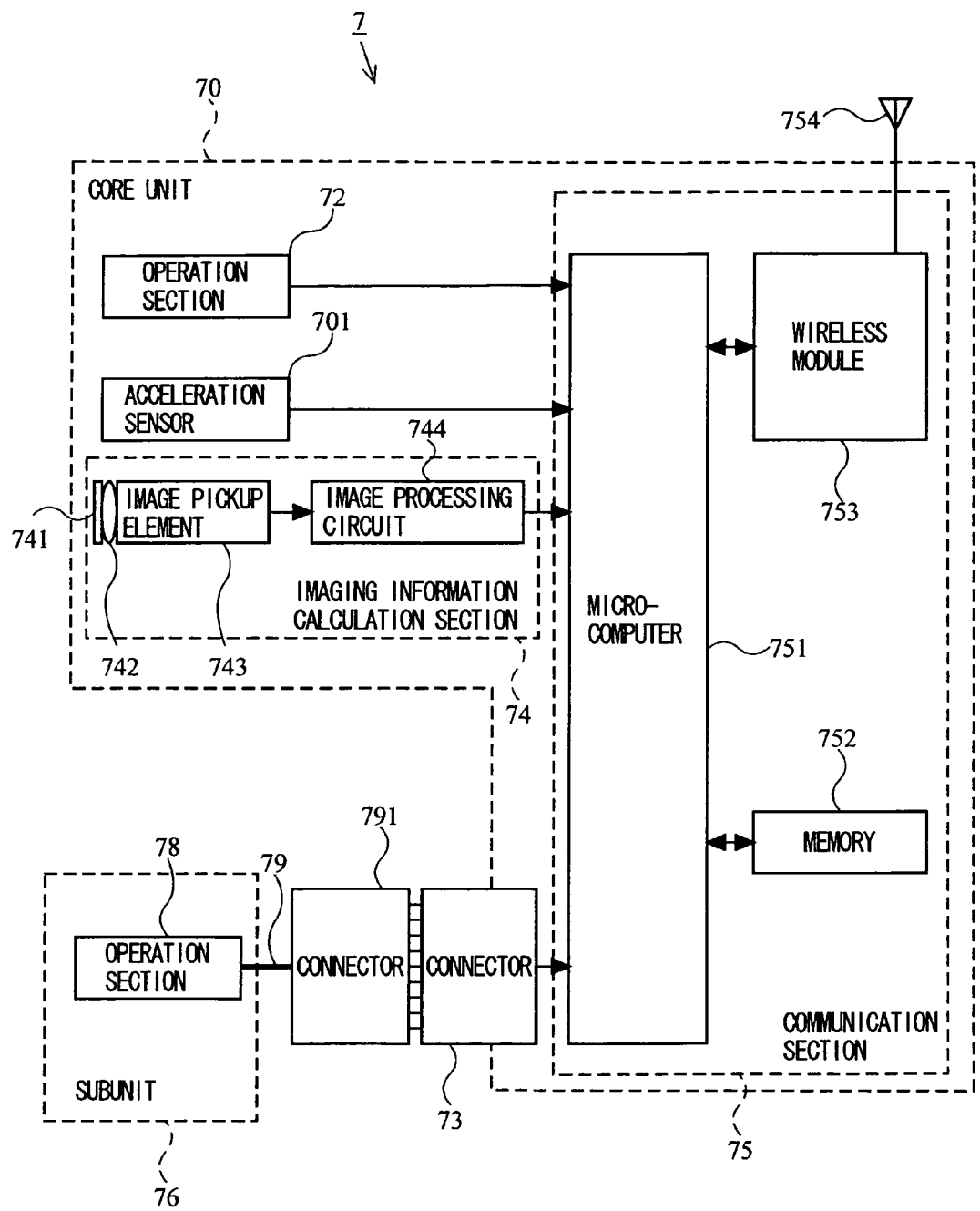
FIG. 14 is a block diagram illustrating a structure of the controller 7 shown in FIG. 3.

Next, with reference to FIG. 14, an internal structure of the controller 7 will be described. FIG. 14 is a block diagram illustrating the structure of the controller 7.

As shown in FIG. 14, the core unit 70 includes the communication section 75 and the acceleration sensor 701 in addition to the aforementioned operation section 72 and the imaging information calculation section 74.

The imaging information calculation section 74 includes the infrared filter 741, the lens 742, the image pickup element 743 and the image processing circuit 744. The infrared filter 741 allows only infrared light to pass therethrough, among light incident on the front surface of the core unit 70. The lens 742 collects the infrared light which has passed through the infrared filter 741 and outputs the infrared light to the image pickup element 743. The image pickup element 743 is a solid-state imaging device such as, for example, a CMOS sensor or a CCD. The image pickup element 743 takes an image of the infrared light collected by the lens 742. Accordingly, the image pickup element 743 takes an image of only the infrared light which has passed through the infrared filter 741 and generates image data. The image data generated by the image pickup element 743 is processed by the image processing circuit 744. Specifically, the image processing circuit 744 processes the image data obtained from the image pickup element 743, identifies a spot thereof having a high brightness, and outputs process result data representing the identified position coordinates and size of the area to the communication section 75. The imaging information calculation section 74 is fixed to the housing 71 of the core unit 70. The imaging direction of the imaging information calculation section 74 can be changed by changing the direction of the housing 71. The housing 71 is connected to the subunit 76 by the flexible connecting cable 79, and therefore the imaging direction of the imaging information calculation section 74 is not changed by changing the direction and position of the subunit 76. As described later in detail, a signal can be obtained in accordance with the position of the core unit 70 based on the process result data outputted by the imaging information calculation section 74.

The core unit 70 preferably includes a three-axis, linear acceleration sensor 701 that detects linear acceleration in three directions, i.e., the up/down direction, the left/right direction, and the forward/backward direction. Alternatively, a two axis linear accelerometer that only detects linear acceleration along each of the up/down and left/right directions (or other pair of directions) may be used in another embodiment depending on the type of control signals desired. As a non-limiting example, the three-axis or two-axis linear accelerometer 701 may be of the type available from Analog Devices, Inc. or STMicroelectronics N.V. Preferably, the acceleration sensor 701 is an electrostatic capacitance or capacitance-coupling type that is based on silicon micro-machined MEMS (microelectromechanical systems) technology. However, any other suitable accelerometer technology (e.g., piezoelectric type or piezoresistance type) now existing or later developed may be used to provide the three-axis or two-axis acceleration sensor 701.

As one skilled in the art understands, linear accelerometers, as used in acceleration sensor 701, are only capable of detecting acceleration along a straight line corresponding to each axis of the acceleration sensor. In other words, the direct output of the acceleration sensor 701 is limited to signals indicative of linear acceleration (static or dynamic) along each of the two or three axes thereof. As a result, the acceleration sensor 701 cannot directly detect movement along a non-linear (e.g. arcuate) path, rotation, rotational movement, angular displacement, tilt, position, attitude or any other physical characteristic.

However, through additional processing of the linear acceleration signals output from the acceleration sensor 701, additional information relating to the core unit 70 can be inferred or calculated, as one skilled in the art will readily understand from the description herein. For example, by detecting static, linear acceleration (i.e., gravity), the linear acceleration output of the acceleration sensor 701 can be used to infer tilt of the object relative to the gravity vector by correlating tilt angles with detected linear acceleration. In this way, the acceleration sensor 701 can be used in combination with the micro-computer 751 (or another processor) to determine tilt, attitude or position of the core unit 70. Similarly, various movements and/or positions of the core unit 70 can be calculated or inferred through processing of the linear acceleration signals generated by the acceleration sensor 701 when the core unit 70 containing the acceleration sensor 701 is subjected to dynamic accelerations by, for example, the hand of a user, as explained herein. In another embodiment, the acceleration sensor 701 may include an embedded signal processor or other type of dedicated processor for performing any desired processing of the acceleration signals output from the accelerometers therein prior to outputting signals to microcomputer 751. For example, the embedded or dedicated processor could convert the detected acceleration signal to a corresponding tilt angle when the acceleration sensor is intended to detect static acceleration (i.e., gravity). Data representing the acceleration detected by the acceleration sensor 701 is outputted to the communication section 75.

In another exemplary embodiment, the acceleration sensor 701 may be replaced with a gyro-sensor of any suitable technology incorporating, for example, a rotating or vibrating element. Exemplary MEMS gyro-sensors that may be used in this embodiment are available from Analog Devices, Inc. Unlike the linear acceleration sensor 701, a gyro-sensor is capable of directly detecting rotation (or angular rate) around an axis defined by the gyroscopic element (or elements) therein. Thus, due to the fundamental differences between a gyro-sensor and an linear acceleration sensor, corresponding changes need to be made to the processing operations that are performed on the output signals from these devices depending on which device is selected for a particular application.

More specifically, when a tilt or inclination is calculated using a gyroscope instead of the acceleration sensor, significant changes are necessary. Specifically, when using a gyro-sensor, the value of inclination is initialized at the start of detection. Then, data on the angular velocity which is output from the gyroscope is integrated. Next, a change amount in inclination from the value of inclination previously initialized is calculated. In this case, the calculated inclination corresponds to an angle. In contrast, when an acceleration sensor is used, the inclination is calculated by comparing the value of the acceleration of gravity of each axial component with a predetermined reference. Therefore, the calculated inclination can be represented as a vector. Thus, without initialization, an absolute direction can be determined with an accelerometer. The type of the value calculated as an inclination is also very different between a gyroscope and an accelerometer; i.e., the value is an angle when a gyroscope is used and is a vector when an accelerometer is used. Therefore, when a gyroscope is used instead of an acceleration sensor or vice versa, data on inclination also needs to be processed by a predetermined conversion that takes into account the fundamental differences between these two devices. Due to the fact that the nature of gyroscopes is known to one skilled in the art, as well as the fundamental differences between linear accelerometers and gyroscopes, further details are not provided herein so as not to obscure the remainder of the disclosure. While gyro-sensors provide certain advantages due to their ability to directly detect rotation, linear acceleration sensors are generally more cost effective when used in connection with the controller applications described herein.

The communication section 75 includes the microcomputer 751, a memory 752, the wireless module 753 and the antenna 754. The microcomputer 751 controls the wireless module 753 for wirelessly transmitting the transmission data while using the memory 752 as a storage area during the process.

Data from the core unit 70 including an operation signal (core key data) from the operation section 72, acceleration signals (acceleration data) from the acceleration sensor 701, and the process result data from the imaging information calculation section 74 are outputted to the microcomputer 751. An operation signal (sub key data) from the operation section 78 of the subunit 76 is outputted to the microcomputer 751 via the connecting cable 79. The microcomputer 751 temporarily stores the input data (core key data, sub key data, acceleration data, and process result data) in the memory 752 as the transmission data which is to be transmitted to the receiving unit 6. The wireless transmission from the communication section 75 to the receiving unit 6 is performed periodically at a predetermined time interval. Since game processing is generally performed at a cycle of ⅙₀ sec., data needs to be collected and transmitted at a cycle of a shorter time period. Specifically, the game process unit is 16.7 ms (1/60 sec.), and the transmission interval of the communication section 75 structured using the Bluetooth (registered trademark) technology is 5 ms. At the transmission timing to the receiving unit 6, the microcomputer 751 outputs the transmission data stored in the memory 752 as a series of operation information to the wireless module 753. The wireless module 753 uses, for example, the Bluetooth (registered trademark) technology to modulate the operation information onto a carrier wave of a predetermined frequency, and radiates the low power radio wave signal from the antenna 754. Thus, the core key data from the operation section 72 included in the core unit 70, the sub key data from the operation section 78 included in the subunit 76, acceleration data from the acceleration sensor 701, and the process result data from the imaging information calculation section 74 are modulated onto the low power radio wave signal by the wireless module 753 and radiated from the core unit 70. The receiving unit 6 of the game apparatus 3 receives the low power radio wave signal, and the game apparatus 3 demodulates or decodes the low power radio wave signal to obtain the series of operation information (the core key data, the sub key data, the acceleration data, and the process result data). Based on the obtained operation information and the game program, the CPU 30 of the game apparatus 3 performs the game process. In the case where the communication section 75 is structured using the Bluetooth (registered trademark) technology, the communication section 75 can have a function of receiving transmission data which is wirelessly transmitted from other devices. The acceleration data and/or process result data are included in first operation data and the sub key data is included in the second operation data.

Figure 15:
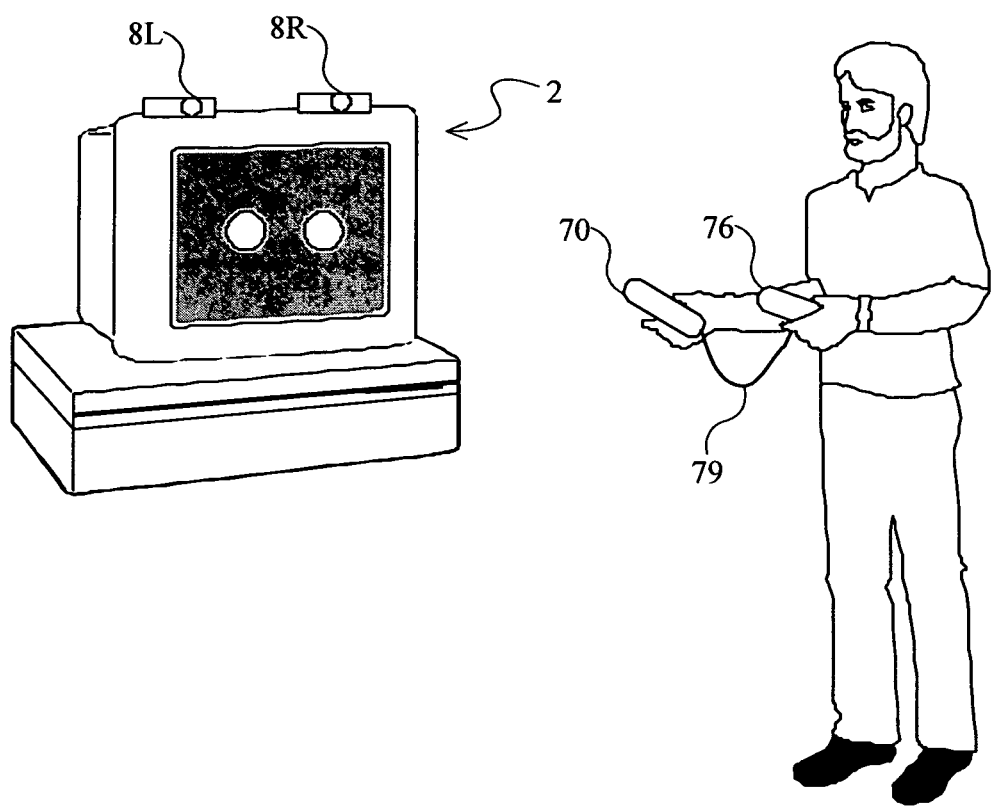
FIG. 15 is a diagram illustrating a state of a game being generally controlled with the controller 7 shown in FIG. 3.

As shown in FIG. 15, in order to play a game using the controller 7 with the game system 1, a player holds the core unit 70 with one hand (for example, a right hand) (see FIGS. 16 and 17), and holds the subunit 76 with the other hand (for example, a left hand) (see FIG. 19). The player holds the core unit 70 so as to point the front surface of the core unit 70 (that is, a side having an entrance through which light is incident on the imaging information calculation section 74 taking an image of the light) to the monitor 2. On the other hand, two LED modules 8L and 8R are provided in the vicinity of the display screen of the monitor 2. The LED modules 8L and 8R each outputs infrared light forward from the monitor 2.

When a player holds the core unit 70 so as to point the front surface thereof to the monitor 2, infrared lights outputted by the two LED modules 8L and 8R are incident on the imaging information calculation section 74. The image pickup element 743 takes images of the infrared lights incident through the infrared filter 741 and the lens 742, and the image processing circuit 744 processes the taken images. The imaging information calculation section 74 detects infrared components outputted by the LED modules 8L and 8R so as to obtain positions and area information of the LED modules 8L and 8R. Specifically, the imaging information calculation section 74 analyzes image data taken by the image pickup element 743, eliminates images which do not represent the infrared lights outputted by the LED modules 8L and 8R from the area information, and identifies points each having a high brightness as positions of the LED modules 8L and 8R. The imaging information calculation section 74 obtains positions coordinates, coordinates of the center of gravity, and the like of each of the identified points having the high brightness and outputs the same as the process result data. When such process result data is transmitted to the game apparatus 3, the game apparatus 3 can obtain, based on the position coordinates and the coordinates of the center of gravity, operation signals relating to the motion, posture, position and the like of the imaging information calculation section 74, that is, the core unit 70, with respect to the LED modules 8L and 8R. Specifically, the position having a high brightness in the image obtained through the communication section 75 is changed in accordance with the motion of the core unit 70, and therefore a direction input or coordinate input is performed in accordance with the position having the high brightness being changed, thereby enabling a direction input or a coordinate input to be performed along the moving direction of the core unit 70.

Thus, the imaging information calculation section 74 of the core unit 70 takes images of stationary markers (infrared lights from the two LED modules 8L and 8R in the present embodiment), and therefore the game apparatus 3 can use the process result data relating to the motion, posture, position and the like of the core unit 70 in the game process, whereby an operation input, which is different from an input made by pressing an operation button or using an operation key, is further intuitively performed. As described above, since the markers are provided in the vicinity of the display screen of the monitor 2, the motion, posture, position and the like of the core unit 70 with respect to the display screen of the monitor 2 can be easily calculated based on positions from the markers. That is, the process result data used for obtaining the motion, posture, position and the like of the core unit 70 can be used as operation input immediately applied to the display screen of the monitor 2.

With reference to FIGS. 16 and 17, a state of a player holding the core unit 70 with one hand will be described. FIG. 16 shows an exemplary state of a player holding the core unit 70 with a right hand as seen from the front surface side of the core unit 70. FIG. 17 shows an exemplary state of a player holding the core unit 70 with a right hand as seen from the left side of the core unit 70.

As shown in FIGS. 16 and 17, the overall size of the core unit 70 is small enough to be held by one hand of an adult or even a child. When the player puts a thumb on the top surface of the core unit 70 (for example, near the cross key 72a), and puts an index finger in the recessed portion on the bottom surface of the core unit 70 (for example, near the operation button 72i), the light entrance of the imaging information calculation section 74 on the front surface of the core unit 70 is exposed forward to the player. It should be understood that also when the player holds the core unit 70 with a left hand, the holding state is the same as that described for the right hand.

Thus, the core unit 70 allows a player to easily operate the operation section 72 such as the cross key 72a or the operation button 72i while holding the core unit 70 with one hand. Further, when the player holds the core unit 70 with one hand, the light entrance of the imaging information calculation section 74 on the front surface of the core unit 70 is exposed, whereby the light entrance can easily receive infrared lights from the aforementioned two LED modules 8L and 8R. That is, the player can hold the core unit 70 with one hand without preventing the imaging information calculation section 74 from functioning. That is, when the player moves his or her hand holding the core unit 70 with respect to the display screen, the core unit 70 can further perform an operation input enabling a motion of the player's hand to directly act on the display screen.

Figure 18:
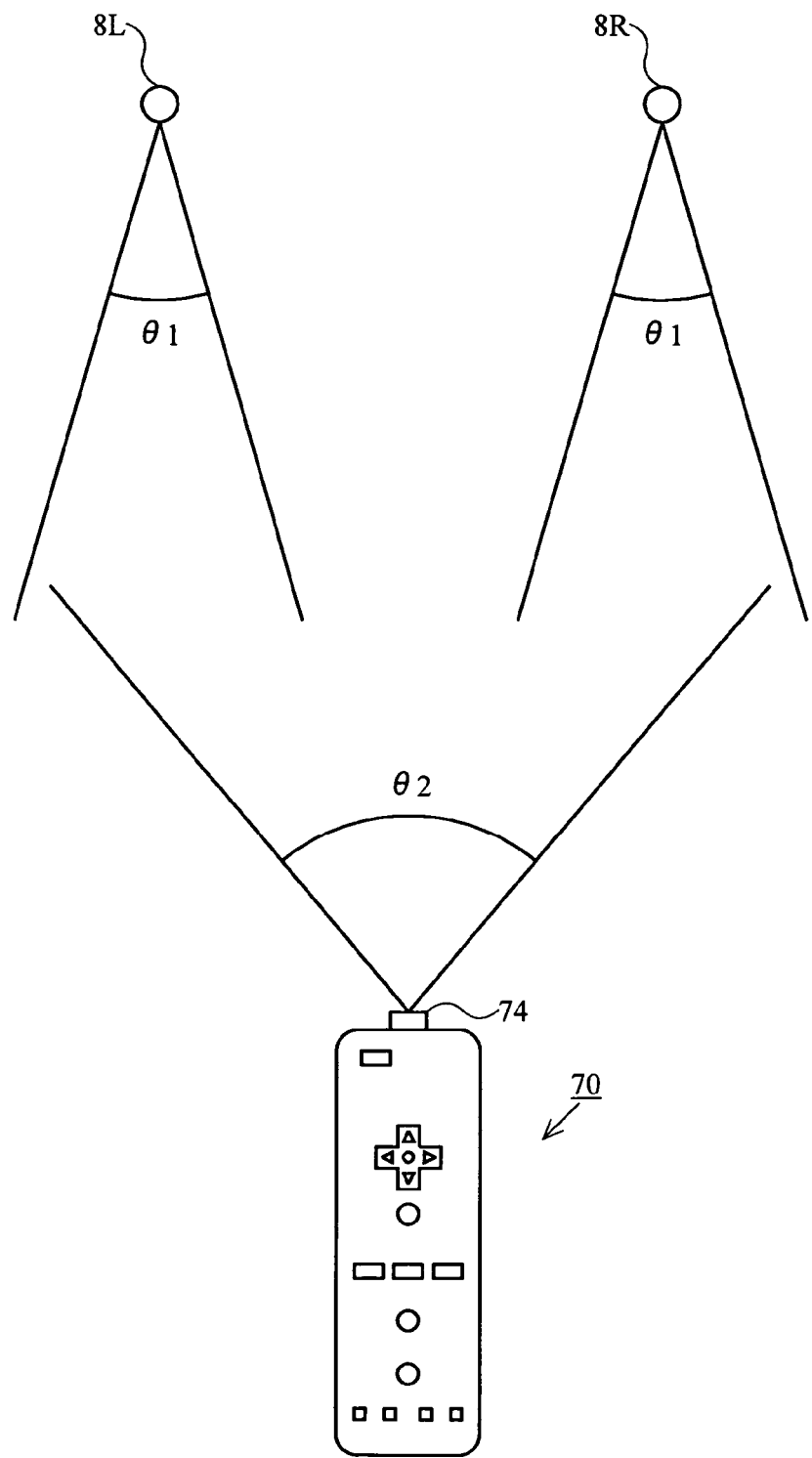
FIG. 18 is a diagram illustrating a viewing angle of a LED module 8L, a viewing angle of a LED module 8R, and a viewing angle of an image pickup element 743.

As shown in FIG. 18, the LED modules 8L and 8R each has a viewing angle $\theta 1$. The image pickup element 743 has a viewing angle $\theta 2$. For example, the viewing angle $\theta 1$ of the LED modules 8L and 8R is 34 degrees (half-value angle), and the viewing angle $\theta 2$ of the image pickup element 743 is 41 degrees. When both the LED modules 8L and 8R are in the viewing angle $\theta 2$ of the image pickup element 743, and the image pickup element 743 is in the viewing angle $\theta 1$ of the LED module 8L and the viewing angle $\theta 1$ of the LED module 8R, the game apparatus 3 determines a position of the core unit 70 using positional information relating to the point having high brightness of the two LED modules 8L and 8R.

When either the LED module 8L or LED module 8R is in the viewing angle $\theta 2$ of the image pickup element 743, or when the image pickup element 743 is in either the viewing angle $\theta 1$ of the LED module 8L or the viewing angle $\theta 1$ of the LED module 8R, the game apparatus 3 determines a position of the core unit 70 using the positional information relating to the point having high brightness of the LED module 8L or the LED module 8R.

Next, with reference to FIG. 19, a state of a player holding the subunit 76 with one hand will be described. FIG. 19 shows an exemplary state of a player holding the subunit 76 with a left hand as seen from the right side of the subunit 76.

As shown in FIG. 19, the overall size of the subunit 76 is small enough to be held by one hand of an adult or even a child. For example, a player can put a thumb on the top surface of the subunit 76 (for example, near the stick 78a), put an index finger on the front surface of the subunit 76 (for example, near the operation buttons 78d and 78e), and put a middle finger, a ring finger and a little finger on the bottom surface of the subunit 76 so as to hold the subunit 76. It should be understood that also when the player holds the subunit 76 with a right hand, the holding state is similar to that described for the left hand. Thus, the subunit 76 allows the player to easily operate the operation section 78 such as the stick 78a and the operation buttons 78d and 78e while holding the subunit 76 with one hand.

Figure 20:
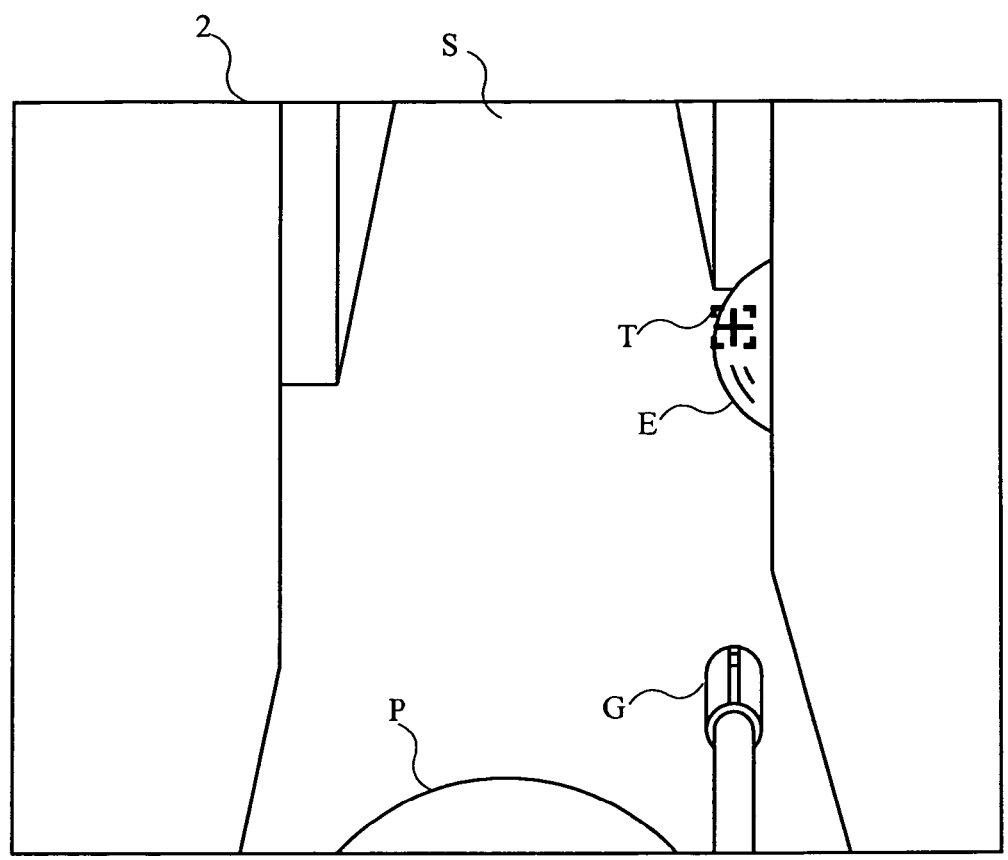
FIG. 20 shows an exemplary game image displayed on the monitor 2 when the game apparatus 3 executes a shooting game.

Here, an exemplary game played using the aforementioned controller 7 will be described. As a first example, a shooting game played using the controller 7 will be described. FIG. 20 is a diagram illustrating an exemplary game image displayed on the monitor 2 when the game apparatus 3 executes the shooting game.

As shown in FIG. 20, a portion of a three-dimensional virtual game space S is displayed on the display screen of the monitor 2. As a game object acting in accordance with an operation of the controller 7, a portion of the player character P and a portion of a gun G held by the player character P are displayed on the display screen. Moreover, the virtual game space S displayed on the display screen represents a field of front vision of the player character P, and for example an opponent character E is displayed as a shooting target in FIG. 20. A target indicating a position at which the player character P shoots the gun G is displayed on the display screen as the target cursor T.

In the shooting game having such a game image displayed on the monitor 2, a player operates the core unit 70 with one hand and operates the subunit 76 with the other hand as shown in FIG. 15 so as to play the game. For example, when the player inclines the stick 78a (see FIGS. 8A, 8B, 8C and 9) on the subunit 76, the player character P is moved in the virtual game space S in accordance with the inclining direction. Further, when the player moves his or her hand holding the core unit 70 with respect to the display screen, the target cursor T is moved in accordance with the motion, posture, position and the like of the core unit 70 with respect to the monitor 2 (LED modules 8L and 8R). When the player presses the operation button 72i (shown in FIG. 6) on the core unit 70, the player character P shoots the gun G at the target cursor T.

That is, while the player uses the stick 78a on the subunit 76 so as to instruct the player character P to move, the player can operate the core unit 70 as if the core unit 70 is a gun for the shooting game, thereby enhancing enjoyment in playing a shooting game. The player can perform an operation of moving the player character P and an operation of moving the target cursor T by using respective units held by different hands, whereby the player can perform the respective operations as independent ones. For example, since the virtual game space S displayed on the display screen is changed in accordance with the movement of the player character P, it is sometimes difficult to keep the target positioned near a position observed by the player in the virtual game space S because, for example, the player may be paying attention to the opponent character E suddenly jumping into the virtual game space S. However, while the player is moving the player character P with one hand (for example, a thumb of a left hand), the player can control a motion of the arm (for example, a right arm) which is not used for moving the player character P such that the core unit 70 has its front surface pointed to the observed position, thereby substantially enhancing flexibility for operating the controller 7 and increasing the reality of the shooting game. Further, in order to move the target cursor T, the player moves the controller. However, the operation of moving the controller does not hinder the player from performing a direction instruction operation for moving the player character P, thereby enabling the player to stably perform the two direction instruction operations. That is, by using the controller 7, the player can freely use his or her left and right hands and can perform a new operation having increased flexibility, which cannot be achieved using a physically single controller.

In a second example, a player inclines the stick 78a on the subunit 76 so as to move the player character P in the virtual game space S in accordance with the inclining direction as in the first example. The player moves a hand holding the core unit 70 with respect to the display screen so as to move a sight point of a virtual camera in accordance with a position of the core unit 70 with respect to the monitor 2 (LED modules 8L and 8R). These operations allow the player to observe a position to which the core unit 70 is pointed in the virtual game space S while operating the stick 78a on the subunit 76 so as to instruct the player character P to move.

In the above description, the controller 7 and the game apparatus 3 are connected to each other by wireless communication. However, the controller 7 and the game apparatus 3 may be electrically connected to each other by a cable. In this case, the cable connected to the core unit 70 is connected to a connection terminal of the game apparatus 3.

Moreover, in the present embodiment, only the core unit 70 among the core unit 70 and the subunit 76 of the controller 7 has the communication section 75. However, the subunit 76 may have the communication section for wirelessly transmitting the transmission data to the receiving unit 6. Further, both the core unit 70 and the subunit 76 may have the respective communication sections. For example, the respective communication sections included in the core unit 70 and the subunit 76 may wirelessly transmit the transmission data to the receiving unit 6, or the communication section of the subunit 76 may wirelessly transmit the transmission data to the communication section 75 of the core unit 70, and the communication section 75 of the core unit 70 may wirelessly transmit, to the receiving unit 6, the received transmission data from the subunit 76 and the transmission data of the core unit 70. In these cases, the connecting cable 79 for electrically connecting between the core unit 70 and the subunit 76 can be eliminated.

In the above description, the receiving unit 6 connected to the connection terminal of the game apparatus 3 is used as a receiving means for receiving transmission data which is wirelessly transmitted from the controller 7. Alternatively, the receiving means may be a receiving module built in the game apparatus 3. In this case, the transmission data received by the receiving module is outputted to the CPU 30 via a predetermined bus.

Although in the present embodiment the imaging information calculation section 74 included in the core unit 70 is described as an example of a determining section for outputting a signal (process result data) in accordance with a motion of the core unit 70 body, the imaging information calculation section 74 may be provided in another form. For example, the core unit 70 may include the acceleration sensor 701 as described above, or may include a gyro sensor. The acceleration sensor or the gyro sensor can be used to determine a motion or posture of the core unit 70, and, therefore, can be used as a determining section for outputting a signal in accordance with the motion of the core unit 70 body using the detection signal for the motion or posture. In this case, the imaging information calculation section 74 may be eliminated from the core unit 70, or sensor and the imaging information calculation section can be used in combination.

Further, although in the present embodiment only the core unit 70 includes the imaging information calculation section 74, the subunit 76 may also include a similar imaging information calculation section.

In the present embodiment, image data taken by the image pickup element 743 is analyzed so as to obtain position coordinates and the like of an image of infrared lights from the LED modules 8L and 8R, and the core unit 70 generates process result data from the obtained coordinates and the like and transmits the process result data to the game apparatus 3. However, the core unit 70 may transmit data obtained in another process step to the game apparatus 3. For example, the core unit 70 transmits to the game apparatus 3 image data taken by the image pickup element 743, and the CPU 30 may perform the aforementioned analysis so as to obtain process result data. In this case, the image processing circuit 744 can be eliminated from the core unit 70. Alternatively, the core unit 70 may transmit, to the game apparatus 3, the image data having been analyzed halfway. For example, the core unit 70 transmits to the game apparatus 3 data indicating a brightness, a position, an area size and the like obtained from the image data, and the CPU 30 may perform the remaining analysis so as to obtain process result data.

Although in the present embodiment infrared lights from the two LED modules 8L and 8R are used as imaging targets of the imaging information calculation section 74 in the core unit 70, the imaging target is not restricted thereto. For example, infrared light from one LED module or infrared lights from at least three LED modules provided in the vicinity of the monitor 2 may be used as the imaging target of the imaging information calculation section 74. Alternatively, the display screen of the monitor 2 or another emitter (room light or the like) can be used as the imaging target of the imaging information calculation section 74. When the position of the core unit 70 with respect to the display screen is calculated based on the positional relationship between the imaging target and the display screen of the monitor 2, various emitters can be used as the imaging target of the imaging information calculation section 74.

The aforementioned shapes of the core unit 70 and the subunit 76 are merely examples. Further, the shape, the number, setting position and the like of each of the operation section 72 of the core unit 70 and the operation section 78 of the subunit 76 are merely examples. Needless to say, even when the shape, the number, the setting position and the like of each of the core unit 70, the subunit 76, the operation section 72, and the operation section 78 are different from those described in the embodiment, the present invention can be realized. Further, the imaging information calculation section 74 (light entrance of the imaging information calculation section 74) of the core unit 70 may not be positioned on the front surface of the housing 71. The imaging information calculation section 74 may be provided on another surface at which light can be received from the exterior of the housing 71.

Thus, the controller of the present invention allows a player to operate both the core unit 70 and the subunit 76 included therein so as to enjoy a game. The core unit 70 has a function of outputting a signal in accordance with motion of the unit body including the imaging information calculation section 74 and the accelerator sensor 701. The subunit 76 has a function of outputting a signal in accordance with a direction input operation performed by the player. For example, when used is a controller into which the core unit 70 and the subunit 76 are integrated, the whole controller has to be moved so as to output a signal in accordance with the motion of the unit body, thereby exerting some influence on the direction input operation. Further, the integration of the core unit 70 and the subunit 76 causes the opposite influence, that is, flexibility, which is realized by separation between the core unit 70 and the subunit 76, is substantially reduced. Therefore, the core unit 70 and the subunit 76 can be separated into a right unit and a left unit as in the case of a conventional controller for the game apparatus, and simultaneously the core unit 70 and the subunit 76 allow the player to freely use his or her right and left hands, thereby providing the player with new operation, which cannot be anticipated by the integrated controller. Further, the controller can be operated with substantially enhanced flexibility, thereby providing a player with a game operation having increased reality.

The game controller and the game system according to the present invention can realize an operation having increased flexibility, and are useful as a game controller which includes two independent units and is operated by a player holding the two independent units, a game system including the game controller, and the like.

While the invention has been described in detail, the foregoing description is in all aspects illustrative and not restrictive. It is understood that numerous other modifications and variations can be devised without departing from the scope of the invention.

What is claimed is:

1. A game controller arrangement operable by at least one human player, the game controller arrangement comprising first and second control units, one of the first and second control units, in use, sending operating data obtained from the first control unit and the second control unit to a video game console providing video game play, the game controller arrangement comprising:
    a first control unit structured to be held in the air by and operated by a first hand, said first control unit including a first control unit body having disposed therein a sensor comprising a linear acceleration sensing arrangement that detects linear acceleration or a gyro-sensor that detects angular rate of rotation;
    a second control unit structured to be held in the air by and operated by a second hand, said second control unit including an imaging section that detects plural infrared markers and obtains marker coordinate related information therefrom, said second control unit further including at least one digit-operated control; and
    a wireless connection that wirelessly connects the first control unit with the second control unit, wherein
    the first control unit further includes a first operating data generator coupled to said sensor that provides first operating data sensed by said sensor, said first operating data in use controlling at least a first aspect of game play provided by said video game console;
    the second control unit further includes a second operating data generator coupled to said imaging section that generates second operating data in response to the imaging section and position of the at least one digit-operated control, said second operating data in use controlling at least a second aspect of game play provided by said video game console; and
    one of the first and second control units further includes a wireless transceiver for wirelessly transmitting the first operating data from the first control unit and the second operating data from the second control unit wirelessly to the video game console to thereby at least in part control said video game play.

2. The game controller arrangement according to claim 1, wherein
    the imaging section includes an image pickup sensor that senses an image along a predetermined direction, and outputs, as the second operating data, data including marker image position coordinate data that is a result of subjecting an image sensed by the image pickup sensor to a predetermined calculation.

3. The game controller arrangement according to claim 2, wherein the second operating data generator further includes a coordinate information calculator calculating coordinate information indicating positional coordinates, in the image sensed by the image pickup sensor, of at least one marker image which is included in the sensed image and is used as an imaging target, when performing the predetermined calculation, and outputting said marker image positional coordinates as the second operating data.

4. The game controller arrangement according to claim 1, wherein the sensor senses linear acceleration operating data, the imaging section provides marker image positional coordinate operating data, and the transceiver transmits to the video game player the linear acceleration operating data and the marker image positional coordinate operating data continually at intervals shorter than 1/60 second.

5. The game controller arrangement according to claim 1, wherein the second control unit comprises a second control unit body, and the second control unit digit operated control includes a thumb-operable stick which has a tip projecting from the second control unit body and is inclinable relative to second control unit body, and outputs data obtained in accordance with an inclining direction of the thumb-operable stick for wireless transmission to the video game console.

6. The game controller arrangement according to claim 1, wherein the second control unit comprises a second control unit body and the second control unit digit-operated control includes an operation button which has operation portions representing at least four directions and which is able to be pushed by a thumb into the second control unit body by the operation portions, and outputs, as the second operating data for wireless transmission to the video game console, data corresponding to the operation portion at which the operation button is pushed.

7. The game controller arrangement according to claim 1, wherein the second control unit has a body and the second operating data generator includes a sliding member which has a top surface exposed from the second control unit body and which is horizontally movable on the second control unit body, and outputs data obtained in accordance with a horizontal moving direction of the sliding member as the second operating data for wireless transmission to the video game console.

8. The game controller arrangement according to claim 1, wherein the second control unit has a body and the second operating data generator includes a touch pad on an outer surface of the second control unit body and outputs, as the second operating data for wireless transmission to the video game console, data obtained in accordance with a position on the touch pad at which the touch pad is touched.

9. The game controller arrangement according to claim 1, wherein the second control unit has a body and the second operating data generator includes at least four operation buttons which are able to be pushed into the second control unit body, and outputs data obtained in accordance with the pushed operation button as the second operating data for wireless transmission to the video game console.

10. A game system comprising the game controller arrangement according to claim 1, and wherein said video game console is wirelessly connected to the game controller arrangement and includes a computer for executing a game program to represent a virtual game world on a display screen, wherein the video game console provides animated game play including the first aspect controlled by the first operating data from the first control unit and the second aspect controlled by the second operating data from the second control unit.

11. The game system according to claim 10, wherein the video game console causes a player character appearing in the virtual game world to perform a first action in accordance with the first operating data and causes the player character appearing in the virtual game world to perform a second action in accordance with the second operating data.

12. For use with a video game playing system comprising (a) a video game console providing video game play and (b) a remote controller configured to be held in the air and operated by a first hand and including an image sensor that detects plural infrared markers disposed in the vicinity of a display screen and obtains marker image position coordinates therefrom and a three-axis linear acceleration sensor that detects linear acceleration to generate first data and wirelessly transmits said first data to the video game console, a further controller comprising:

a housing structured to be held in a second hand;

a thumbstick disposed on said housing, said thumbstick generating inclination data in response to inclination of said thumbstick by a thumb of said second hand relative to said housing;

at least one button disposed on said housing, said button generating button data in response to depression of said button by a finger of said second hand;

a further sensor disposed within said housing, said further sensor used to generate posture representing data related to posture of said housing; and a wireless transmitter operatively coupled to said thumbstick, said at least one button and said further sensor, said wireless transmitter configured for sending said thumbstick inclination data, said button data and said posture representing data over the air through said remote controller to said video game console, said remote controller and further controller cooperating to, in use, control a first aspect of video game play provided by said video game console by operating said remote controller with the first hand and controlling an additional aspect of said video game play by operating said further controller with the second hand, wherein said remote controller is configured to, in use, send said further controller's thumbstick inclination data, button data and posture representing data, and to also send said detected linear acceleration and said marker image position coordinates, over the air to said video game console.

13. The video game playing system of claim 12 wherein said further controller is configured so that said remote controller can optionally connect to said further controller.

14. A video game accessory controller wherein at least a first aspect of video game play is, in use, controlled by said accessory controller and at least a second aspect of said video game play is, in use, controlled by another handheld controller, and said accessory controller is configured to communicate with a video game console through said another handheld controller, said video game accessory controller comprising:

a housing structured to be held in the air and operated by a single hand of a video game player;

a joystick disposed on and projecting from said housing, said joystick generating inclination data in response to manual inclination thereof relative to said housing by a digit of said single hand;

at least one button disposed on said housing, said button generating button data in response to depression thereof;

a sensor disposed within said housing, said sensor generating data relating to attitude of said housing; and a wireless transceiver operatively coupled to said joystick, said at least one button and said sensor, said wireless transceiver sending said joystick inclination data, said button data and said sensor data over the air to another handheld controller held in the air and operated by a further hand for said another handheld controller to send to a video game console providing video game play.

15. The accessory controller of claim 14 wherein the sensor comprises an image sensor.

16. The accessory controller of claim 14 wherein wireless communication between said accessory controller and said another handheld controller is two-way.

17. For use with a video game console providing video game play and having a remote game controller for being held in the air and operated by a first hand, a further game controller for being held in the air and operated by a second hand, said further game controller comprising:
   a housing dimensioned and structured to be held in the air and operated by the second hand, said housing comprising a tapered curved upper surface terminating in a forward surface and further comprising a lower surface having a concavity defined therein,
   a joystick disposed on said housing upper surface, said joystick generating inclination data in response to detected inclination thereof relative to said upper surface by a digit of said second hand;
   at least one button disposed on said housing forward surface, said button generating button data in response to depression thereof by a digit of said second hand;
   a further sensor disposed within said housing, said further sensor generating further data related to the posture or attitude of said housing; and
   a wireless communications device responsive to said joystick, said at least one button and said further sensor, said wireless communications device being configured to, in use, send said joystick inclination data, said button data and said further data wirelessly to said remote game controller for said remote game controller to forward to said video game console, operation of said remote game controller by said first hand, in use, controlling at least one aspect of game play provided by said video game console, operation of said further game controller by said second hand controlling, in use, at least one further aspect of game play provided by said video game console.

18. The further controller of claim 17 wherein said remote game controller and said further game controller are configured for the same game player to hold in the air in different hands and operate simultaneously.

19. The further controller of claim 17 wherein said housing is dimensioned so that in use a plurality of fingers of said second hand can rest within said concavity while (a) at least a portion of the heel of the second hand is placed in contact with the tapered curved upper surface, (b) the thumb of said second hand can operate the joystick, and (c) the index finger of said second hand can operate the at least one button.

20. The further controller of claim 17 wherein said joystick comprises a thumbstick.

21. The further controller of claim 17 wherein said at least one button comprises plural buttons of different sizes and shapes disposed on said forward surface.

22. The further controller of claim 17 further comprising a cross-switch, an image sensor and a two-way transceiver provided on or in said housing.

23. The further controller of claim 17 wherein said remote game controller also wirelessly receives data from said further game controller.

24. The further controller of claim 17 wherein said wireless communications device comprises a radio transceiver.

25. A handheld remote controller structured to be held in, carried and operated by a single hand of a video game player, said handheld remote controller comprising:
   a housing shaped and structured so it can be held in the air by and manipulated by the game player's single hand, said housing defining a surface;
   an inclinable thumbstick projecting from said housing surface, said inclinable thumbstick outputting inclination data in accordance with the inclining direction of the inclinable thumbstick relative to the housing;
   at least one button disposed on said housing, said button generating button depression data in response to depression thereof by an index finger of said single hand;
   a three-axis linear acceleration sensor disposed within said housing, said three-axis linear acceleration sensor detecting linear acceleration of said housing and generating three axes of acceleration data related to posture of said housing; and
   a wireless transceiver operatively coupled to said inclinable thumbstick, said at least one button and said acceleration sensor, said wireless transceiver sending at least said thumbstick inclination data, said button depression data and said three axes of acceleration data over the air for use by a video game console in generating video game play,
   wherein, in use, at least a first aspect of said generated video game play can be controlled by said thumbstick inclination data and at least a second aspect of said generated video game play can be controlled by said linear acceleration data.

26. A handheld controller structured to be held in, carried by and operated by a single hand of a video game player, said handheld controller comprising:
   a housing shaped and structured so the handheld controller can in use be held in, carried by and simultaneously manipulated by the game player's single hand, said housing defining at least one surface;
   an inclinable thumbstick projecting from said at least one surface of said housing, said inclinable thumbstick detecting inclination of the inclinable thumbstick relative to said at least one surface of said housing as controlled by the thumb of said single hand;
   plural buttons disposed on said housing, said plural buttons generating button depression data in response to depression thereof by a digit of said single hand;
   an inertial sensor disposed within said housing, said inertial sensor selected from the group consisting of a linear acceleration sensor and a gyrosensor, said inertial sensor detecting information related to posture of said housing; and
   a wireless transceiver operatively coupled to said inclinable thumbstick, said plural buttons and said inertial sensor, said wireless transceiver sending said detected thumbstick inclination, said plural button depression data and said detected housing posture related information over the air for use by a video game console in generating video game play,
   wherein, in use, at least a first aspect of said generated video game play can be controlled by said detected thumbstick inclination and at least a second aspect of said generated video game play can be controlled by said detected housing posture related information.

27. The controller of claim 26 wherein said inertial sensor comprises a three-axis linear accelerometer.

28. The controller of claim 26 wherein said inertial sensor comprises a gyro-sensor capable of directly detecting rotation or angular rate.

29. A game controller arrangement for use with a video game console and operable by the left and right hands of a user, the game controller arrangement comprising first and second control units, the game controller arrangement comprising:
- a first control unit structured to be held in the air by and operated by a first hand of a user, said first control unit including:
- an imaging section that detects plural infrared markers and obtains marker coordinate related information therefrom,
- a linear accelerometer that detects linear acceleration, and
- a wireless transmitter that wirelessly transmits data to the video game console; and
- a second control unit having a housing structured to be held in the air by and operated by a second, different hand of said user, said second control unit including:
- a sensor that generates game-related input by sensing stimuli external to said second control unit;
- a joystick that generates inclination data in response to inclination thereof relative to said housing by a digit of said second hand; and
- a wireless transmitter that wirelessly transmits output from the sensor and the digit-operated control to said first control unit.

30. The game controller arrangement of claim 29 wherein said second control unit sensor comprises an image sensor that senses coordinates of plural infrared markers.

* * * * *